United States Patent [19]

Montague et al.

[11] 3,790,719

[45] Feb. 5, 1974

[54] METHOD AND MEANS FOR CONNECTING BRANCH EXCHANGES

[75] Inventors: Bernard R. Montague, Dollard des Ormeaux, Quebec; Derek Leyburn, Mississauga, Ontario; John Barker, Richmond, British Columbia; Ray John Hannley, Edmonton, Alberta; Vincent G. Leblanc, St. John, New Brunswick, all of Canada; Leslie K. Tam, Galion, Ohio

[73] Assignee: Bell Canada, Montreal, Quebec, Canada

[22] Filed: Oct. 28, 1971

[21] Appl. No.: 193,413

[52] U.S. Cl. .......................... 179/18 AD, 179/18 AH

[51] Int. Cl. .......................... H04m 7/14

[58] Field of Search ......179/18 EA, 18 AD, 18 AH, 179/18 BB, 18 D, 27 C

[56] References Cited

UNITED STATES PATENTS

| | | | |
|---|---|---|---|
| 3,211,838 | 10/1965 | Ericsson | 179/18 AH X |
| 3,215,783 | 11/1965 | Watts | 179/18 BB |
| 3,001,027 | 9/1961 | Armstrong et al. | 179/18 EA |
| 2,836,660 | 5/1958 | Gatzert | 179/18 EA |
| 2,407,640 | 9/1946 | Gillings et al. | 179/18 AH |
| 3,350,509 | 10/1967 | Lee et al. | 179/18 AD |
| 3,417,204 | 12/1968 | Richards | 179/18 AH |
| 3,179,750 | 4/1965 | Reilly | 179/18 AH X |

*Primary Examiner*—Thomas W. Brown
*Attorney, Agent, or Firm*—Westell & Hanley

[57] ABSTRACT

Two private branch exchanges are each associated with different central offices and are connectible to their associated central office by one or more associated trunks. Action initiated by the subset of one of the private branch exchanges to seize an associated trunk, causes connection of that trunk through the conventional telephone system to a trunk associated with the other private branch exchange (preferably through the direct distance dialling network). Seizure by the subset of the associated trunk also causes the seizure of register sender means. After this latter seizure dialled digits are stored in the register sender until the above connection is established. The stored digits are then sent along the connection to achieve connection to the terminating end subset. Preferably the dialled digits are sent over the established connection in the form of tones within the voice band. Preferably the call is timed by a timer optionally associated with either the originating or the terminating end. Preferably the originating and terminating ends are interchangeable.

20 Claims, 38 Drawing Figures

CONNECTION FOR ORIGINATING CALLS

CONNECTION FOR ORIGINATING CALLS

CONNECTION FOR ORIGINATING CALLS

| DIGITS | PB | AC | BC | CC | DC | EC |
|---|---|---|---|---|---|---|
| 0 | | | | | | |
| 9 | x | | | | | x |
| 8 | | | | | x | x |
| 7 | x | | | x | x | x |
| 6 | | | x | x | x | x |
| 5 | x | x | x | x | x | x |
| 4 | | x | x | x | x | |
| 3 | x | x | x | x | | |
| 2 | | x | x | | | |
| 1 | x | x | | | | |

(Relays Operated: PB, AC, BC, CC, DC, EC)

TABLE A

INSTEERING RELAY CHAIN

TABLE B

| INSTEERING RELAY | STEERS INFORMATION TO STORAGE BIN NUMBER |
|---|---|
| AS | 14 |
| BS | 15 |
| CS | 16 |
| DS | 17 |
| ES | 18 |
| FS | 19 |
| GS | 20 |
| HS | 21 |
| JS | DUMMY |

| OUTSTEERING RELAY | OUTSTEERS INFO. FROM BIN # |
|---|---|
| ON | DUMMY |
| OP | 14 |
| OR | 15 |
| OS | 16 |
| OT | 17 |
| OU | 18 |
| OV | 19 |
| OW | 20 |
| OX | 21 |
| OY | DUMMY |

OUTSTEERING RELAY CHAIN

OUTSTEERING RELAY CHAIN

DIAL PULSE GENERATOR

INTERDIGITAL PAUSE AND STOP DIAL RELAY

SENDER OUTPULSING LOOP

OUTPULSING COUNTER

Outpulsing Counter Relay Operation

| Number of pulses sent on line | Relays Operated | | | | | | |
|---|---|---|---|---|---|---|---|
| | PBB | ACC | BCC | CCC | DCC | ECC | FCC |
| 1 | ● | ● | | | | | |
| 2 | | ● | ● | | | | |
| 3 | ● | ● | ● | ● | | | |
| 4 | | ● | ● | ● | ● | | |
| 5 | ● | ● | ● | ● | ● | ● | |
| 6 | | ● | ● | ● | ● | ● | ● |
| 7 | ● | | ● | ● | ● | ● | ● |
| 8 | | | | ● | ● | ● | ● |
| 9 | ● | | | | ● | ● | ● |
| 0 | | | | | | ● | ● |

OUTPULSING MATCHING ARRAY

STORAGE CHECKING CIRCUIT

CIRCUIT FOR CONTROLLING CLASS OF SERVICE INDICATION
WITH STEP-BY-STEP CENTRAL OFFICE

CLASS OF SERVICE INDICATION
NUMBER 5 CROSSBAR

DIGIT RECOGNITION RELAYS

METHOD AND MEANS FOR CONNECTING BRANCH EXCHANGES

GENERAL INTRODUCTION

This invention relates to means and a method for connecting a pair of private branch exchanges (PBX hereafter) through the conventional telephone system. It will assist with the understanding of the invention, if it is made clear that the invention is not intended to be used to connect two PBX which are physically located near the same local central office, and hence connectable without intervening connections. Thus the invention is useful where the two PBX are each most conveniently connectable to a different central office (usually this will be a local central office) with the two central offices connectable through the conventional telephone system. By 'central office' or 'local central office' is meant a telephone exchange handling the switching between lines connected thereto. The word 'local' merely implies a central office to which subscribers lines are directly connected, as opposed to a Tandem Office, a toll centre, or a control switching point, through which calls pass in transit between local central offices. Where the invention relates to connecting a PBX to an outside exchange this is an outside exchange spaced by wired or radio connections from the central office local exchange to which the PBX is connected and which, in accord with the invention, will be connected with the outside exchange through the conventional telephone system.

At the present time, two private branch exchanges connectable to different central offices, are connected by dedicated lines, i.e. by lines which are not used for any other purpose. This becomes expensive when distances are long and particularly so if usage is not spread over the 24 hours or if demand is intermittent.

The inventive method of connection of such pair of private branch exchanges provides a way in which a subset of one private branch exchange may be connected with a subset of the other private branch exchange over the direct dial facilities but in a manner which permits measured rate calculation of the charges, i.e. charging only for the time in which two subsets connected through the conventional telephone system are simultaneously in use. This is, in effect, charging the customer only for the time the connection through the conventional telephone system is in use. By 'seize' in this application, we mean to 'achieve connection to'. In all examples shown 'seizure' is the achievement of a two wire connection, e.g. the seizure of a trunk by a PBX, of a trunk by central office lines, etc.

Figures 14, 15A:
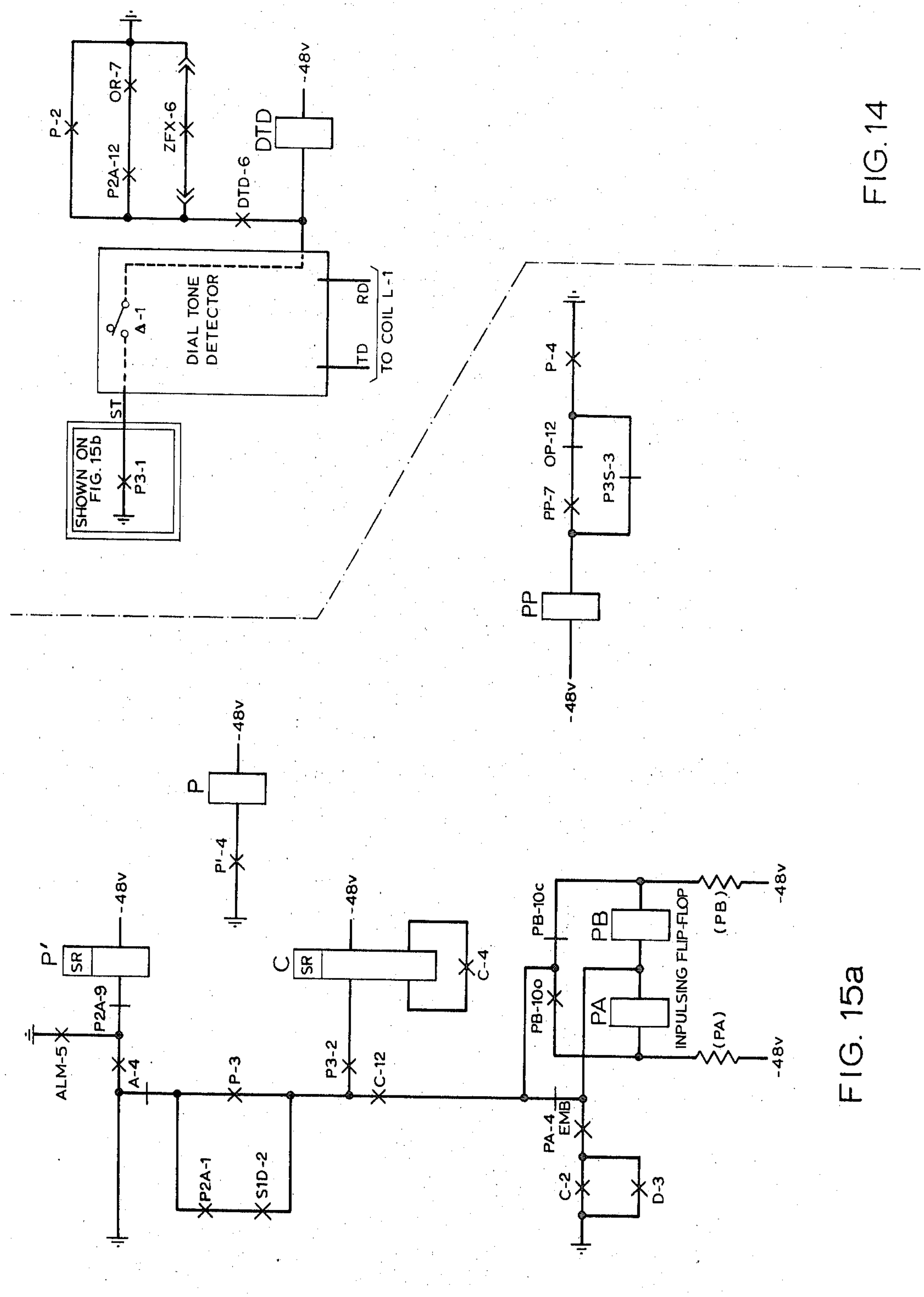
FIG. 14 shows circuitry associated with the dial tone detector.
Figures 15B, 16:
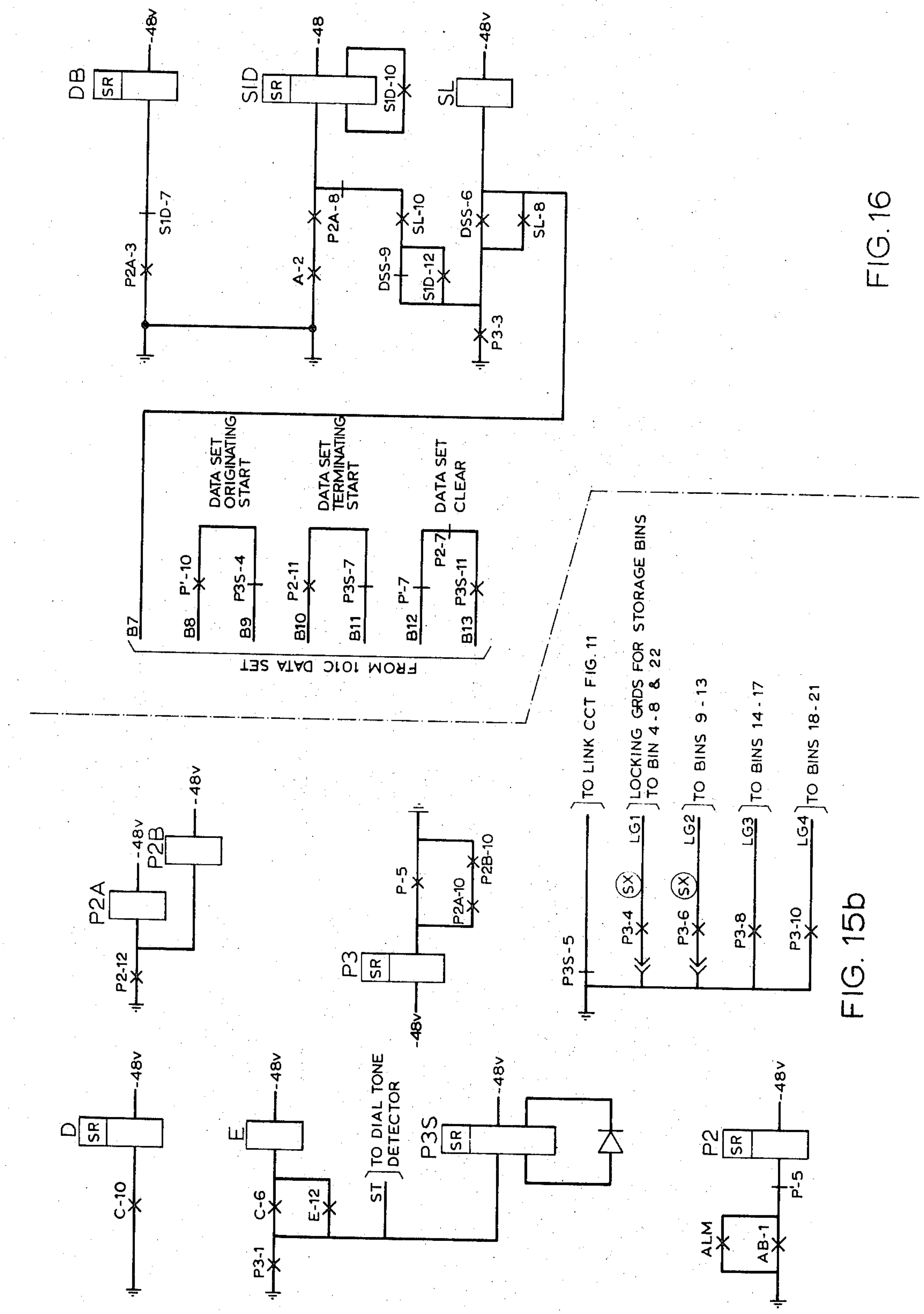
Figure 17:
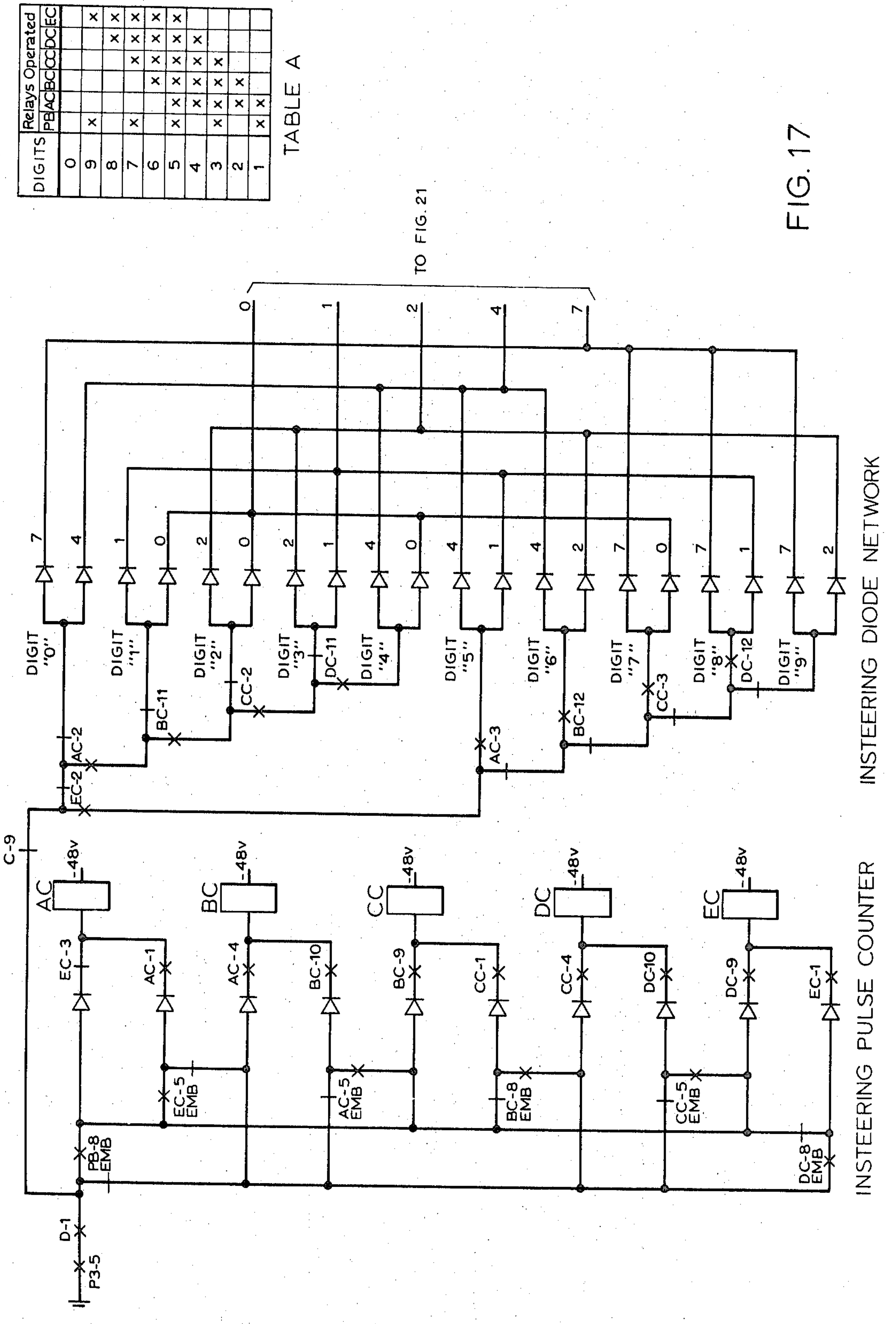
Figure 18:
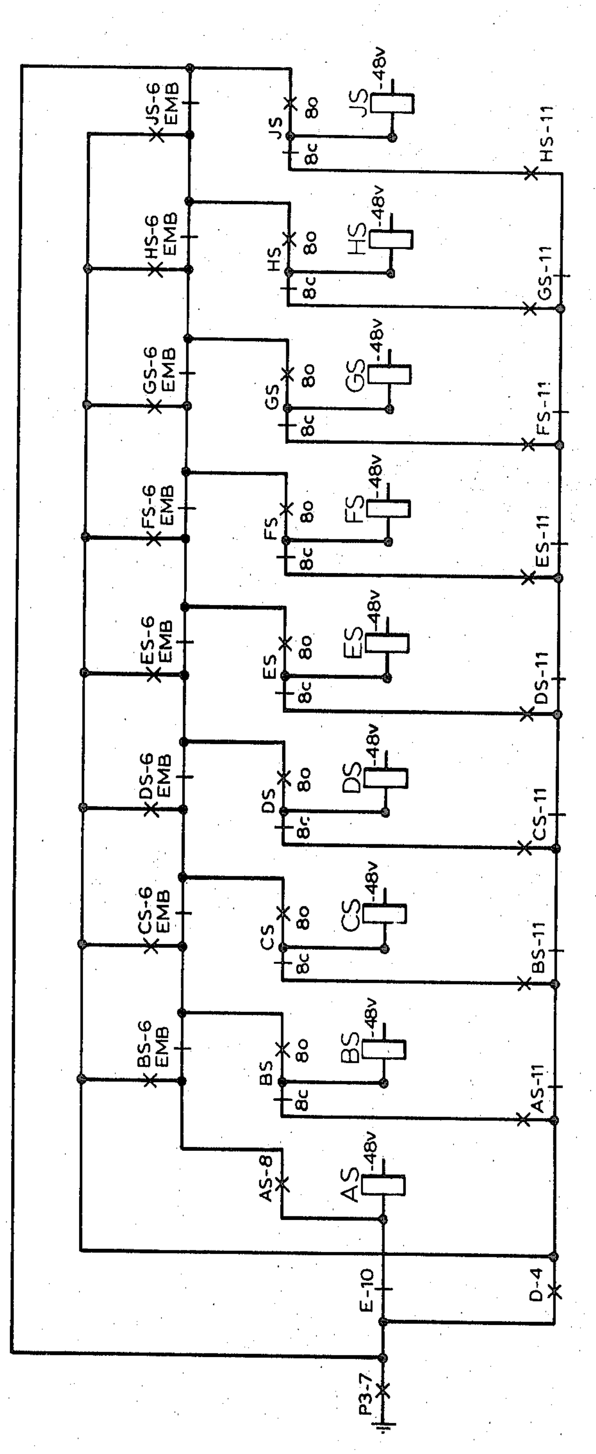
Figure 19:
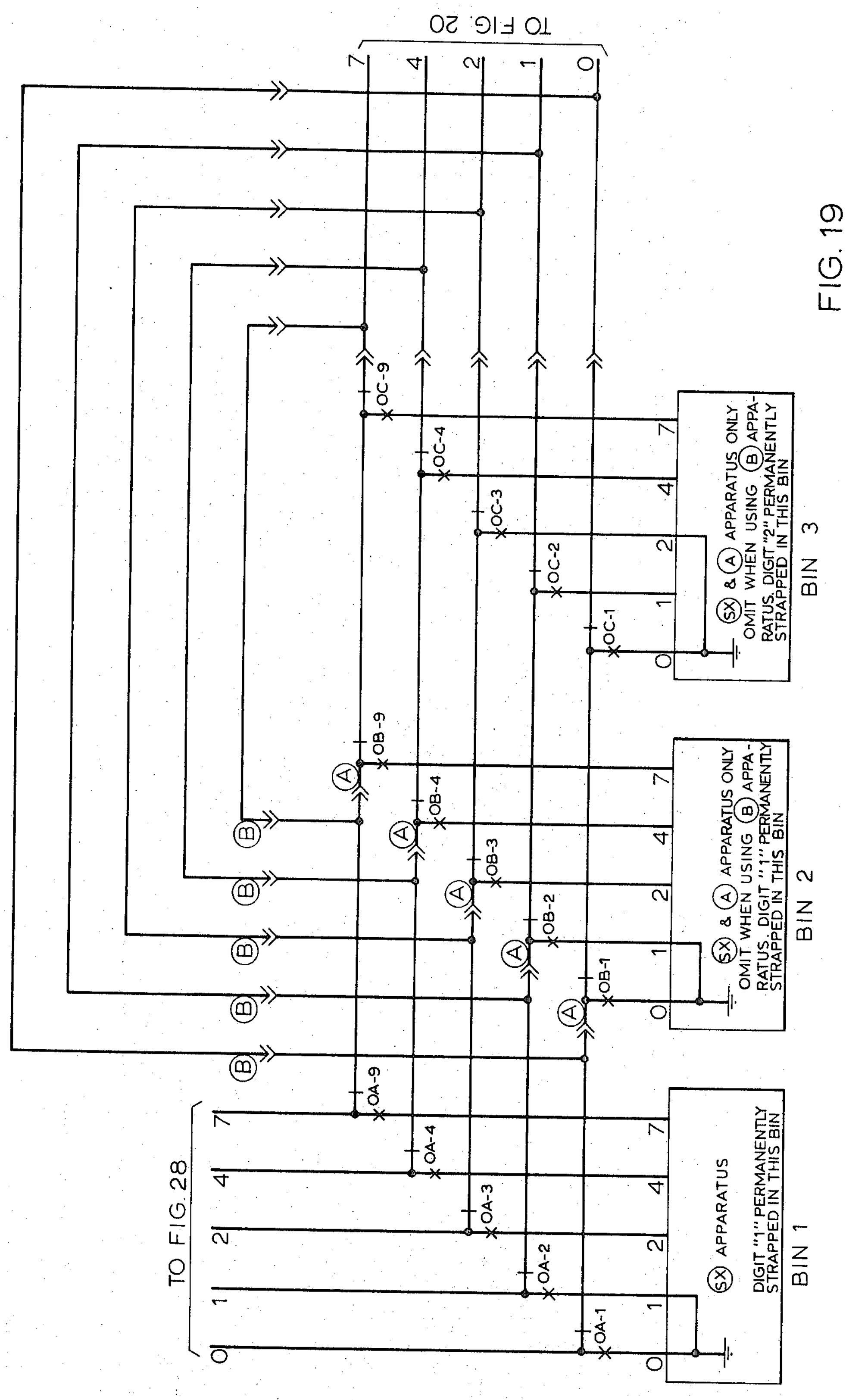
Figure 20:
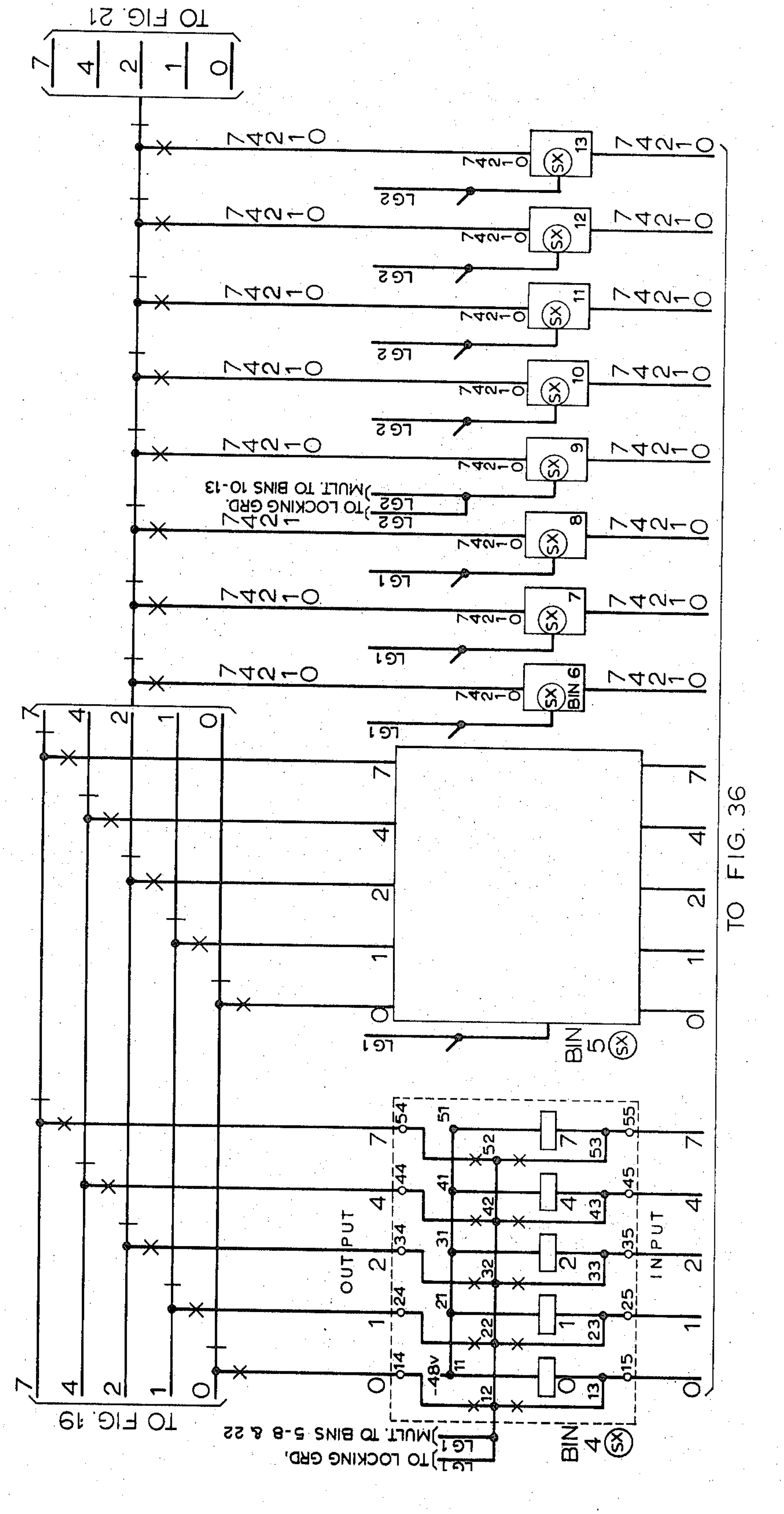
Figure 23:
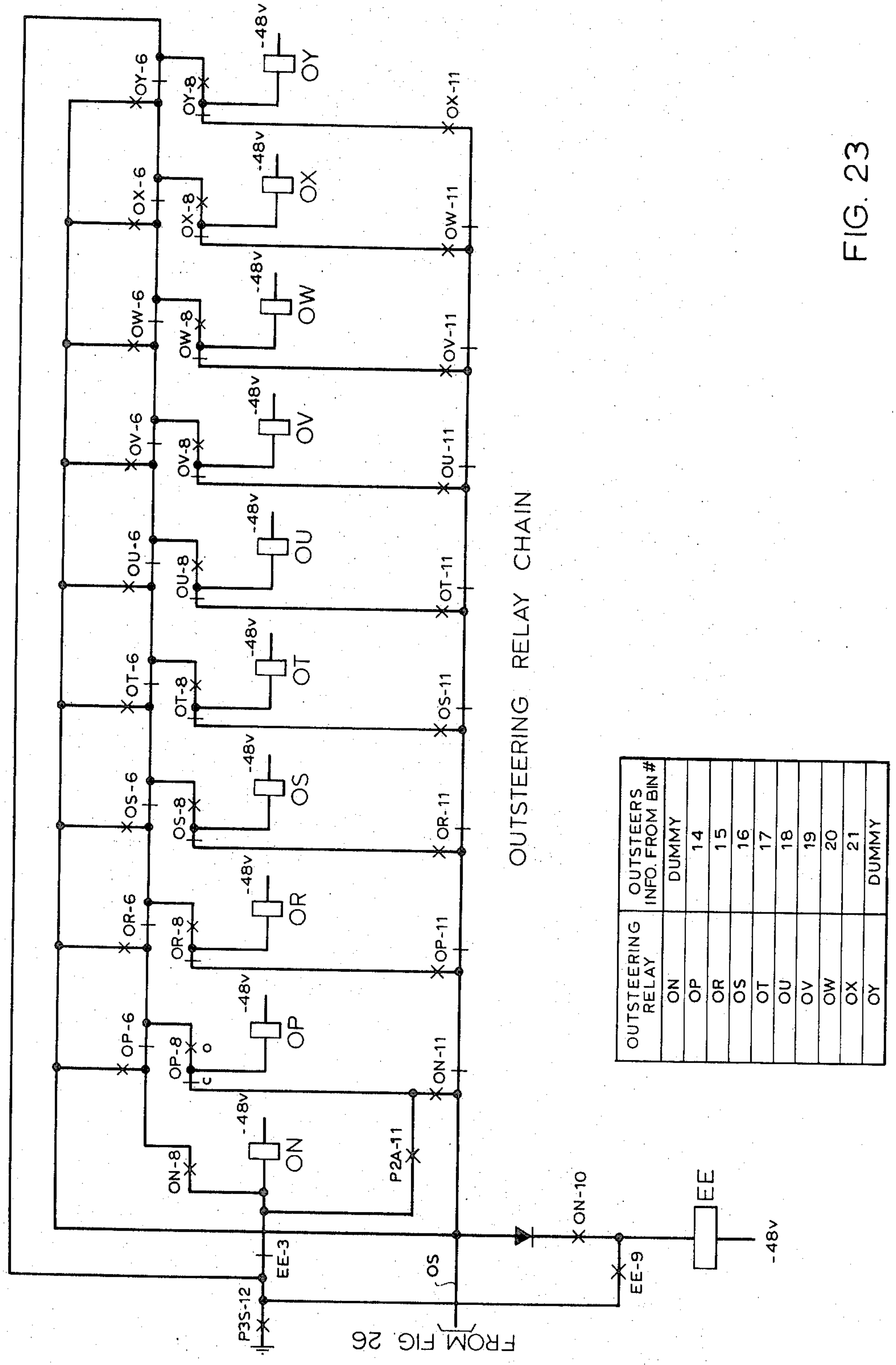
Figure 24:
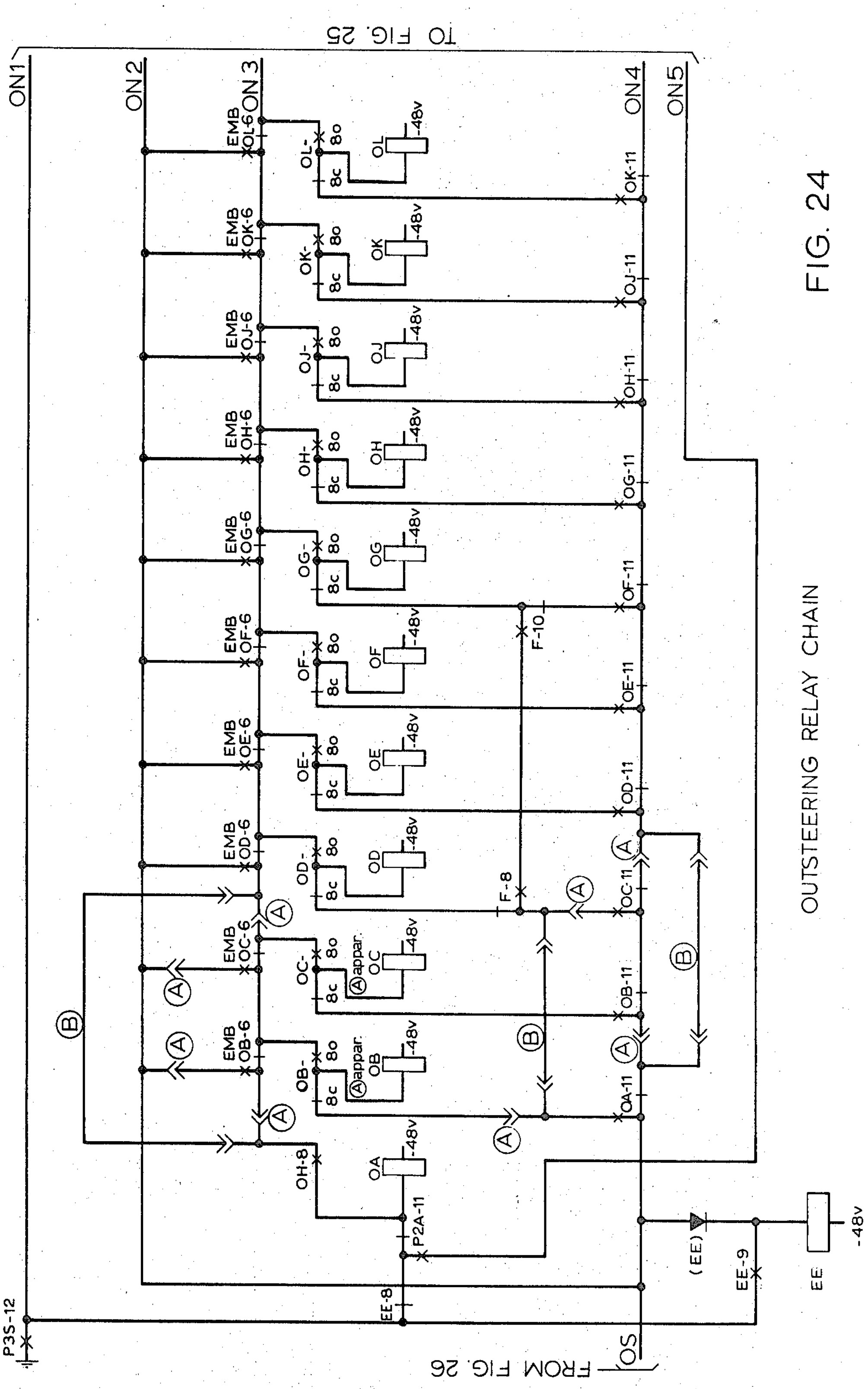
Figure 25:
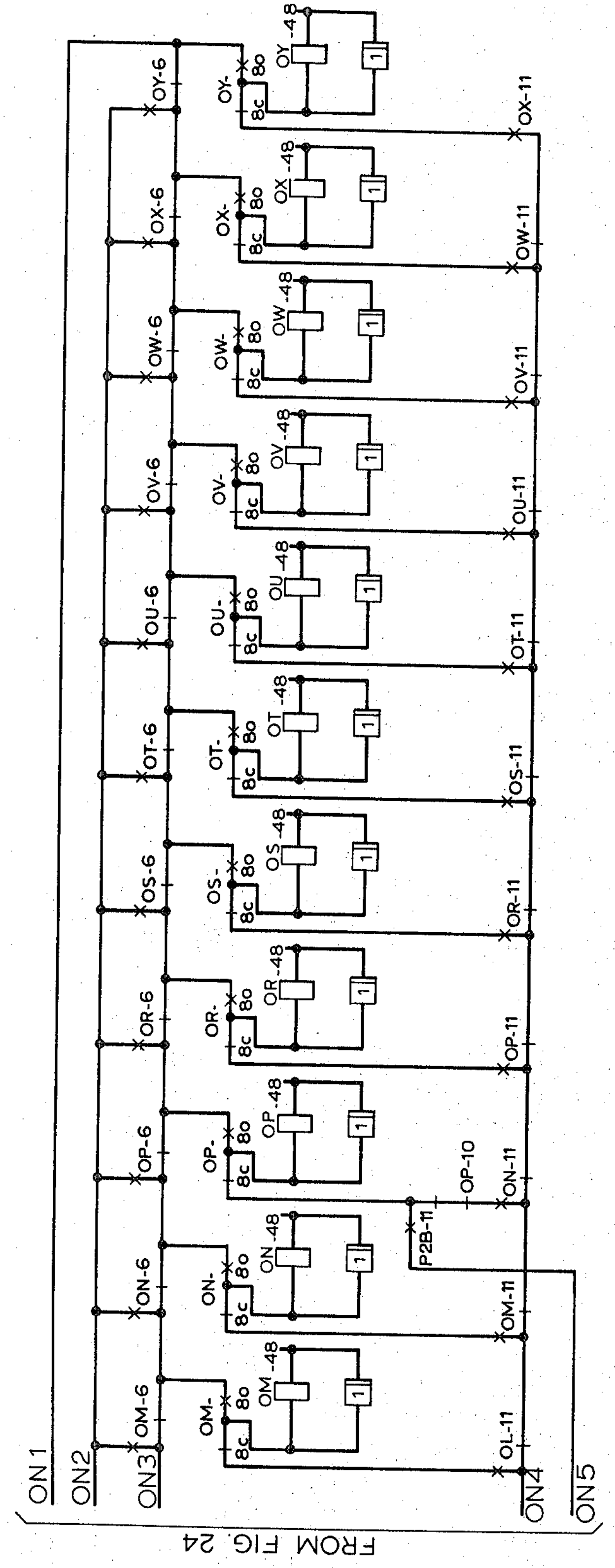
Figure 26A:
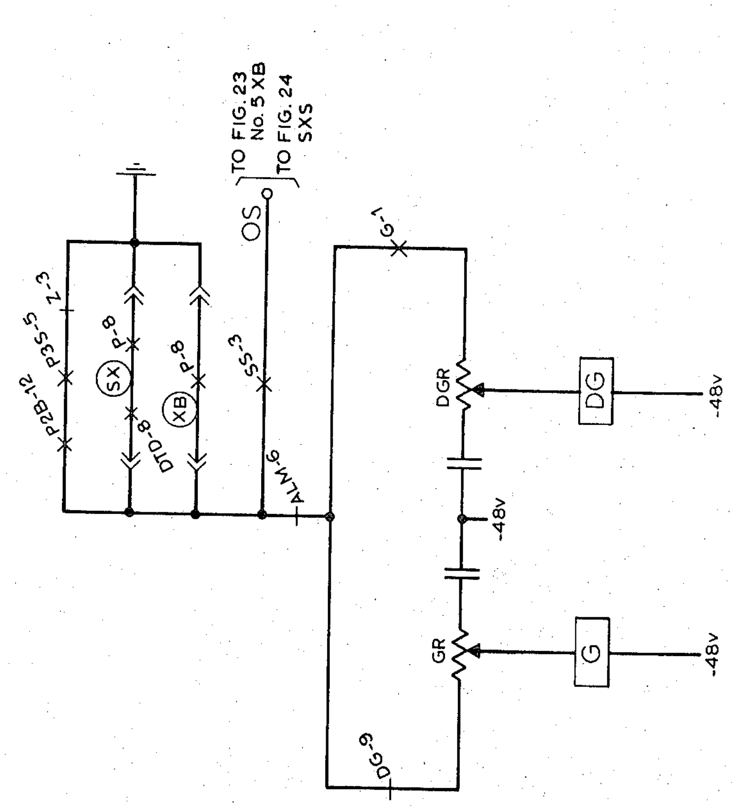
Figure 26B:
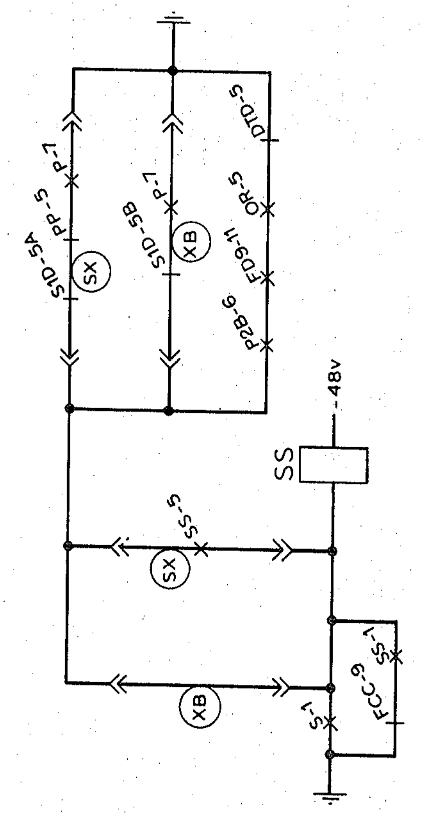
Figure 27:
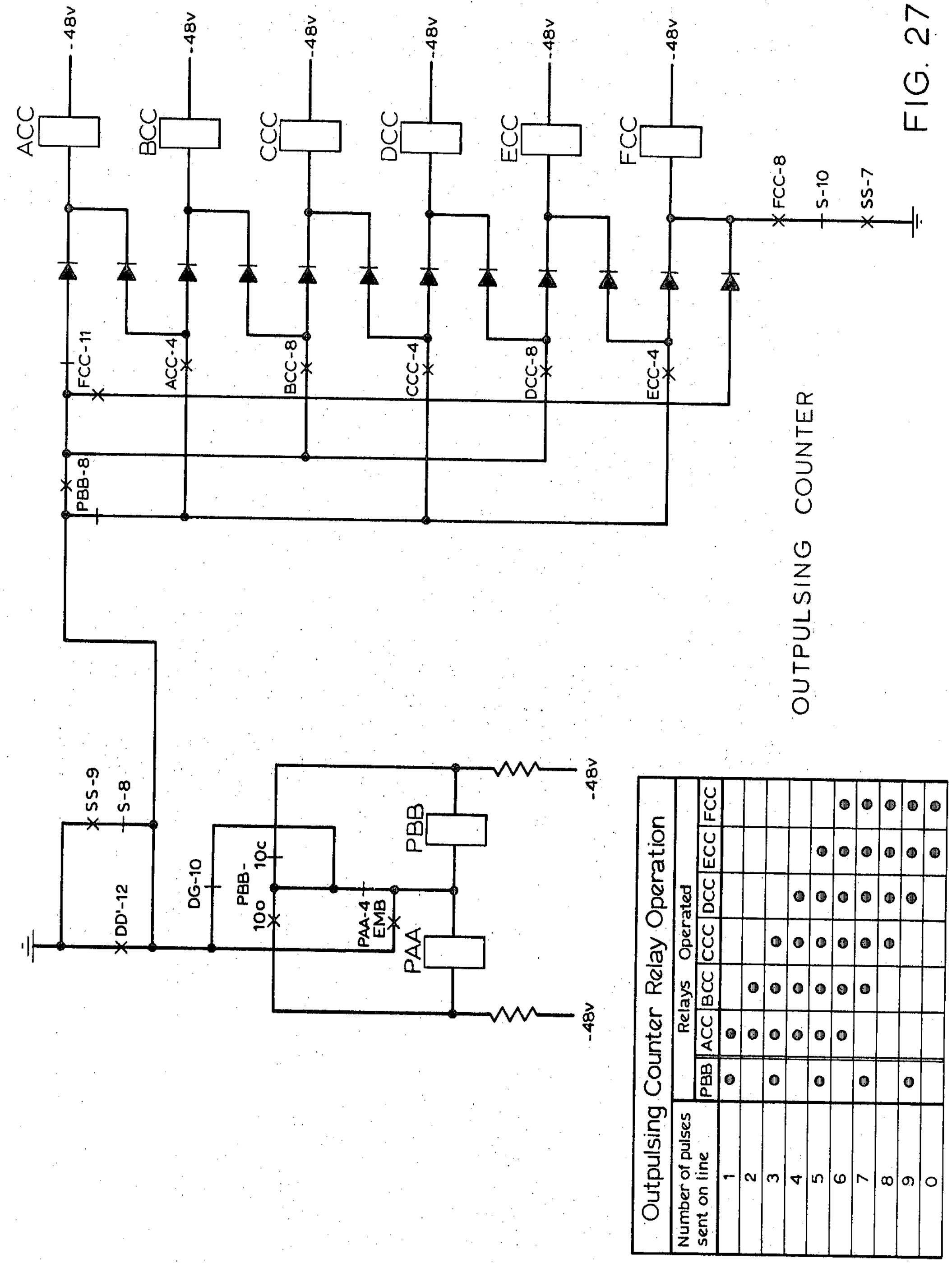
Figure 28:
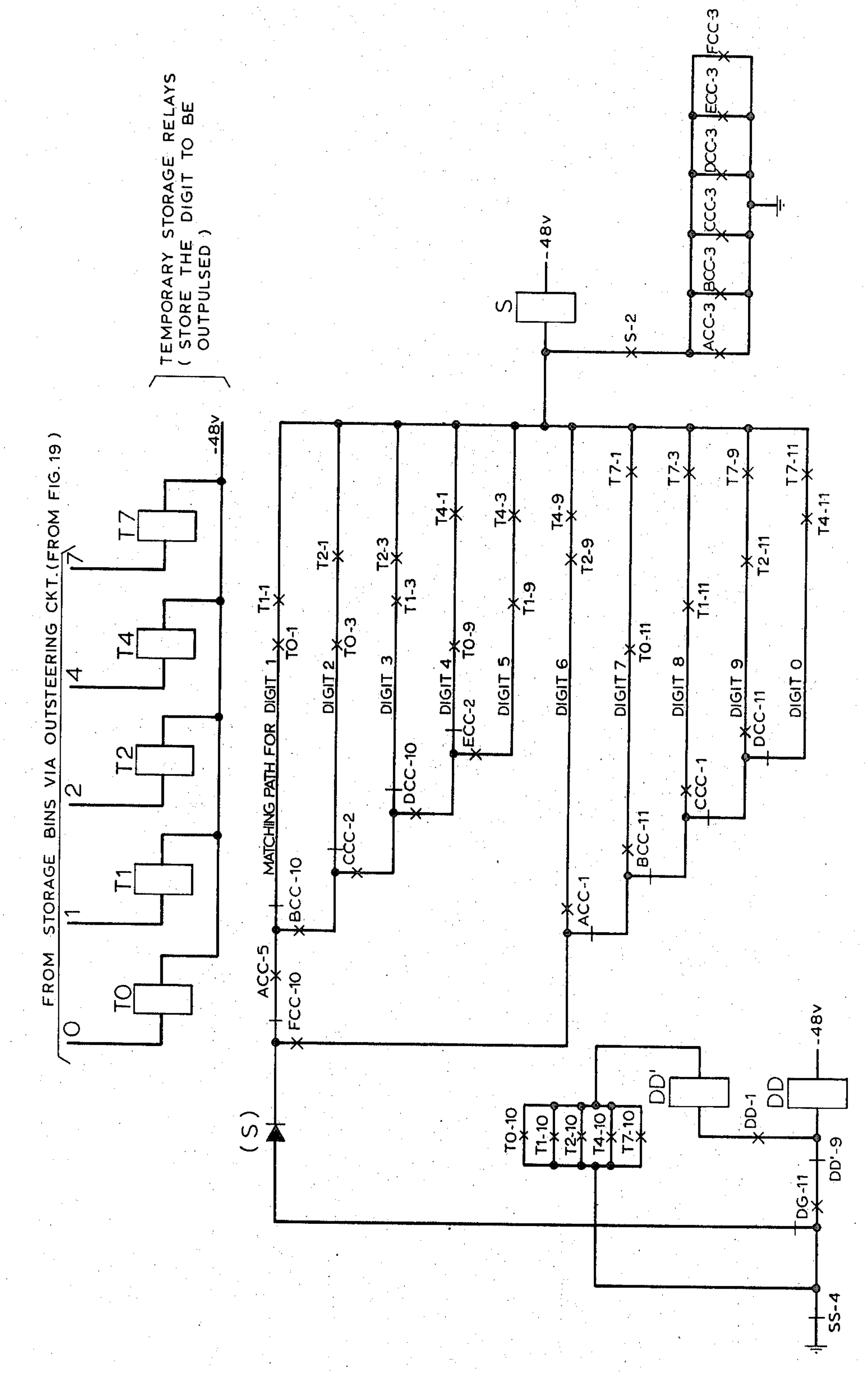
Figure 29:
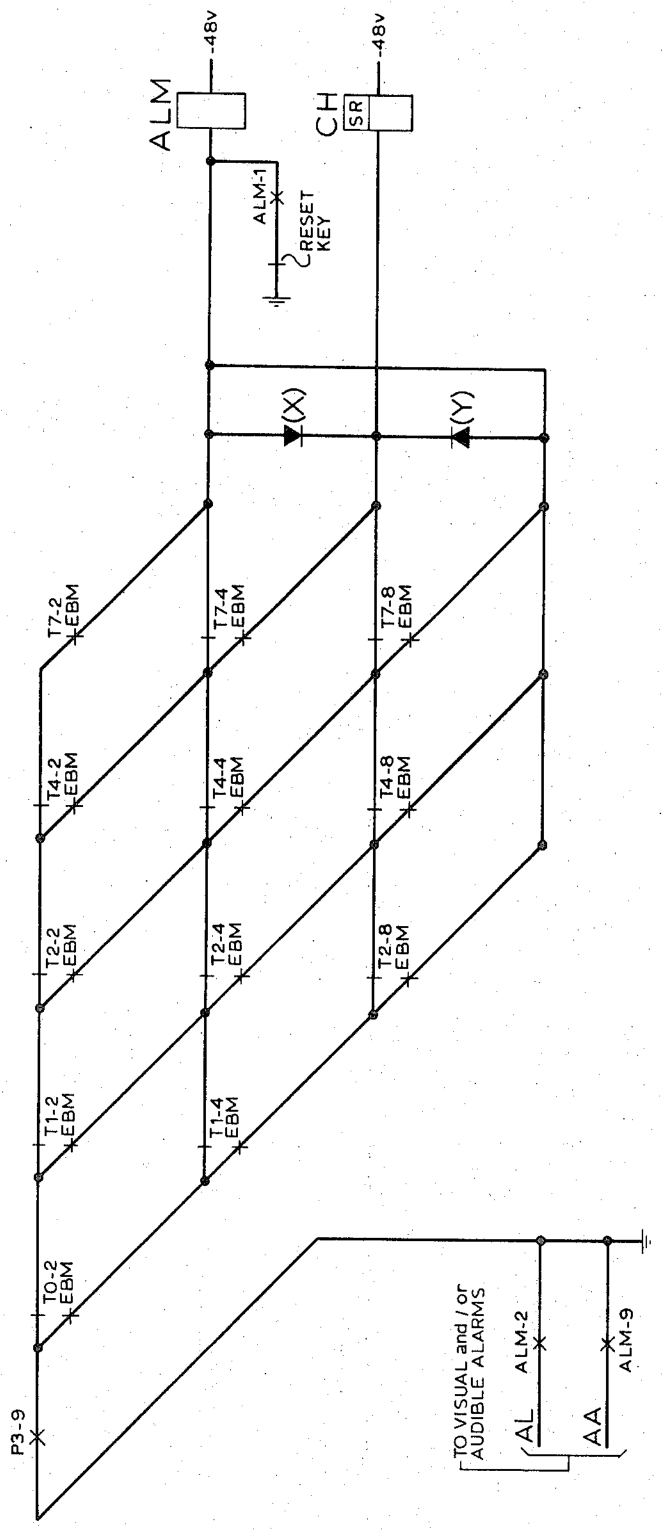
Figure 30:
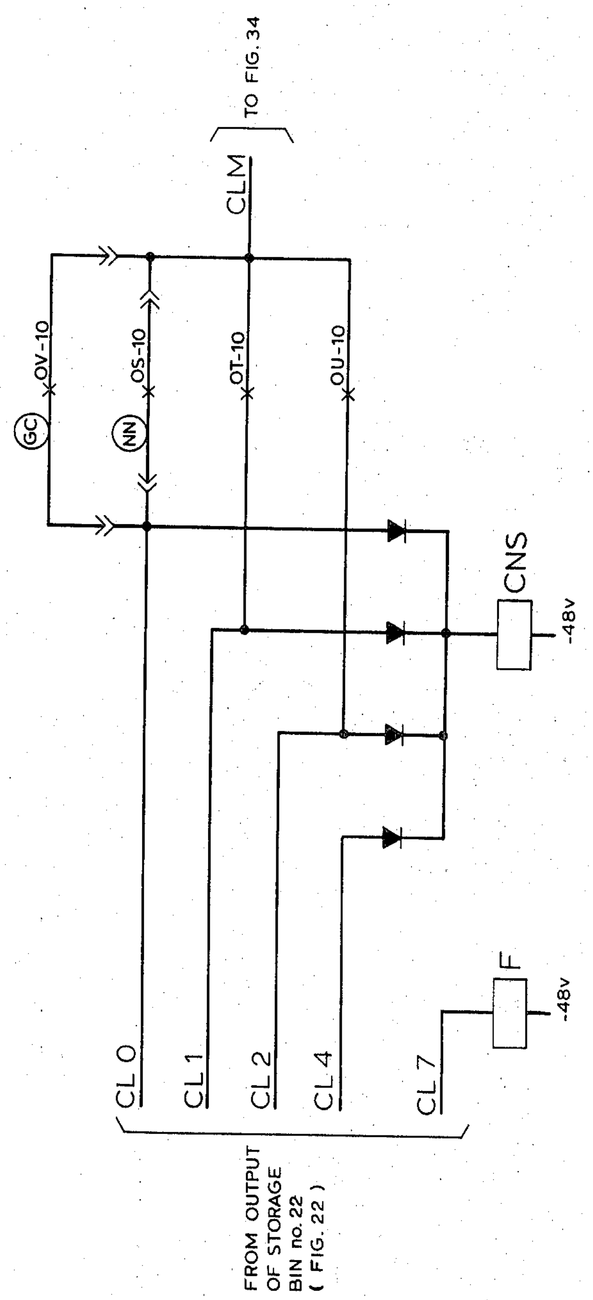
Figure 31:
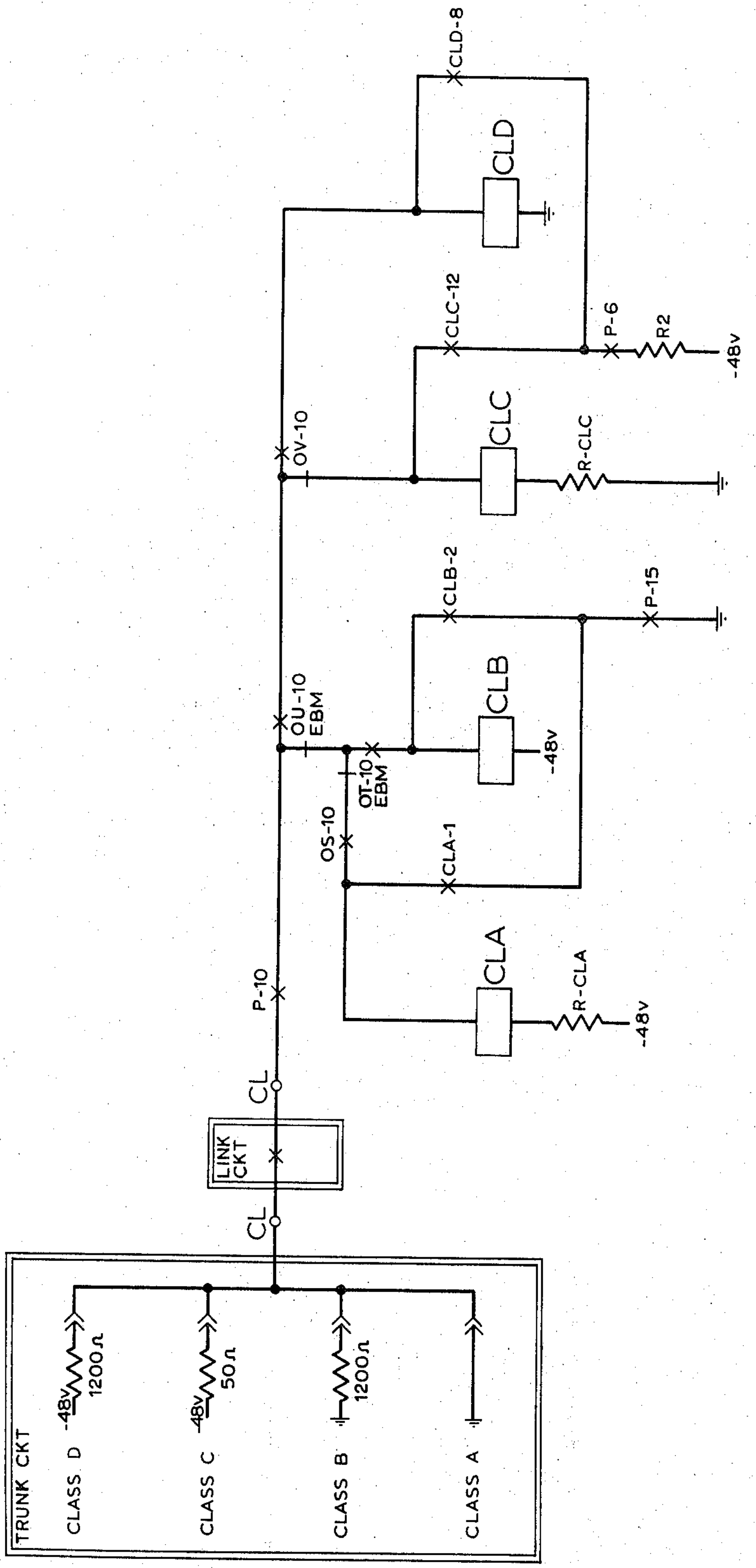

FIG. 15*a* shows relays associated with the control of the register-sender, and shows the inpulsing flip-flop;

FIG. 15*b* shows further relays associated with the control of the register-sender;

FIG. 16 shows relays and contacts associated with the control of the data-set;

FIG. 17 shows the insteering pulse counter and the insteering diode network;

FIG. 18 shows the insteering relay chain;

FIGS. 19–22 show the storage bins;

FIG. 23 shows the outsteering relay chain for use with a No. 5 cross-bar central office;

FIGS. 24 and 25 show the outsteering relay chain for use with a step-by-step central office;

FIG. 26*a* shows the dial pulse generator and the inter-digital pause and stop dial relay;

FIG. 26*b* shows the sender outpulsing loop;

FIG. 27 shows the outpulsing counter and the outpulsing counter relay operation;

FIG. 28 shows the outpulsing matching array;

FIG. 29 shows the storage checking circuit;

FIG. 30 shows circuitry for controlling the class of service indication with a step-by-step central office;

FIG. 31 shows circuitry for controlling the class of service indication with a No. 5 cross-bar central office.

Figure 32:
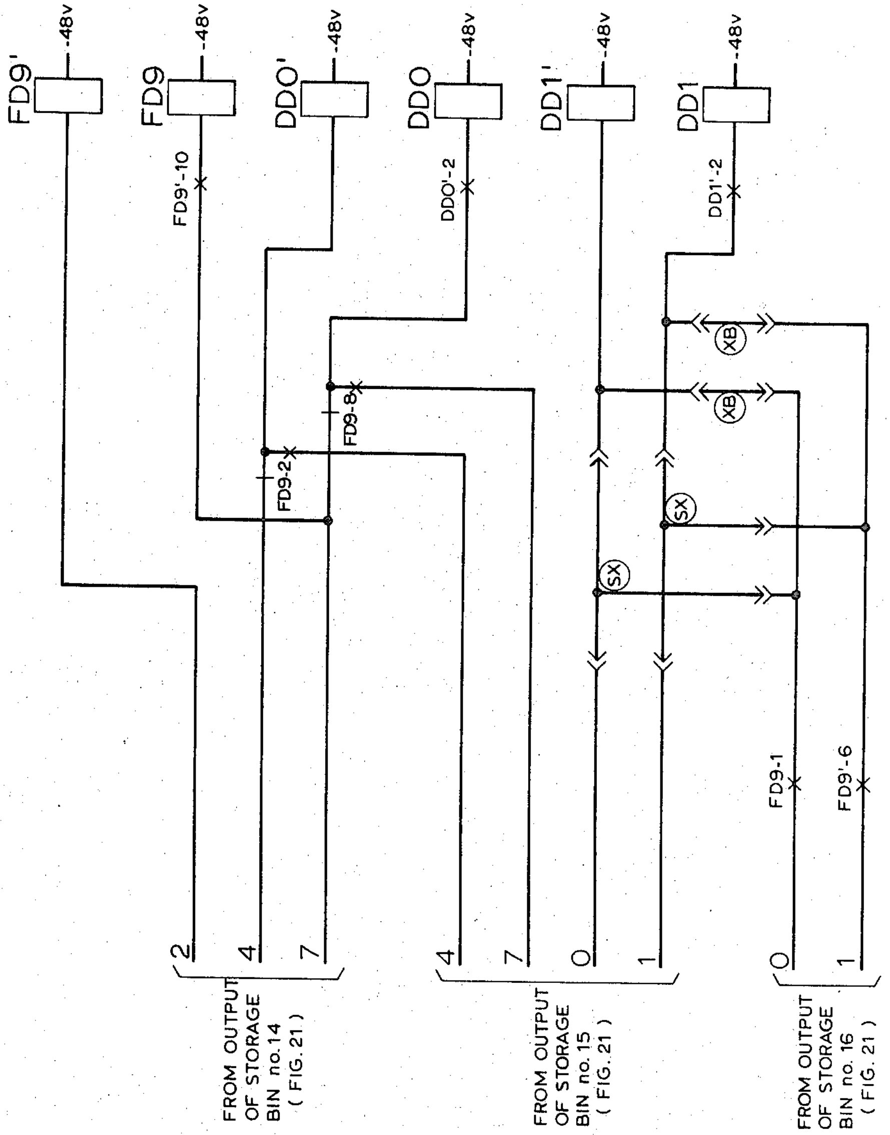

FIG. 32 shows digit recognition relays and circuitry for controlling them.

Figure 33:
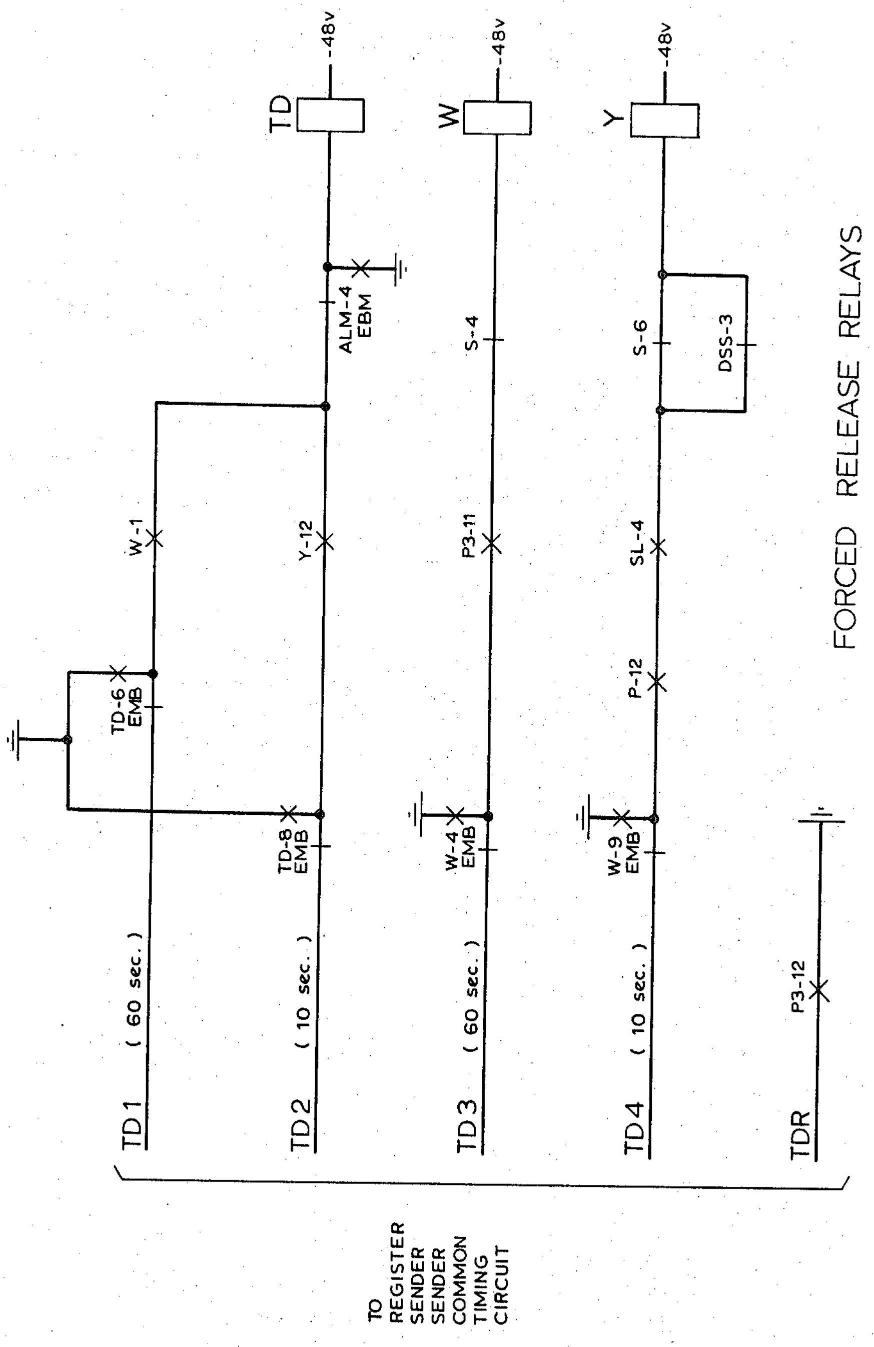

FIG. 33 shows the relays operable in the event of forced release, and their control contacts.

Figure 34:
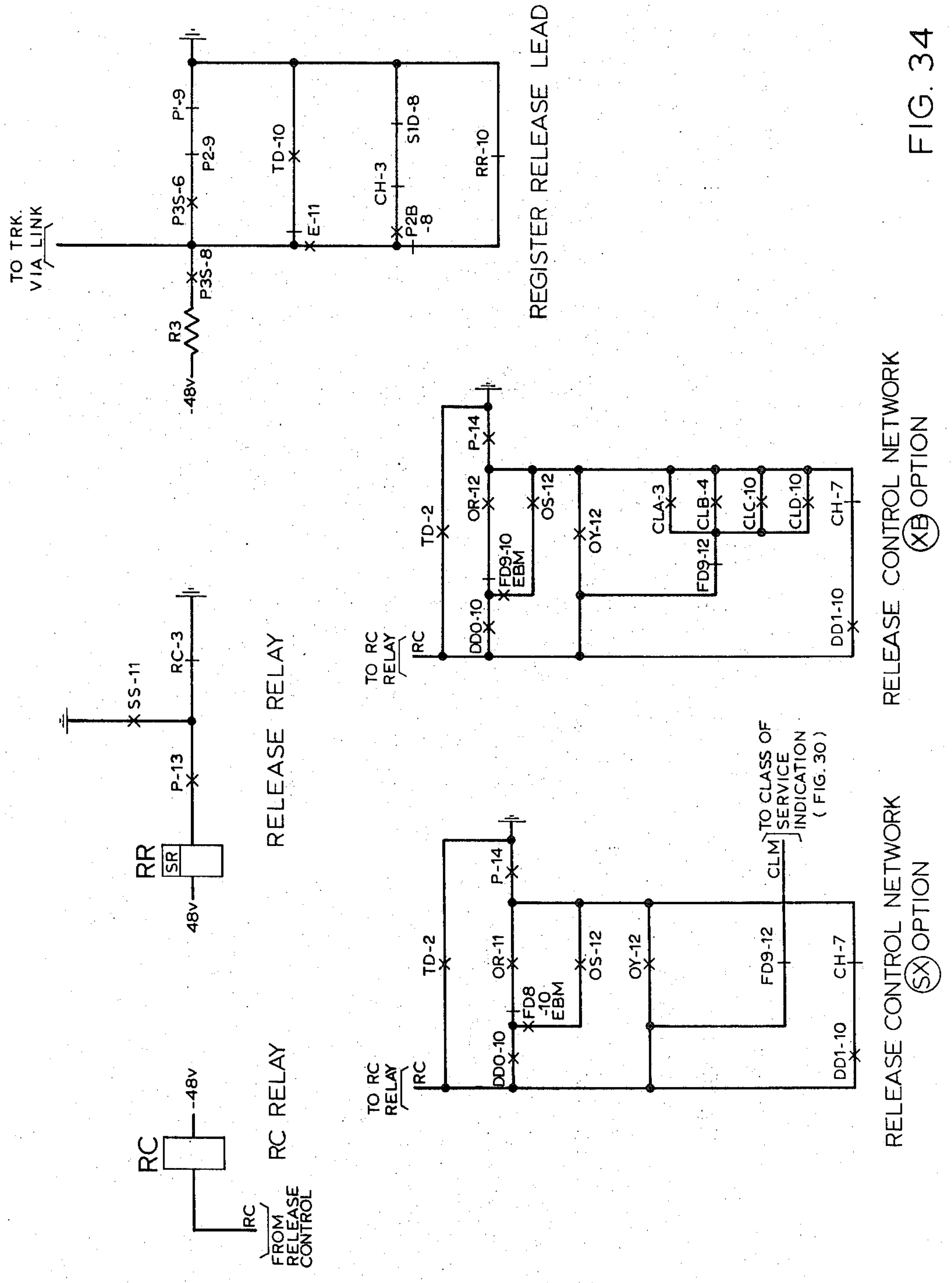
Figure 35:
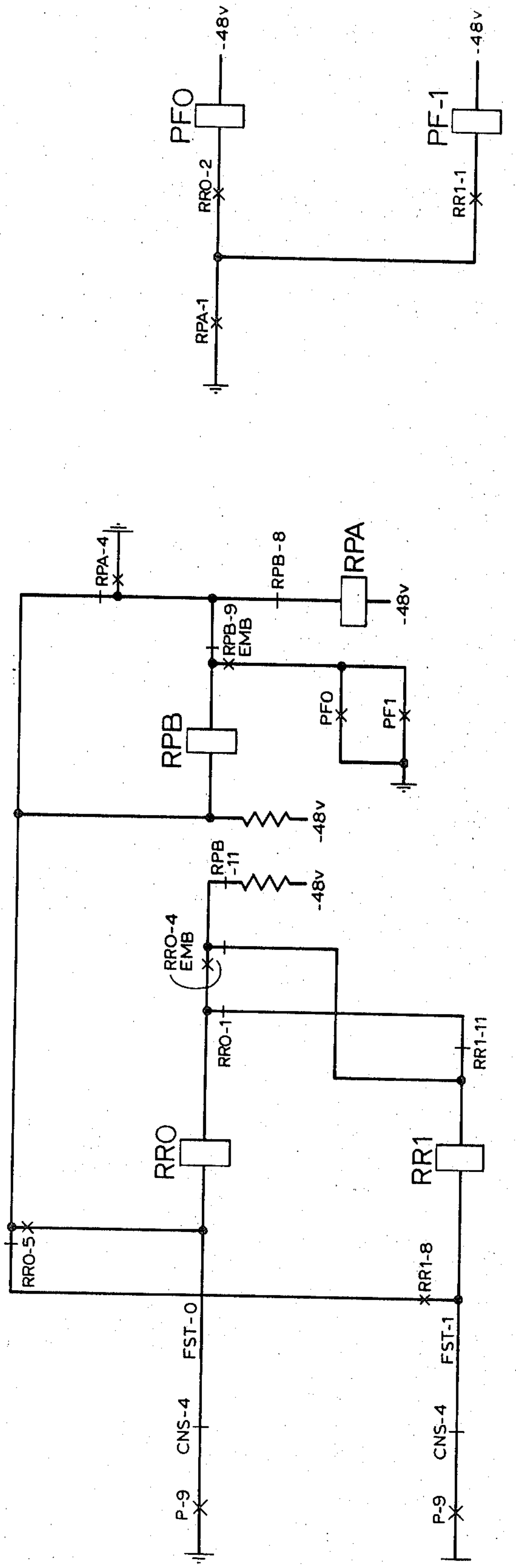
Figure 36:
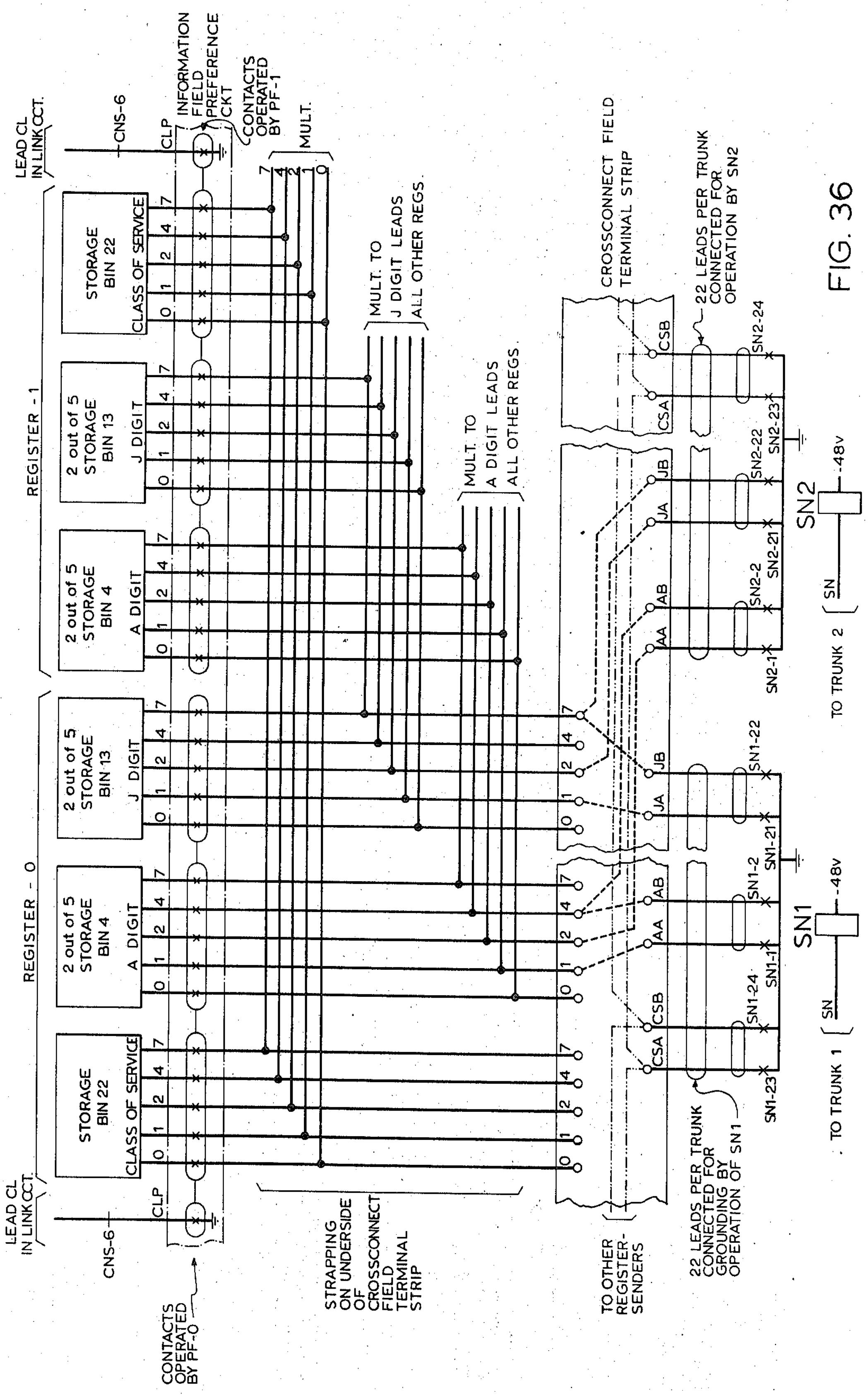

FIG. 34 shows release control circuitry;

FIG. 35 shows the control relay circuitry for the routing digit information cross-connect field; and FIG. 36 shows the routing digit information cross-connect field.

For assistance in relating the description to the drawings a relay index is included as the last two pages of the disclosure. There the relays, whose initial designations are by letter, are indexed in alphabetical order followed by the drawing on which they appear.

Optional connections, i.e. connections which are alternative or optional in the varients available, are indicated by double V's, i.e. the standard indication for a 'jack' (—<<—) in the telephone art. Such optional connections are identified nearby by indicia in a circle, thus "(EB)" indicates the "EB" option. One of the commonest options is between the circuitry for use when the inventive circuitry is assicated with a step-by-step local central office and the circuitry for use with a number 5 cross-bar local central office. Where alternative connections are provided for this situation, the optional connections associated with the connection of the inventive circuitry to a step-by-step local central office are identified as "(SX)" while the optional connections associated with a number 5 cross-bar local central office are identified as "(XB)".

Paired sets of normally open and normally closed contacts have the same contact number, with a *c* suffix (normally closed) and an *o* suffix (normally open), e.g. "contacts R1-1*o* and R1-1*c* of relay R1". Where the open contact of the pair will close before the closed contact will open, the designated 'EMB' (early make-break) is used and where the closed contact will open before the open contact will close the designation 'EBM' (early break-make)is used.

By the terms 'normally open' and 'normally closed' reference is made to the state of the contacts when the relay is released, the states of such contacts being open and closed, respectively.

The function of the elements shown is discussed in relation to the operations which take place during the completion of a call.

The relays are shown with the connection that the relay is shown as a box lettered (say) Q. The relay contacts are not shown connected to the relay but are associated therewith by the use of the same letter together with a hyphen and a subscript. Thus contacts of relay Q are Q-1, Q-2, etc. Normally closed relay contacts are shown as a transverse line across the wires they connect and normally open relay contacts are shown as an 'X' across the wires they connect.

The operation of the circuitry involves sufficient detail that it has seemed more clear to describe the operation of circuit units as they are described rather than by an overall description of operation.

Figure 1:
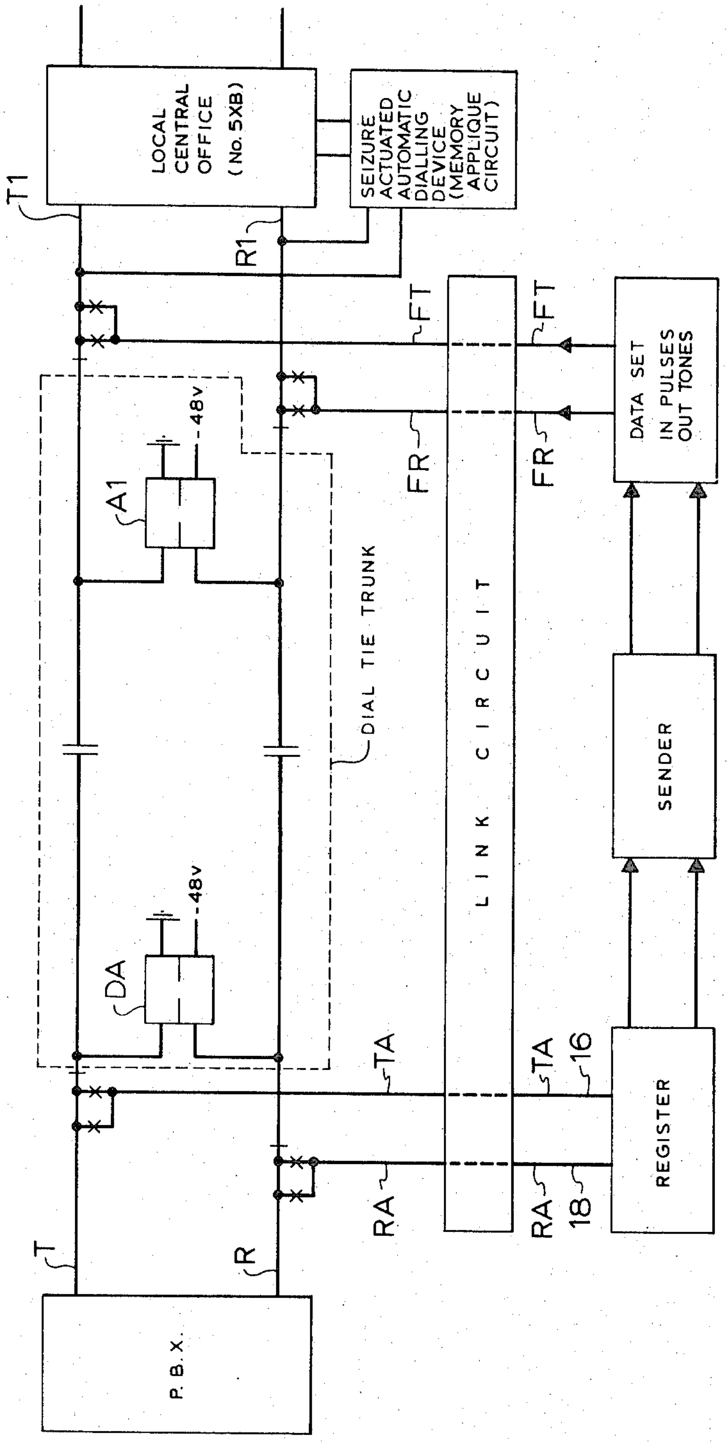
FIGS. 1 and 2 are schematic indications of the circuit arrangements between a PBX and a Local Central Office at the originating end of a call for, respectively, No. 5 Crossbar and Step-by-Step Central Office.
Figure 2:
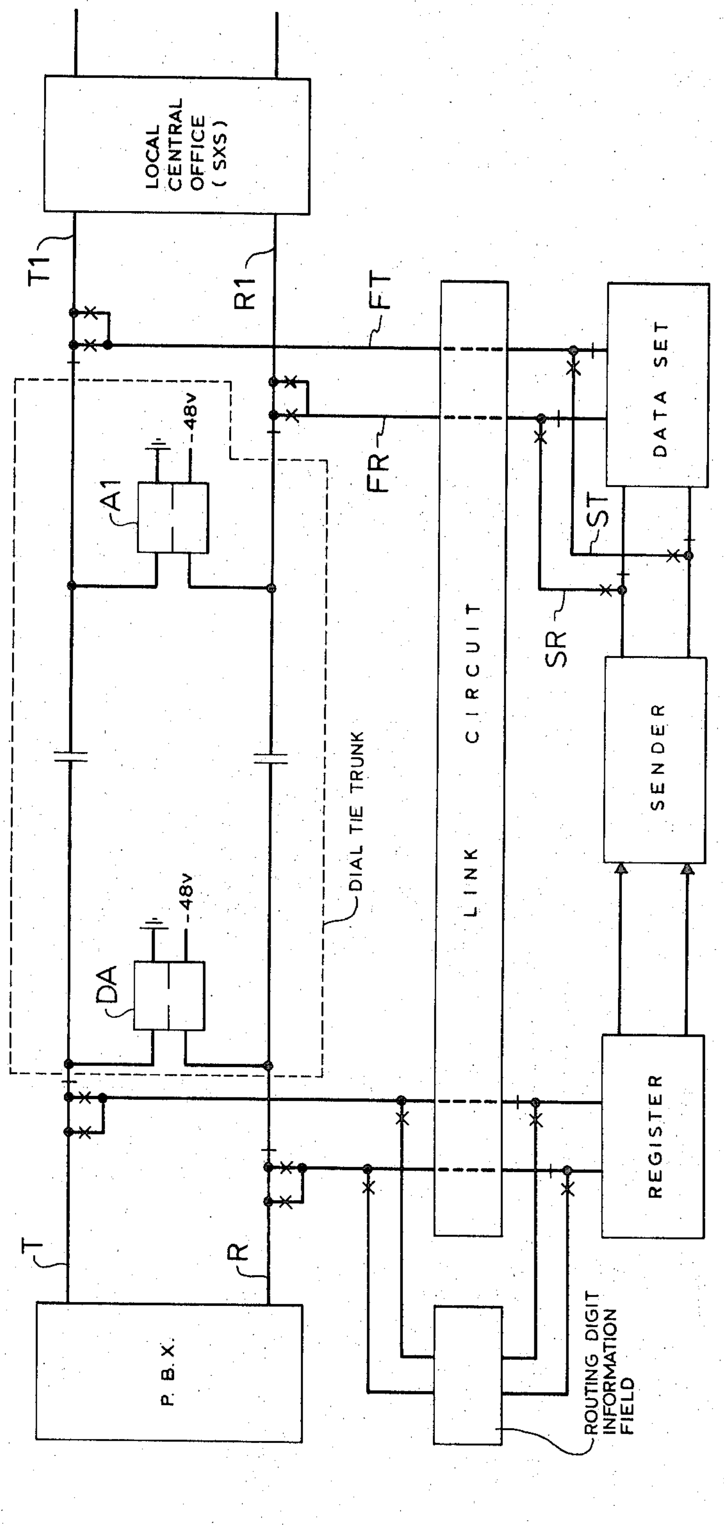
Figure 3:
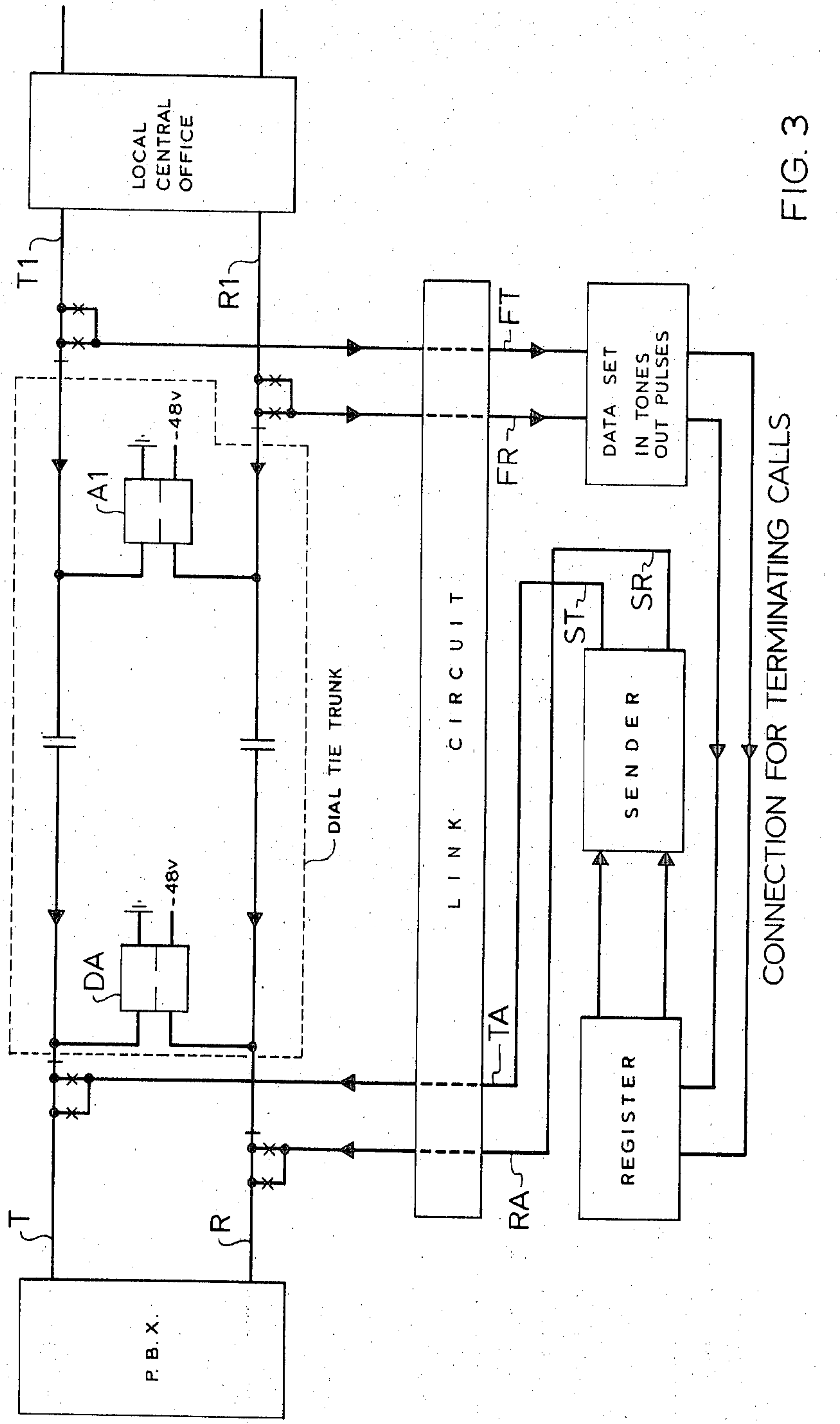
FIG. 3 is a schematic indication of the circuit arrangements between a PBX and a Local Central Office at the terminating end of a call.

The general outline of the system may best be discerned by reference to FIGS. 1 to 3. FIGS. 1 and 2 show alternate connections at the PBX and central office where a call originates and FIG. 3 shows the connection at the PBX where the call terminates. In each of FIGS. 1–3 is shown a private branch exchange ('PBX' for short) connectible to a local central office by means as shown. Connectible intermediate each PBX and the local central office is a register designed to receive dialled digital information in the form supplied by its local PBX (it will be noted that it is unlikely, but possible that the two PBX which are connected in accord with the invention; may use different signalling such as pulse, on the one hand; and touch tone, on the other hand); a sender designed, on receipt of a predetermined signal, to send the digital information stored in the register in the form which, if sent to its associated PBX would cause seizure of the PBX subset which is indicated by the digital information sent (such seizure being usually indicated by the ringing of the subset); and a data set operable in two modes (or alternatively two data sets) each respectively corresponding to one of the described modes: in the first mode the data set is adapted to convert digital information received at the input in the form which would cause subset seizure (if such digital information were supplied to the associated PBX), into tones, carrying the digital information within the voice range, appearing at its output. In the second mode, the data set is adapted to receive, at its input, tones within the frequency voice range indicative of digits and to emit, at its output, signals carrying digital information in the form in which digital information is used by its associated private branch exchange to identify and seize a subset thereof.

A data set suitable for operation as above described is commercially available from Bell Canada, 1051 Beaver Hall Hill, Montreal, Quebec, Canada, and one of the models suitable for this purpose is known as the "101A Data Set". The operation of this data set in its two alternative modes is described in Canadian Pat. No. 716,185 which issued Aug. 17, 1965 to Western Electric Company Incorporated for "Teletypewriter Subscriber Set".

The subset at which a call originates will be called the 'originating subset'. This subset is associated with a PBX and local central office connected by a trunk. These will be referred to as the 'originating': PBX,local central office and trunk, respectively. The subset receiving the call will be referred to as the 'terminating' subset and the associated circuitry as enumerated above will be referred to as the 'terminating': PBX, trunk and central office, respectively. The invention contemplates calls in either direction, hence the terms 'originating' and 'terminating' are each applicable to the same equipment with the choice dictated by the direction of a particular call.

A trunk herein sometimes referred to as a 'Dial Tie Trunk' is designed to connect the PBX with the local central office. The trunk is, however, designed so that the register-sender-data set combination may be connected in parallel with a portion thereof. Through the switching means and the design of the trunk, the local central office is alternatively connectible to the trunk either (a) through the register-sender-data set for signalling and switching; or (b) directly, for voice communication.

i. During the time that the originating dial tie trunk is achieving connection to the terminating dial tie trunk, the connection between each PBX and its local central office is through the respective register-sender-data set combination bypassing a central portion of the trunk.

ii. During a portion of the time that the situation described in the previous paragraph exists, a voice communication is provided through the trunk, bypassing the register-sender and allowing voice communication with operators and supervisors during the completion of a call.

iii. When either the originating or the terminating subsets is connected to its associated local central office the trunk is switched so that each PBX is connected with its local central office through a connection bypassing the associated register-sender-data set combination.

Associated with each dial tie trunk, are means responsive to the seizure of the originating dial tie trunk to achieve connection through the telephone system to the terminating dial tie trunk. Two of the commonly occurring types of central office are those commonly known as the No. 5 crossbar and the step-by-step. With alternative or optional designs, where required, the circuit shown in the specific embodiment is designed to operate with either type of central office. A memory circuit is actuated by the originating dial tie trunk seizure (by a somewhat different means in each case) to achieve the connection. Where the originating central office is a No. 5 crossbar, the connection is achieved independently of the originating register-sender, whereas with a step-by-step originating central office, the memory is used to achieve the connection through the operations of the originating register-sender-data set. The memory for a No. 5 crossbar office is shown as a Seizure Actuated Automatic Dialling Device and the memory for a step-by-step office is shown as a 'routing digit information field'.

FIGS. 1 and 2 show alternative arrangements for the originating end, depending on whether the originating central office is step-by-step or No. 5 crossbar, while FIG. 3 shows the arrangement at the terminating end for either type of central office (with those elements relevant only to the originating end omitted) although it will be realized that from the description that originating and terminating ends are interchangeable. The actuation of a subset, usually by operation of its hookswitch, with the necessary signalling to achieve connection out of the P.B.X. (often by dialling 9 or 0) determines the originating end, the other end being the terminating end. In accord with the circuitry of the invention, where an originating subset achieves connection to an originating trunk, the following occurs.

The transmission path through the originating dial tie trunk is broken and the PBX end of the trunk is connected to the input of the originating end register. (The output of the register will be transmitted by the sender at controlled times at both the originating and terminating ends.) The output of the sender is connected to the input of the data set which is switched for mode 1 operation (i.e. to accept a conventional dialled type signalling input and to provide a tone output). By conventional dialled type signalling input, is included dial pulsing or touch-tone signalling, being the conventional outputs of a private branch exchange with dial pulsing more common. If the local central office is No. 5 crossbar then the memory circuit at the input thereto achieves the connection to the other local central office and the output of the originating data set is connected onto this connection. If the local central office is a 'step-by-step' then the sender output originating with a memory achieves connection to the other central office, and the output of the originating data set is connected onto this connection. The memory achieves connection not only to the terminating local central office but therethrough to a terminating dial tie trunk associated therewith and seizure of this trunk breaks the direct connection between the terminating central office and the terminating PBX and connects the output of the terminating local central office to the input to the data set, which is switched in mode 2, and the output of the data set is connected to the input of the register, with the sender output connected to the terminating PBX.

Connection of the originating end PBX to the register causes dial tone to be sent from the register to the PBX subset indicating to the operator of the PBX subset that he may commence to dial. The dialled digits are stored in the register. When the originating and terminating data sets are connected through the conventional telephone system, an exchange of signals indicates to the originating end data set that signals may be transmitted. The originating data set transmits the dialled digits in the most suitable form for transmission through the connection, usually as frequency shift signals within the frequency range of the voice band, and these are received by the terminating end data set. The signals are then transformed into pulses of the dialled type and stored in the terminating register. When the terminating PBX is connected to receive the output of the terminating sender a signal is returned to the terminating end sender and the digits stored in the terminating end register are transmitted to the terminating PBX. These will be the digits necessary to achieve selection at the terminating PBX of the subset indicated by the digital information, which subset is accordingly rung. At both the originating and at the terminating end, when the sender has sent out the digital information in the register, switching is initiated to connect the respective PBX with its associated central office so that the register sender data set is by-passed by a direct voice communication. Measured rate timing for eventual billing is determined by the period between initiation when both subsets go off-hook and conclusion when one set goes back on hook.

It will be seen that with the described concept two private branch exchanges may be connected on a measured rate basis as opposed to a full period basis since a line is only required between central offices when it is to be used and where the only requirement on the dialler is that he take the necessary action to seize the outside trunk and dial the digits necessary to identify the desired subset at the other private branch exchange. Thus two private branch exchanges, which may be separated by any distance, may be connected without dedicated lines and without the placing of a long distance call or direct distance dialling. (It does not destroy the validity of digital last-mentioned point that the two tie trunks will be often connected on the lines used for direct distance dialling calls.)

It will be noted that since digital information for use by the terminating PBX (as distinct from the digital information to reach the terminating PBX) is sent by frequencies within the voice band which avoids the DC blockages inherent in most telephone switching systems. The system preferred, frequency shift signalling, does not require close tolerances as does, for example, touch tone signalling. Thus with frequency shift signalling, within the voice band, the signal may be sent over any number of trunks.

It will be noted that the two ends of the two-way dial trunk between two PBX are connected automatically, hence the shortest or most convenient connection may be preselected, and also the direct dialling network may be used.

It will be noted that the system is independent of the number of digits required for transmission to the distant PBX to reach a subset of the distant PBX, the only requirement being sufficient digit storage in the register senders.

It will thus be seen that the number of digits which may be sent with the inventive system is not limited by existing equipment or by the practical limitations on dial pulse or touch-tone signalling as previously discussed.

Thus the inventive concept, in one sense, may be considered to be the achieval of the connection between two dial tie trunks connected only when required over the conventional telephone network, storing the digits dialled at the originating end which identify the subset required at the terminating end, transmitting these over the connection made, by signals having a frequency within the voice band, converting these voice band signals into signals suitable to achieve switching at the terminating private branch exchange and transmitting these signals to the terminating private branch exchange to activate the selected subset of the other private branch exchange, and then providing a voice direct connection through the originating and terminating subsets.

It is noted that, as far as the subscriber is concerned, the operation which he must perform are exactly the same as with the prior method of connecting the PBX using a full rate tie trunk, i.e. a connection between the two PBX's which is over a dedicated line.

A further advantage in the system is that the routing is automatically determined by the originating PBX trunk seizure even though it is achieved in different ways for step-by-step and No. 5 cross-bar offices. On the other hand, the register-senders are preferably not characteristic of a particular PBX or of the connection and hence a group of registers may be available for any one of a number of PBX trunks at the same local central office for actuation by any of the PBX's operating through that local central office with each of such PBX's being paired (possibly) with a PBX at individually different remote central offices.

It will be noted that dial tone is preferably used in two locations in the circuit first to indicate to the operator of the originating PBX subset that dialling may commence and secondly, to act as an actuating signal to the sender at the terminating end to cause it to transmit digits to the terminating PBX.

GENERAL OPERATION

The operation of the device is as follows. (FIGS. 1–3)

When the user of the subset of one of the PBX achieves connection to the outside trunk (usually by dialling 9) a loop is closed at the PBX, the circuit for relay DA is closed between lines T and R and relay DA is operated, and effecting connection over means shown in detail hereinafter, of lines T and R to lines TA and RA in the link circuit. This link circuit is designed to locate an idle register sender. When this is achieved, the link circuit connects the lines TA and RA to the lines TA and RA of the register-sender-data set combination.

At the same time contacts are closed through the line circuit which act to connect lines FR and FT on the dial tie trunk circuit with the lines FR and FT in the register sender. The fact that the call originated with the PBX of FIG. 1 or 2 causes the relay DA of those figures to operate before relay A1 and results in the placing of the register-sender-data set in the transmit mode, to be described. When the sequence takes place in the opposite order, i.e. energization of relay A1 by seizure at the central office before operation of relay DA, the register-sender-data sets are placed in the receive mode as illustrated in FIG. 3.

Two alternative modes of operation at the originating end occur with the equipment in the transmit mode as illustrated in FIGS. 1 and 2.

In a step-by-step local central office (FIG. 2), the sender output (RS and TS) is initially connected to the register-sender lines FR and FT. This is because in operation with a step-by-step switchboard the call routing information is sent (by the routing digit information field) to the originating register. After the sender sends, over circuitry yet to be described, the routing information from the register to establish the connection, the connection is switched so that the output SR, ST of the sender is connected to the input of the data set, and the output of the data set is connected to the lines FR, FT. The connections provided on the seizure of the originating register-sender-data set by the originating PBX include the switching required to place the data set in the transmission mode (mode 1). In the transmission mode, the data set is designed to receive at its input, the signals in the form characteristically provided from and to the associated PBX and these will usually be dial pulses but sometimes touch tone. The output of the data set will be in the form of signals within the voice range. Although touch tone signals are within this range, frequency tolerances under the touch tone system are too small for long distance transmission and thus the data set is customarily designed to provide signals of the frequency shift type within the voice range.

At the time the link circuit connected the register-sender-data set to the trunk, switching is initiated to connect the trunk leads T1-R1 to a loop at central office.

At the time that the register-sender leads TA-RA were connected to the turnk leads TA-RA and through them, respectively, to leads T and R, a signal (usually dial tone) is sent to the subscriber indicating that dialling may commence. The subscriber, at the originating end, need dial only the digits which switch the terminating end PBX to ring its desired subset since, in accord with the invention, the connection to the other PBX is achieved independently of the subscriber.

At the time that the trunk lines T1 and R1 seize a loop at the originating end local central office, a signal is sent to the originating sender to cause the sender to send the routing digits which establish a connection through the terminating local central office to the terminating end dial tie trunk. When the routing digits have been sent by the sender, the circuitry at the originating end is switched so that the sender output lines are disconnected from the lines FR, FT and connected to the input of the data set and the output of the data set is connected to the lines FR, FT.

Where there is, at the originating end, a No. 5 crossbar central office, the seizure of the line by the PBX, causes connection of the originating end PBX to the register input of an available register-sender-data set as before. The link circuit however connects the output of the data set to lines FT and FR since the connection to the other local central office is independently established. The seizure of the trunk by the local PBX subset causes a memory applique circuit and a sender associated therewith, (different from the register actuated sender) to provide to the central office, a signal in dial pulse or touch tone (as required by the local central office) to establish the connection through the terminating central office to the terminating dial tie trunk. (FIG. 1)

Establishment of the connection to the terminating PBX trunk at the terminating end operates relay A1 before relay DA causes the connection of lines T1, R1, respectively, to FT, FR and the link circuit at the remote end to connect the lines FT, FR of the trunk to the lines FT, FR of an available register sender data set, and the latter FR, FT leads to the input of a data set switched to operate in mode 2. While connecting the trunk and register-sender-data set leads, the link circuit simultaneously connects the TA, RA leads of the same elements. The connection to FR, FT of the trunk is through a closed loop and the connection to TA, RA, is not, and the circuitry of the register-sender data set is designed to switch the register-sender-data set combination into the receive mode. This involves connecting the terminating end data set in mode 2 (receiving) and the lines FR, FT to the input thereof, connecting the output of the data set to the input of the register, and connecting the sender to lines TA and RA, of the trunk. (FIG. 3)

When lines T1-R1 are connected to the data set input, the originating and terminating end data sets, now connected, exchange tones (in a manner well known and described in Canadian Pat. No. 716,185). This is used to cause a signal to be sent to the originating end sender, to cause it to send via the originating end data set to the terminating end data set, the digital information stored in the originating end register. When this has been sent, the register-sender-data set at the originating end disconnects itself from the line and a voice path is provided through the dial tie trunk, bypassing these connections.

The information received by the terminating end data set is stored in the terminating register. When the lines TA and RA are connected to lines T and R in the PBX trunk, a signal is sent causing the terminating sender to send the information stored in the terminating register to the PBX.

When all the information stored in the terminating end register is sent, the terminating end register-sender-data set is disconnected and the terminating central office is connected to the terminating PBX by a line bypassing the register-sender-data set.

The Canadian Patent disclosing the design of a data set, and the interconnection of a pair of these is No. 716,185 which issued Aug. 17, 1965 to Western Electric Company, Incorporated.

DIAL TIE TRUNK

The circuits shown in the descriptions of the dial tie trunk are as indicated and the relay contacts are shown in their position when no call is either in progress nor being initiated, in other words, the elements are all shown in their normal position when not in use. Paired sets of normally open and normally closed contacts have the same contact number, with a *c* suffix (normally closed) and an *o* suffix (normally open), e. g. "contacts R1-1*o* and R1-1*c* of relay R1". Where the open contact of the pair will close before the closed contact will open, the designated 'EMB' (early make-break) is used and where the closed contact will open before the open contact will close the designation 'EBM' (early break-make) is used.

By the terms 'normally open' and 'normally closed' reference is made to the state of the contacts when the relay is released, the states of such contacts being open and closed, respectively.

The function of the elements shown is discussed in relation to the operations which take place during the completion of a call.

The relays are shown with the connection that the relay is shown as a box lettered (say) Q. The relay contacts are not shown connected to the relay but are associated therewith by the use of the same letter together with a hyphen and a subscript. Thus contacts of relay Q are Q-1, Q-2, etc. Normally closed relay contacts are shown as a transverse line across the wires they connect and normally open relay contacts are shown as an X across the wires they connect.

The character and connection of the elements is as shown in the drawings. The operation of the dial tie trunk elements at the originating end during a successfully completed call, is as follows (see initially FIG. 4).

As previously noted, the PBX trunk represented by lines T and R represents the outgoing and incoming communication line between the PBX and its associated dial tie trunk which is to be described. In the case of each PBX there will be a method whereby the subscriber (the term is intended to include any user of a subset) at a subset may seize a PBX trunk (usually by dialing a single digit (say) 9 or 0), however, alternating seizure could be achieved through an operator. The methods of seizure of lines T and R by a subset of the PBX are well known to those skilled in the art and form no part of the present invention.

When the trunk is seized by a calling subscriber the PBX closed a circuit across lines T and R, relay DA will operate under its associated battery.

Figure 4:
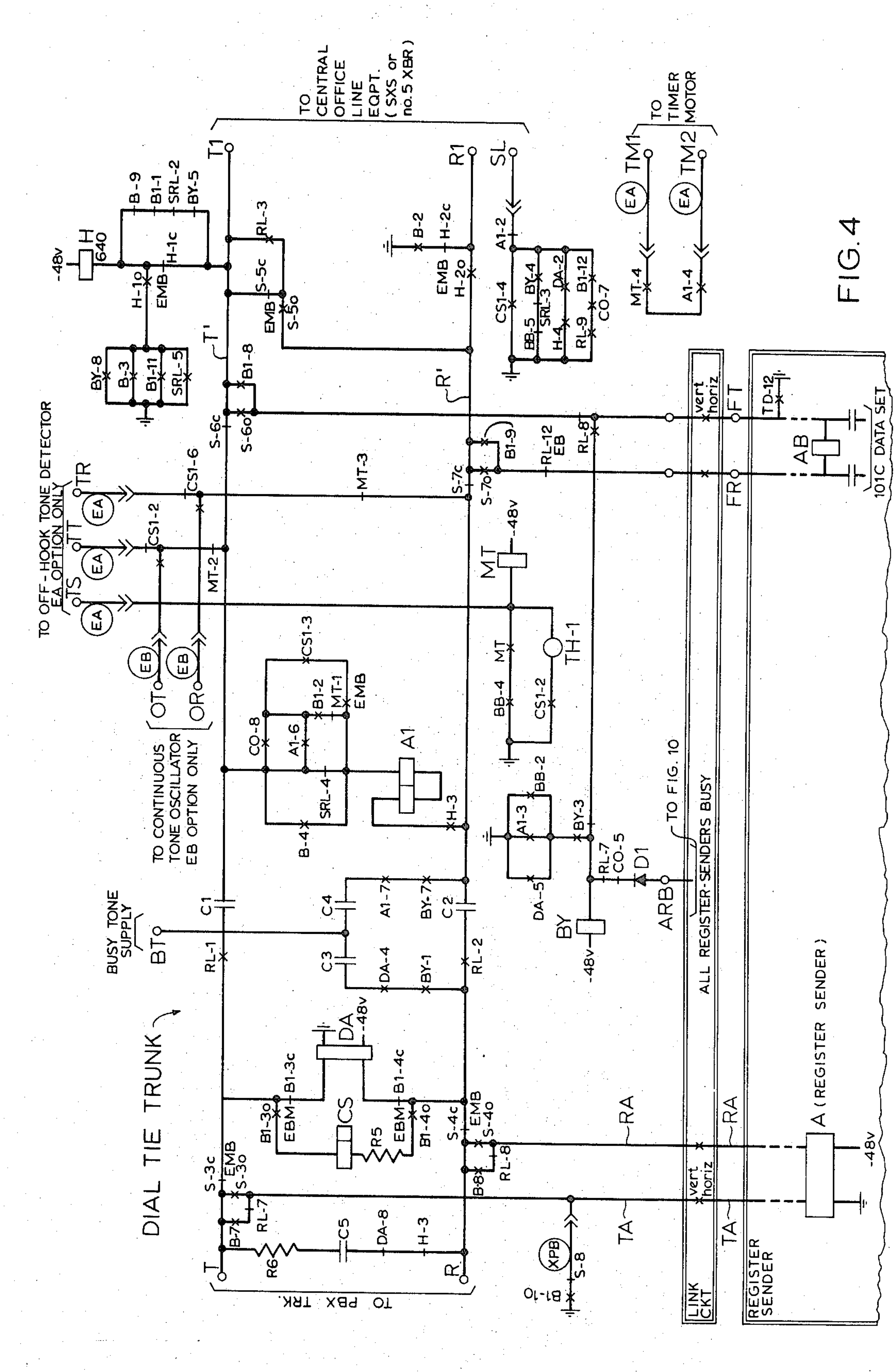
FIG. 4 shows the dial tie trunk and the connections thereto.
Figure 5:
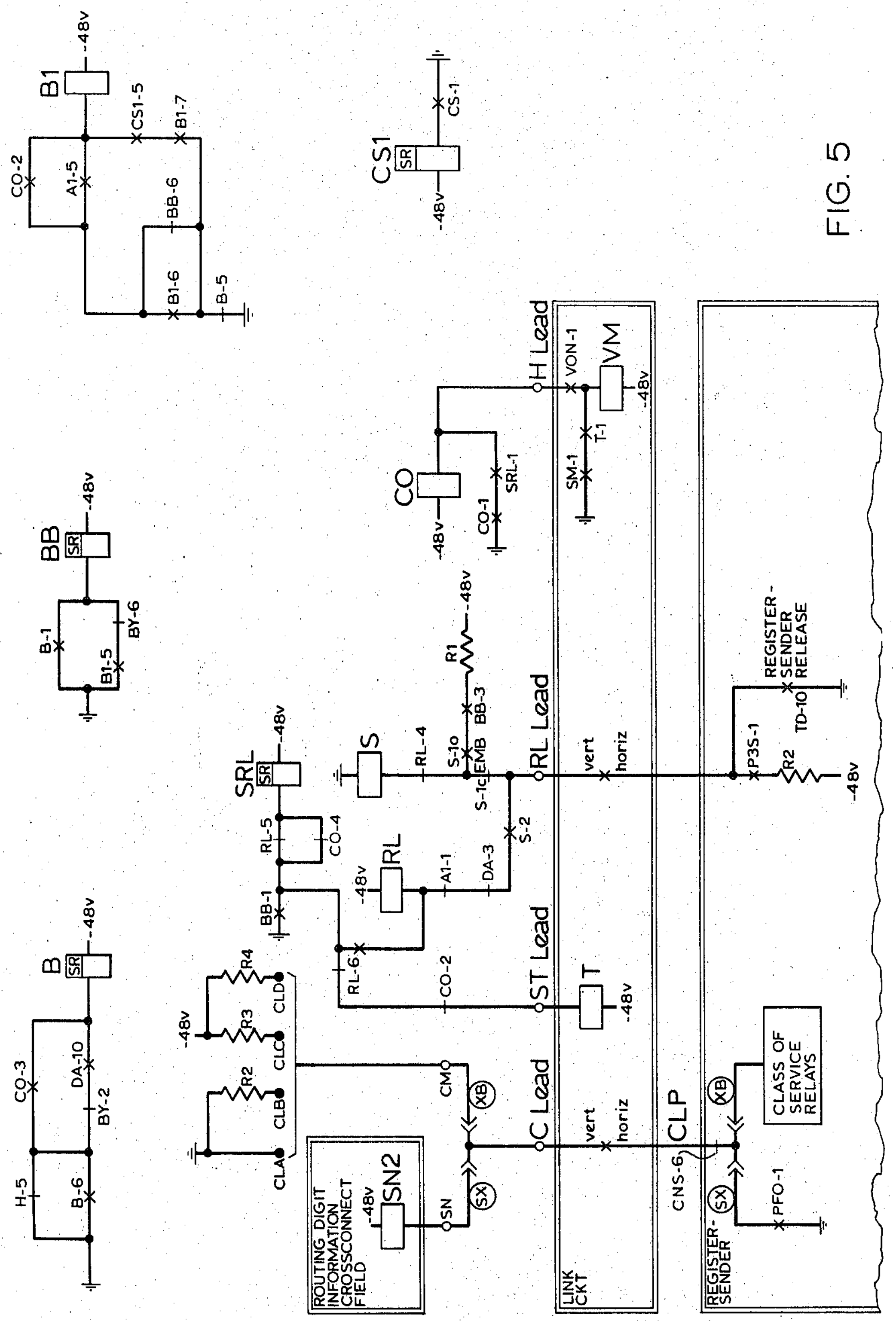
FIG. 5 shows relay connections for operation with the circuitry of FIG. 4.
Figure 6:
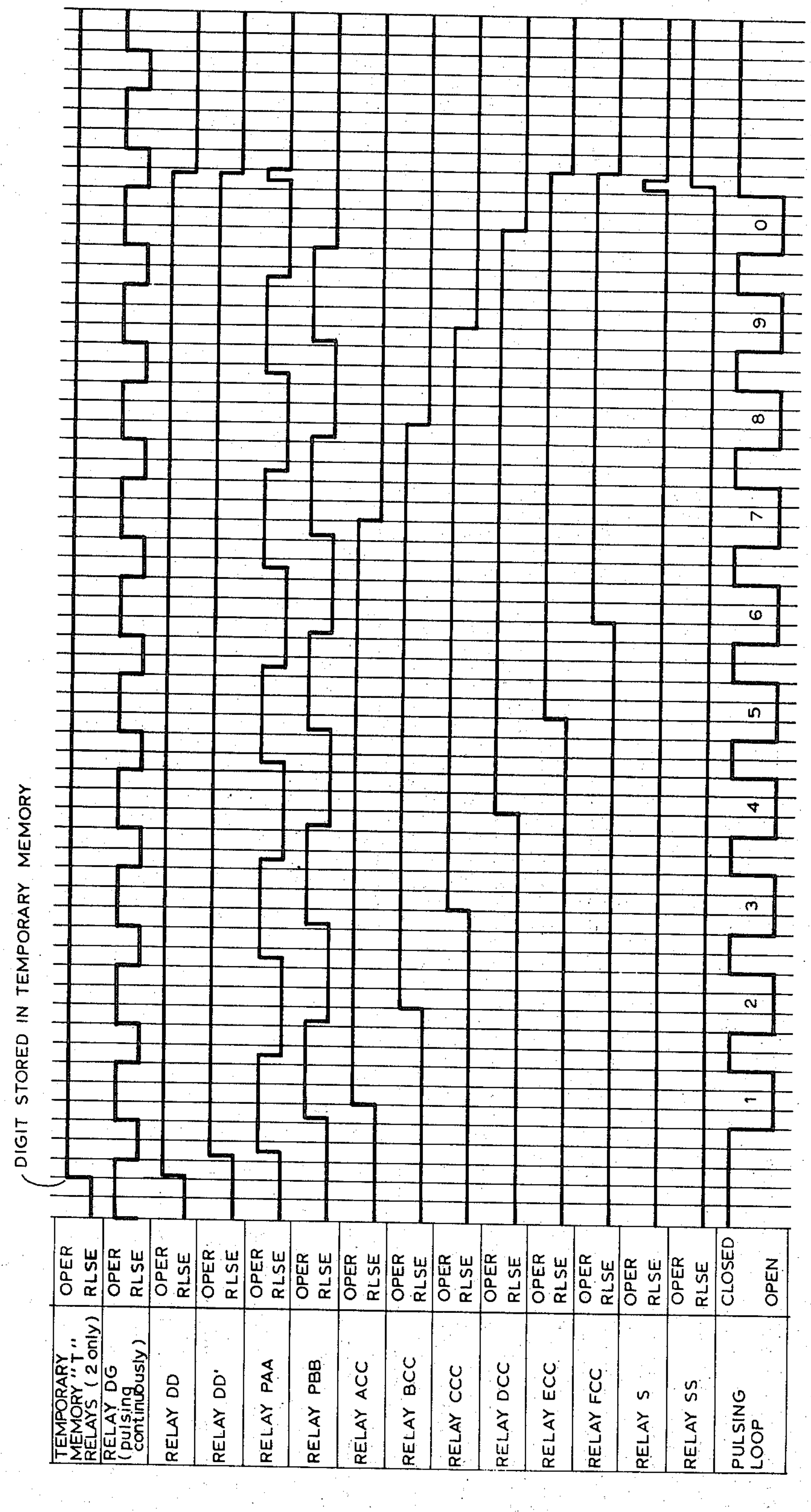
FIG. 6 is a graph showing the operation of relays in the register-sender during out-pulsing.

Relay DA operated:

i. operates relay B through the closure of contacts DA-10; (FIG. 5)

ii. prepares the ground path on the lead SL by the closure of contacts DA-2; (FIG. 4)

iii. provides a break path in the operate path (FIG. 5) to relay RL by the opening of contacts DA-3;

iv. prepares a path for the transmission of busy tone to the calling subscriber, in the event that relay BY operates, by closing contacts DA-4;

(busy tone is supplied, by providing a source of a type well known to those skilled in the art connected to line BT)

v. provides a locking path for relay BY if required by the closure of contacts DA-5. (FIG. 4)

Relay B operated:

i. operates relay BB due to the closure of contacts B-1; (FIG. 5)

ii. grounds the R1 lead through the closure of contacts B-2 which signals central office to seize a line circuit (by means not shown but well known to those skilled in the art); (FIG. 4)

iii. provides a locking path for relay H (when operated) by the closure of the contacts B-3;

iv. prepares to place relay A1 across the outgoing loop, when relay H operates, by closing contacts B-4;

v. prevents relay B1 from operating by opening contacts B-5; (FIG.5)

vi. provides an alternate holding path for itself under control of relays DA or CO by closing contacts B-6;

vii. connects the T and R leads from the PBX to the TA and RA leads to the register-sender by the closure of contacts B-7 and B-8 respectively; (FIG. 4)

viii. breaks a multiple of the path from the windings of relay H to the T1 lead by opening contacts B-9.

Relay BB operated:

i. places a ground on the ST lead to the link circuit, by closing contacts BB-1 as a signal to seize an idle register-sender; (FIG. 5)

ii. operates relay SRL by the closing of contacts BB-1;

iii. provides a locking path for relay BY (if required) by the closure of contacts BB-2; (FIG. 4)

iv. provides locking paths for relays RL, S and MT (when operated) by the closure of contacts BB-1, BB-3 and BB-4 respectively; (FIG. 4 and 5)

v. breaks one possible path for placing ground on the SL lead, by opening contacts BB-5 in the event that relay BY operates. (FIG. 4)

Relay SRL operated:

i. provides a locking path for relay CO (when operated) by closing contacts SRL-1; (FIG. 5)

ii. provides a further break in the path from the windings of relay H to the T1 lead, by opening the contacts SRL-2; (FIG. 4)
iii. provides a further break in the path for placing ground on the SL lead, by opening contacts SRL-3, in the event that relay BY operates;
iv. places a break in one of the multiple paths to place relay A1 across the trunk lines by opening contacts SRL-4; this path is now controlled by relays B and H;
v. provides a locking path for relay H, when operated, by closing contacts SRL-5;
vi. prepares a locking path for the hold (vertical VM) magnet of the link cross bar switch when relay CO operates. (FIG. 5)

When the line circuit is seized at the associated local central office, ground is placed on the T1 lead by the equipment, at the local central office, (in accord with technique well known to those skilled in the art). This ground will operate relay H. Dial tone will be sent from the local central office along lines T1 and R1 but this will not be heard by the subscriber since contacts RL-1 and RL-2 are open. (FIG. 4)

Relay H operated:
i. removes ground from lead R1 by opening contacts H-2*c* and the same time closes contacts H-2*o* (it will be noted that the two sets of contacts which open the ground lead and complete the connection of R1 to the line R1 are respectively denoted H-2*c* to denote a normally closed contact of a pair and H-2*o* to denote a normally open contact of a pair and that the designation "EMB" adjacent these contacts as in other places in the application and in the drawings stands for "early make break" and starting from either the operated or unoperated state of the relay, implies that the then open contacts will close before the then closed contacts will open so that in either direction of operation or re-operation there is a contemporaneous period of closure. The designation "EBM" is to the opposite effect and implies, in either state of a relay, that the closed contacts of a pair will open before the then open contacts will close.
ii. completes the path for connecting relay A1 across the outgoing loop by closing contacts H-3. Relay A1 operates. This causes the seizure of the outgoing loop to the central office;
iii. prepares a path for placing ground on the SL lead by closing contacts H-4;
iv. removes itself from lead T1 by opening contacts H-1*c* of the early make break pair H-1*c*, H-1*o;*
v. locks to a multiple holding path by the closure of contacts of H-1*o*, the holding path consisting of any one of contacts B-3, B1-11, SRL-5 or BY-8.
vi. breaks the original operating path for relay B by opening contacts H-5. It will be noted however that relay B remains operated over an alternate locking path.

Relay A1 operated:
i. further breaks the operating path for relay RL by opening contacts A1-1; (FIG. 5)
ii. breaks all possible paths for grounding the SL lead by opening contacts A1-2; (FIG. 4)
iii. provides a locking path for relay BY (if required) by closing contacts A1-3.
iv. prepares a loop to close a circuit in the timer motor by closing contacts A1-4 (this circuit will be finally closed by contacts MT-4 shown in the same circuit if timer is at the originating end).

At the same time as a line circuit is being seized at the local central office, (through the grounding of the R1 lead and the subsequent central office and described relay operations), the link circuit is in the process of attaching an idle register-sender to the trunk.

The circuitry designed in accord with the invention assumes that there are associated with a central office, a plurality of dial tie trunks each associated (or paired with) a dial tie trunk at a different central office. Preferably a lesser number than said plurality of register-senders is associated with the same central office so that the smaller number of register-senders may serve the larger number of dial tie trunks. With such preferred arrangement the link circuit is required to connect any dial tie trunk requesting service with any register-sender not being used. For the purposes of explaining the link circuit, there will be considered to be two register-sender designated '0' and '1' and three trunk circuits designated '1', '2', and '3'. These designations will only be of real relevance with the link circuit since in most other references to the register sender or to the dial tie trunk, only one will be described.

Figures 10, 11:
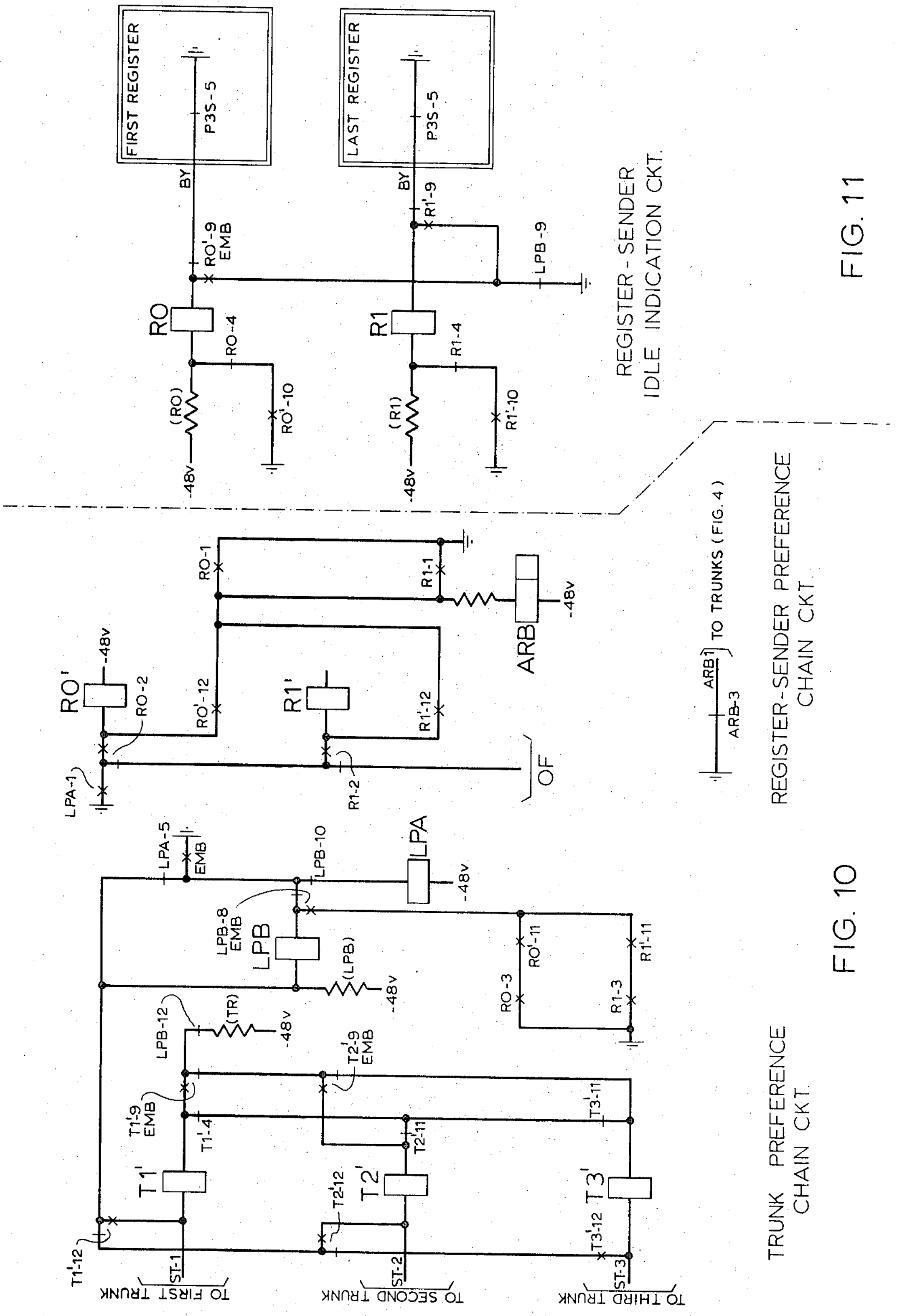
FIG. 10 shows the trunk preference chain circuit and the register-sender preference chain circuit forming part of the link circuit.
FIG. 11 shows the register-sender idle indication circuit.
Figure 12:
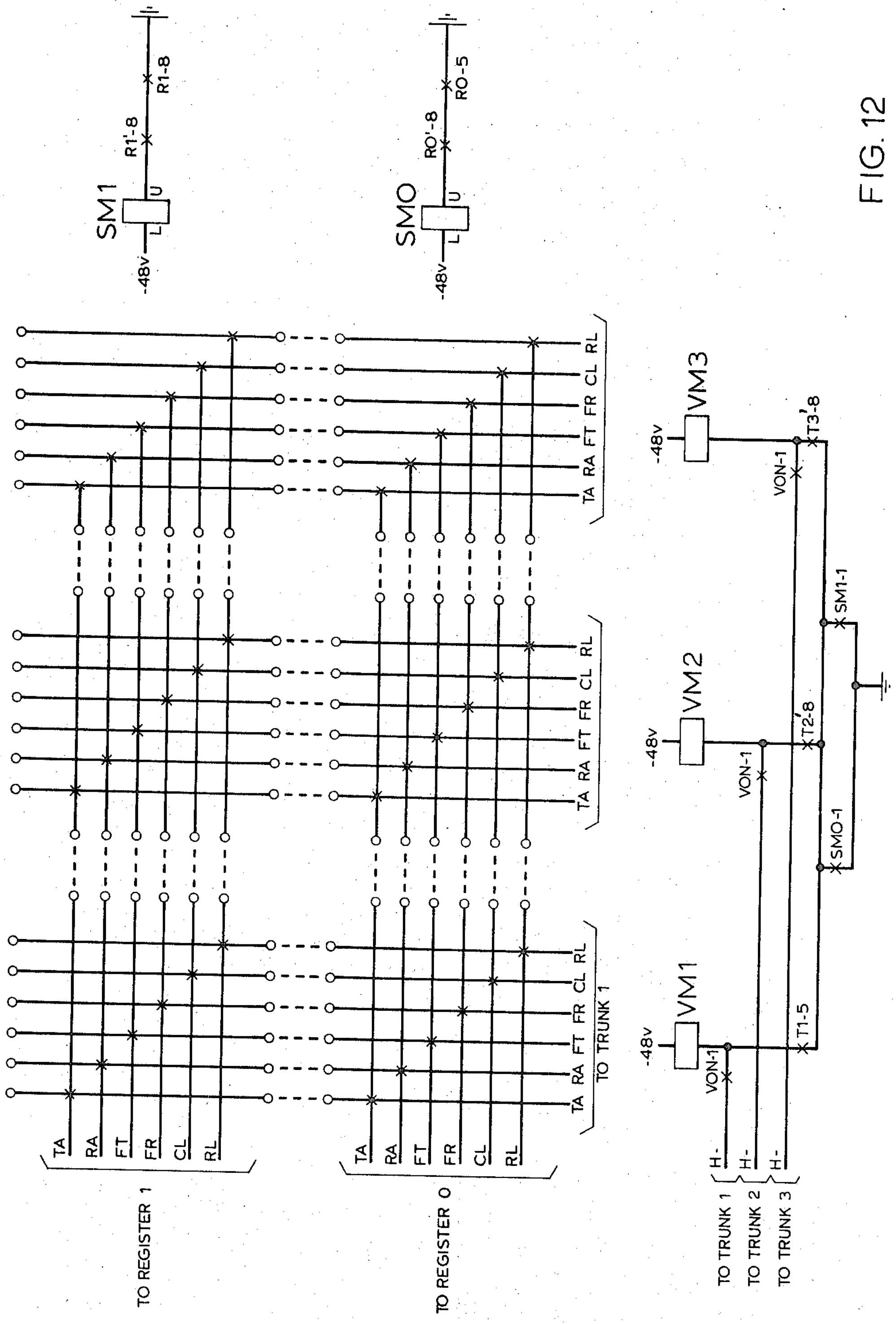
FIG. 12 shows the main circuitry of the link circuit.

The ground on the ST lead to the link circuit provided by contacts BB-1 closing will operate a T relay in the link preference chain, (FIG. 10 and FIG. 5). This will be followed by the closure of the corresponding contacts T-12*o* in the register-sender line circuit, operating relay LPA. Relay LPA will operate one of the relays RO′ or R1′ (FIG. 10) corresponding to the register-sender 0 and 1 respectively. Operation of the relay RO′ or R1′ operates the corresponding -10 contacts. (FIG. 11) Operation of the relay RO′, R1′ means that the corresponding crossbar switch select magnet SMO or SM1 (FIG. 12) is operated. Closure of the T relay and the appropriate -7 contact of a select magnet SM operates the corresponding crossbar switch vertical magnet VM (FIG. 12). Thus a register-sender is connected through the link circuit connecting, as indicated in FIG. 12 the leads TA, RA, FT, FR, CL and RL of the seized register-sender to the correspondingly designated leads of the dial tie trunk. When the vertical magnet closes, the off-normal springs (VON) close in accord with the well known design of a cross-bar switch, place a ground on the H lead FIG. 5 over the closed contacts T-1 and SM-1 to operate relay CO which locks over CO-1 under the control of SRL through contacts SRL-1. This same locking ground will be passed on the H lead towards the link circuit, to hold vertical magnet VM operated after the original operating ground has disappeared.

Relay CO operated:
i. removes ground from the ST lead to the link by operating contacts CO-2; this releases the T relay in the preference circuit;
ii. locks under the control of relay SRL by the closure of contacts CO-1;
iii. provides a ground, via the closed contacts SRL-1 of relay SRL through the closure of contacts CO-1 to the H lead and hence, offers a ground to the link circuit for the purposes of holding the vertical magnet of the link cross-bar switch operated;

iv. provides a path to keep relay B operated by the closure of contacts CO-3, after relay A releases, at the time the pulsing path is transferred to the register-sender;
v. breaks one of the two holding paths for relay SRL by opening the contacts CO-4;
vi. provides a break in the ARB lead so that an all register-sender busy condition occurring after a register-sender has been seized will not affect completion of the call (FIG. 4).

Relay DA in the dial tie trunk and relay A in the register-sender are now connected in parallel across the T and R leads. Both relays will be operated. Register-sender relay A operated will operate relays P, P3 and P3S, also in the register-sender and as described in connection therewith. This will connect the resistance battery shown to the RL lead to operate relay S in the trunk. (FIG. 5)

Relay S operated:
i. will lock under control of relay BB operated, relay RL released through the closure of contacts S-1*o* of an early make-break contact pair;
ii. will remove itself from the RL lead through the opening of contacts S-1*c* of the same early make-break contact pair;
iii. will prepare for the connection from relay RL to the RL lead by the closure of contacts S-2;
iv. disconnects trunk relay DA from PBX leads T and R by the opening of contacts S-3*c* of an early make-break contact pair and opening contacts S-4*c* of an early make-break contact pair (FIG. 4);
v. provides a multiple path from PBX leads T and R to register-sender relay A by the closure of contacts S-3*o* and S-4*o* respectively of the early make-break pair just mentioned; relay DA in the trunk releases due to the opening of contacts of S-3*c* or S-4*c*(FIG. 4); this does not affect operation of relay B which remains operated through the closed contacts CO-3 and B-6;
vi. transfers leads T1 - R1 from the A1 relay to leads FT and FR respectively due to the opening of contacts S-6*c* and S-7*c* and the closing of contacts S-6*o* and S-7*o* respectively; while this is occuring early make-break contact set S-5*c* (opening) and S-5*o* (closing) will provide a momentary short across leads T1 and R1; this insures continuity in the holding of the line circuit during the period in which the T1 and R1 leads are being switched to the holding loop in the register-sender represented here by leads FT and FR respectively; as a result of the opening of contacts S-6*c* and S-7*c*, relay A1 in the trunk will release; as a result of the closing of contacts S-6*o* and S-7*o* relay AB in the register-sender will operate.

Relay A1 releasing will have no effect on trunk operation.

The seizure operations for the originating register-sender-data set have now been completed. The register-sender will return dial tone to the calling subscriber, on the operation of register-sender relay AS described in connection with the register-sender. (The switching between the register-sender and data set will be described in the section devoted to these matters). On receipt of the dial tone the subscriber may commence dialing. The call will be setup as described in connection with the register sender.

The foregoing description assumes that at the time of seizure of the trunk leads T and R by the originating PBX, there is a register-sender-data set combination available for location and connection by the link circuit. However if all register-sender-data set combinations to which the link circuit has access, are busy, then the link circuit, as herein elsewhere described, will place a ground on lead ARB. This will operate relay BY through diode D1, contacts CO-5, contacts RL-7, relay BY and -48V.

Operation of relay BY:
i. prepares its own locking path by closing contacts BY-3*o* under control of contacts DA-5 when relay DA is operated;
ii. prepares to place busy tone on the line under control of contacts DA-4 when relay DA is operated, by closing contacts BY-1;
iii. prevents relay B from operating by opening contacts BY-2; (FIG. 5)
iv. prevents relay BB from operating, by opening contacts BY-6 if the trunk is seized on a terminating call;
v. places ground on lead SL by closing contacts BY-4 to make trunk busy on terminating calls (SL option). (FIG. 4)

Thus if the trunk is seized by an originating call, relay DA will operate and the calling subscriber will receive busy tone. On such originating call, relay DA operated, will operate to complete the locking path for relay BY to close contacts DA-5 until the originating caller (by hanging up) causes the originating PBX to release the trunk. Since relay B is prevented from operating, relay A1 is not placed across the T1 and R1 leads. Thus no attempt will be made to seize the line circuit in the central office. Relay BB will not operate and hence a ground will not appear on the ST lead to the link circuit since contacts BB-1 remain open. The trunk circuit will remain in this condition until the calling party releases. Thus a register-sender becoming idle during the period in which the trunk is seized will have no effect on the operatioon of the trunk.

Operation of Dial Tie Trunk at terminating end on successfully completed calls:

Before the operations described herein take place, the seizure of the originating end Dial Tie Trunk and the automatic routing equipment has resulted in the establishment of a connection between the two local central offices and the extension of this connection to originating end leads FR and TR and, referring again to FIG. 4, extension of the connection at the terminating end from the local central office to leads T1 and R1. (One of the advantages of the preferred embodiment of the invention is the fact that the same circuitry may be used at either the originating or the terminating end). Hence the figures used to describe originating end operation will now be used to describe the terminating end operation. Discussion of Dial Tie Trunk elements will, hereafter, therefore, refer to terminating end elements unless otherwise specified.

In seizing, by the terminating local central office of the leads T1 and R1, the central office, in a manner well known to those skilled in the art, will place ground on the T1 lead operating relay H over contacts B-9, B1-1, SRL-2, BY-5.

Relay H operated:
i. closes relay A1 across leads T1 and R1 due to the closing of contacts H-3; the ringing current, which is automatically applied, when central office seizes T1 and R1, is automatically terminated by the operation of a relay (not shown) at the local central office, the relay being actuated by the closure of a loop through A1 by the closure of contacts H-3;

ii. relay H prepares to lock itself to a multiple holding path consisting of contacts B-3, B1-11, SRL-5, or BY-8 by the closure of contacts H-1*o*, followed shortly after by the opening of contacts H-1*c* of the same early make-break pair:

iii. prepares to remove itself from lead T-1 (by the opening of contacts H-1*c*) when any of relays B, B1, SRL or BY operate;

iv. opens the operate path for relay B by opening contacts H-5 (FIG. 5);

Relay A1 operated:

i. operates relay B1 by the closure of contacts A1-5 (FIG. 5);

ii. prepares an alternate holding path for itself by the closure of contacts A1-6 so that it will not release when contacts SRL-4 open;

iii. prepares to send busy tone to the calling subscriber in the event that relay BY operates by closing contacts A1-7; (FIG. 4)

iv. prepares a locking path for relay BY if and when the relay operates, by closing contacts A1-3;

v. breaks all possible paths for grounding the SL lead, by opening contacts A1-2.

Relay B1 operated:

i. removes relay DA from across leads T and R by opening contacts B1-3*c* and B1-4*c* each from an early break-make pair;

ii. places polar relay CS across leads T and R to seize (i.e. close the circuit for) the PBX trunk by closing contacts B1-3*o* and B1-4*o;* the polar relay, although it closes the loop for the PBX trunk, is wired so that it is in its released state even with the circuit closed; at a later time, (when the called party answers) the PBX trunk reverses the polarity and the reversed current operates the relay;

iii. operates relay BB by the closing of contacts B1-5 (FIG. 5);

iv. due to the closing of contacts B1-6 and B1-7 locks itself under control of relay B and (any of CO, A1, or CS1);

v. completes an alternate holding path for relay A1 on closing contacts B1-2 (FIG. 4);

vi. removes the connection between relay H and lead T1 by opening contacts B1-1; and provides a locking ground for relay H by closing the contacts B1-11; (contacts B1-11 are 'early-make' contacts to ensure that relay H is held before contacts B1-1 break ).

vii. connects leads T1 - R1 to leads FR and FT respectively by the closing of contacts B1-9 and B1-8, respectively;

viii. connects ground to the TA lead by closing contacts B1-10 if common control PBX is provided.

The operation of the relay Z in the register-sender hereinafter described, is the signal to the register-sender that the call is completing to a common control PBX. This tells the register-sender to await dial tone from the PBX before out-pulsing the stored digits.

Relay BB operated:

i. provides a locking path for relay BY if required by closing contacts BB-2;

ii. provides a locking path or paths for relays RL, S and MT, when operated, by closing, respectively, contacts BB-1, BB-3 and BB-4;

iii. breaks one possible path for placing a ground on the SL lead, in the event that relay BY operates, by opening contacts BB-5;

iv. places a ground on the ST lead to the link circuit by closing contacts BB-1, as a signal to seize an idle register-sender;

v. operates relay SRL by closing contacts BB-1.

Relay SRL operated:

i. provides a locking path for relay CO, when operated, by closing contacts SRL-1;

ii. further breaks a multiple path from the windings of relay H to the T1 lead by opening contacts SRL-2;

iii. provides a further break in the path for placing ground on the SL lead, in the event that relay BY operates, by opening contacts SRL-3;

iv. breaks one of the multiple paths that place relay A1 across the line by opening contacts SRL-4;

v. provides a locking path for relay H by closing contacts SRL-5;

vi. prepares a locking path for the hold (vertical -VM) magnet of the link cross-bar switch when relay CO operates, by closing contacts SRL-1.

The ground on the ST lead by contacts BB-1 to the link circuit will operate a T relay in the link preference chain, as hereinafter described. Also, as hereinafter described, this will be followed by operation of the select (SM) magnet and hold (vertical -VM) magnet in the link cross-bar switch. This effects the connection of a register-sender-data set to the trunk. When the vertical magnet closes, the off-normal springs (VON) close contacts VON-1 and will place a ground on the H lead due to the closure of contacts T-1 of the relay T and contacts SM-1 of the select (SM) magnet. Relay CO in the trunk circuit will operate over VON-1, T-1 and SM-1 and lock under the control of relay SRL-1 due the closure of contacts CO-1. The same operating ground will be passed on the H lead, towards the link circuit, to hold the vertical magnet operated after the original operating ground disappears (as described in connection with the link circuit).

Relay CO operated:

i. removes ground from the ST lead to the link circuit, by opening contacts CO-2; this, as hereinafter described, will release the T-relay in the link preference circuit;

ii. locks under control of relay SRL by the closure of contacts CO-1;

iii. completes a locking path for the hold (vertical -VM) magnet of the link crossbar switch, over SRL-1 and CO-1;

iv. provides a path, over CO-2, to keep relay B1 operated after contacts A1-5 open due to A1 releasing when the pulsing path is transferred to the register-sender-data set;

v. breaks one of two holding paths for relay SRL by opening contacts CO-4;

vi. prepares a ground path for the SL lead by closing contacts CO-7;

vii. provides a break in the ARB lead, by opening contacts CO-5 so that a condition where all register-senders are busy occuring after the seizure of a register-sender-data set by the subject trunk creating a signal on the ARB leads of trunk circuits equivalent thereto, will not appear on the ARB lead of the subject circuit;

viii. prepares an alternate operating path for relay A1 by closing contacts CO-8 so tht relay A1 may reoperate after the transmission path has been shifted from the trunk to the register-sender and back again.

The vertical magnet of the crossbar switch, as hereinafter described, operates at a time when relay A1 in the trunk and relay AB in the register-sender-data set were connected in parallel across the T1 and R1 leads. Relay A1 was operated and relay AB is operated at the time of seizure of the register-sender-data set. Relay AB operated causes, as hereinafter described, the operation of relays P2, P3 and P3S in the register-sender-data set. Such operation will, through the closing of contacts P3S-1 in series with resistance R2 connect a battery, negatively connected, as shown, to operate relay S in the trunk circuit.

Relay S operated:

i. will lock under control of relay BB operated and relay RL released (over contacts RL-4, S-1*o*, and BB-3);

ii. removes itself from the RL lead by the opening of contacts S-1*c;* iii. will prepare to connect relay RL to the RL lead by closing contacts S-2;

iv. disconnects relay CS from leads T and R by opening contacts S-3*c* and S-4*c* and connects leads T and R to leads TA and RA by closing contacts S-3*o* and S-4*o;* v. disconnects relay A1 from across leads T1 and R1 by opening contacts S-6*c* and S-7*c;* relay A1 releases to connect the RL relay to the RL lead across contacts A1-1;

vi. if common control PBX option is used, removes ground from the TA lead by opening contacts S-8.

The seizure functions (in the Dial Tie Trunk) for the register-sender are thus completed. When the signals carrying subscriber-dialed digits are provided across lines T1 - R1 these are received at the seized register-sender-data set.

When the register-sender at each of the originating and terminating ends has completed its functions, as hereinafter described, it will place ground on the RL lead. The register-sender release cycle will be as described in connection with the normal register-sender release at the originating end. Ground on the RL lead will operate relay RL to release relay S by opening contacts RL-4; relay SRL by opening contacts RL-5 and the register-sender relay AB by opening contacts RL-8*c* and RL-12. The release of relay SRL will release relay CO by the opening of contacts SRL-1 and by the opening of the same contacts will release the hold (vertical -VM) magnet in the link. When relay CO releases relay SRL will reoperate over contacts CO-4. (At the time that relay RL operated it closed contacts RL-6*o* and opened contacts RL-6*c* in the line to the link T relay). The register-sender is now completely disassociated from the trunk. The calling party will await answer fromm the terminating end.

When the called party answers, the polarity of battery and ground on leads T and R (FIG. 4) will be reversed from the PBX trunk. Polar relay CS will now operate. Relay CS1 is thus operated over contacts CS-1. Relay CS1 operating operates relay MT over contacts CS1-2. Relay MT operating transfers the operating path of relay A1 from the closed contacts of relay B1 (by opening contacts MT-1*c*) to the closed contact of relay CS1 (by closing contacts MT-1*o*).

At both the originating and terminating ends; with relay RL operated and the register-sender-data set disconnected, it will be seen from FIG. 4 that a complete communication path is established through the trunk for the voice conversations (or other form of communication) between the now-connected sub-sets.

It will now be discussed the release of the Dial Tie Trunk. When the calling subscriber (at the originating end) disconnects the following will occur at the originating end;

when the calling subscriber disconnects, relay A restores to release relay B; relay B released:

i. restores slow to release relay BB by opening contacts B-1.

ii. disconnects relay A1 from across leads T1 and R1, by opening contacts B-4; the outgoing loop is now opened; this signals the central office switching equipment that the calling subscriber has released;

iii. opens one of two parallel holding paths for relay H by opening contacts B-3 so that relay H will now be under control of relay SRL;

iv. prepares to reconnect relay H to lead T1 when relay SRL releases, by closing contact B-9; relay A1 relay will open the loop to the timer motor in the event that the timer is at the originating end.

Relay BB releasing:

i. releases relays RL by opening contacts BB-1;

ii. releases slow-to-release relay SRL by opening contacts BB-1;

iii. releases relay MT by opening contacts BB-4; relay SRL releasing releases relay H by opening contacts SRL-5; the trunk is now normal.

The following will then occur at the terminating end. The connections between lines T1 and R1 ar broken at the terminating central office releasing terminating relay A1. Relay A1 released:

i. places a ground on the S lead by closing contacts A1-2 under control of relay CS1; this ground, which remains until the called subscriber releases, ensures that the trunk will not be re-seized by another terminating call until it has restored to normal;

ii. opens its own operating path at A1-6 to prevent re-operation until relay SRL releases closing contacts SRL-4 in circuitry where the SL lead is not provided;

iii. opens the loop to the timer motor at A1-4 if the timer motor is used for charging and is at the terminating end.

No further changes take place in the trunk until the called subscriber disconnects. When this occurs relay CS is reversed by the second reversal of polarity to release relay CS1 by opening of contacts CS-1. Relay CS1 restoring releases relay B1 by opening contacts CS1-5 and removes one of the grounding connections from the SL lead by opening contacts CS1-4.

Relay B1 releasing:

i. releases, slow to release, relay BB by opening contacts B1-5;

ii. removes relay CS from across leads T and R by opening contacts B1-3*o* and B1-4*o;* iii. reconnects relay DA across leads T and R by closing contacts B1-3*c* and B1-4*c;*
iv. removes one of the two holding paths for relay H by opening contacts B1-11; relay H is now under control of relay SRL.

Relay BB releasing releases relays RL and SRL by opening contacts BB-1 and releases relay MT by opening contacts BB-4. Release of relay SRL will release relay H by opening contacts SRL-2. The trunk is now returned to its original state as shown in the drawings, for later seizure.

The operation of the originating end when the called party (i.e. the party at the terminating end) releases first, is as follows:

when the called party releases first, relay A1, at the originating end will release; relay A1 restoring:
i. opens the loop to the timer motor in the event that the timer is at the originating end (EA option) by opening contacts A1-4;
ii. places ground on the SL lead, by closing contacts A1-2, to prevent the trunk against re-seizure from the distant end before the calling party disconnects; this ground is passed to the sleeve lead through the closed contacts H-4 and DA-2.

No further changes take place in the trunk until the calling subscriber disconnects. When this occurs relay DA will release to release relay B by opening contacts DA-10 and remove the ground from the S lead at now open contacts DA-2. The trunk will now restore as described in connection with the originating end release when the called party disconnected first. In the event that the trunk is re-seized by the distant end after relay A released has removed the ground from the S lead, but before the trunk has restored to normal, an on-hook condition will be sent toward the calling end until relay SRL releases. Relay SRL will place relay A1 across leads T1 and R1 to trip the ringing. The trunk will now be seized in the normal manner.

The operation of the terminating end when the called party (i.e. the party at the terminating end) releases first, is as follows. When the called party releases first relay CS releases to release relay CS1. The opening of contacts CS1-3 opens the loop to the terminating local central office and to the distant end as a signal that the called party has disconnected. Terminating end relay A1 releases. Relay CS1 is designed to be slowly released. This design is used to avoid the possibility that an on-hook 'flash' at the called end will unwantedly release the connection.

Relay A1 releasing:
i. opens the loop (at A1-4) to the timer motor if the timer is at the terminating end;
ii. releases relay B1;
iii. further opens its own operating path at the contacts A1-6 to ensure that it does not re-operate until relay SRL has released.

Relay B1 releasing:
i. releases slow to release relay BB by opening contacts B-1;
ii. removes a relay CS from across leads T and R as described in connection with the originating end release;
iii. places relay DA across leads T and R as described in connection with the release at the originating end; the PBX trunk at the terminating end will now return to normal;
iv. removes one of the two holding paths for relay H by opening contacts B1–11 leaving the relay H under the control of SRL.

Relay BB releasing releases relays RL, MT and SRL. Relay SRL upon restoring releases Relay H by opening contact SRL-5. The trunk has now restored to the condition shown in FIGS. 4 and 5 for seizure by a succeeding call.

The previous description described the normal release of a trunk after the completion of a call. There will now be described release of the trunk or return of its circuitry to normal, under conditions where the subscriber fails to complete its dialling. Under such conditions the TD relay in the register-sender operates to ground the FT and the RL leads to the trunk. Such grounding is shown, respectively, in FIGS. 4 and 5, and is shown with the surrounding circuitry in connection with the discription of the register-sender. On grounding of the RL lead relay RL operates over A1-1, DA-3, S-2 and the link circuit. Relay RL operated releases relay S by opening contacts RL-4 which reconnects a transmission path through the trunk over contacts (see FIG. 4) S-6*c*, S-7*c*, S-3*c* and S-4*c*. Note also the closure of contacts RL-1 and RL-2. Relay A1 will reoperate over contacts MT-1, B1-2 and CO-8.

Relay RL operated, also
i. connects relay BY to the FT lead over contacts RL-8*o;* relay BY will operate;
ii. releases slow to release relay SRL by opening contacts RL-5;

Relay BY operated:
i. connects busy tone to the calling subscriber through the closed contacts of relay A1, being contacts A1-7 and providing the busy tone through the established connection to the originating central office;
ii. locks to a multiple holding path over contacts BY-3 and either A1-3 or BB-2;
iii. releases slow-to-release relay BB by opening contacts BY-6; relay BB releasing will release relay RL by opening contacts BB-1 which contacts also open the operating path for relay SRL.

Relay SRL released:
i. removes the holding ground for the hold (vertical -VM) magnet of the cross-bar switch in the link circuit by opening contacts SRL-1; the link circuit will now operate to release or to disconnect the register-sender;
ii. also releases relay CO through the opening of contacts SRL-1. Relay SRL will not reoperate when CO releases closing contacts CO-4, provided that relay BB has restored by this time.

When the calling subscriber disconnects, the loop at the terminating local central office will be broken to allow relay A1 to restore, thereby releasing relays B-1 (due to the opening of contacts A1-5) and relay BY (due to the opening of contacts A1-3). Relay B-1 releasing releases relay H at contacts B1-11; and removes relay CS from across leads T and R, by opening contacts B1-3*o* and B1-4*o*. The trunk is now normal. When the relay CS is removed from across T and R the PBX trunk in accord with well known design will restore to normal.

In the event that all register-senders were busy at the terminating end at the time when there was a call for a register-sender in connection with a completion of a call, the link circuit will place a ground on all ARB leads. This ground will operate the BY relays in all idle trunks as shown in connection with the trunk of FIG. 4. Relay BY operated will ground the S leads over BY-4 which, in accord with well known central office design will busy the trunk to originating callers at a distant location. If an S lead is not provided, an originating caller the other (distant) location may seize the terminating trunk. In this event relay H, A1 and B1 will operate. Relay BB, however, is prevented from operating by relay BY operated. Relay B1 operated will connect relay CS across the lines acting to seize the PBX trunk to busy that trunk to originating callers from the PBX. The distant end caller will have busy tone over A1-7 and BY-7.

*Call timing* - It is desired to discuss call timing briefly since one of the great advantages of the invention is that the subscriber owning the two paired but separated dial-tie trunks may be billed for the time that the two trunks are connected rather than on a long distance basis or on a straight monthly rate.

Although dial tie-line calls are completed over the DDD network, the period of the time during which the corresponding ends of the dial tie trunks are connected is not, preferably, calculated from the tapes which record the normal DDD calls. Instead it is preferred that the subscribers be "bulk" billed in accord with conversation time accumulated on meters.

In accord with the preferred method of timing it is assumed that a timer will be provided at one end only. For purposes of explanation the end possessing the timer will be designated as end A and the trunk at the timer end (see FIG. 4) will be equipped with the EA option indicated while the -EB option will be omitted. The end having no timer will be referred to as end B and the trunk at end B will be equipped with EB option while EA option is omitted.

End B will be equipped with a pair of tone oscillators, not shown, but connected to the EB option jacks indicated in FIG. 4. In the case of calls terminating at end B a burst of tones will be sent to end A over the leads OT and OR and leads and lines T1 and R1 at the time that the call party answers. These tones will be recognized by a tone detector at end A connected to the jacks TS, TT and TR with the latter two connections being connected to the originating end leads T1 and R1. These tones will be recognized by a tone detector at the end A as a signal to start the timer.

When end A originates a call then; when the called party (end B) answers; relay CS operates to operate relay CS1. Relay CS1 operated connects off-hook tone (two tones to leads T1 and R1) over contacts CS1-2*o* and CS1-6*a*. Relay CS operated also applies ground to the thermistor TH-1 over contacts CS1-2. The thermistor operation provides a time delay of approximately 60 milliseconds after which relay MT will operate to remove the tones from the transmission path. The resulting tone burst was sent to end A along the established connection.

End A provided with option EA is provided with a tone detector (not shown) connected to leads TS, TT and TR to detect the tone indication that end B has answered and to ground the TS lead at what is now the originating end. At the originating end therefore, the grounding of the lead operates relay MT which closes the loop to the timer motor over contact MT-4.

When either end releases, relay A1 at end A will restore opening contacts A1-4 and stopping the timing.

When the call originates at end B and terminates at end A then when the called party (end A) answers, relay CS operates to operate CS1. Relay CS1 operated applies a ground to the windings of relay MT via the circuit previously described. Relay MT will operate to close the loop to the timing motor as previously described timing starts. Relay A1 will release to open the loop to the timing motor when either end has released.

The sleeve lead which is a normal although optional adjunct to a central office will now be described. Such SL lead (sometimes referred to as the 'SL option'), although not absolutely necessary, should be used whenever possible. This lead provides additional guarding features to prevent seizure by a second caller before the trunk has completely restored to normal after an earlier call. Without the sleeve this could become a problem, particularly in cases where a customer is provided with a group of trunks, and where their access is by one telephone number on a rotary hunting basis. (This last arrangement is not shown as it is not part of the invention but is a well known technique in multiple trunk or multiple line operation).

At the originating end, a ground is placed on the sleeve lead when both the DA and H relays are operated with relay A1 released (that is, over contacts A1-2, DA-2 and H-4). This provides in accord with well known central office design guarding against reseizure by another caller from the distant end, in cases where the original called party at the distant end has released (indicated by relay A1 restored) while the calling subscriber remains on the line (that is with relay DA still operated). The contacts H-4 in this path insure that this ground does not appear on the SL lead before the line equipment is seized when attempting to originate a call. Ground will never appear on the SL lead at the originating end under normal conditions if the terminating end releases first.

At the terminating end in relation to a call the guarding ground will appear on the SL lead in cases where the calling party releases (relay A1 restored) while the called party remains on the line (relay CS1 operated closing contacts CS1-4). This ground will be placed on the SL lead until the called party disconnects.

In the event that a calling party abandons a call before completion and while the register-sender is still connected, a guarding ground will appear on the SL lead of the terminating trunk to ensure that the trunk is not re-seized while the register-sender is still connected. With the calling party having abandoned and the DDD connection released relay A1 has restored, relay RL has operated (operating contacts RL-9) but relays CO and B1 have not released as yet maintaining contacts CO-7 and B1-12 closed.

The terminating register-sender will no longer receive frequency shift tones from the originating end. As a result, the register-sender will place a ground on its RL lead towards the trunk to operate the RL relay. Relay RL operated will release relays S and SRL by opening contacts RL-4 and RL-5 respectively and the SL lead will be grounded over RL-9, CO-7 and B1-12. Relay SRL released will restore relay CO by contacts SRL-1 and hence will initiate the release of the register-senders. Relay CO released will remove the ground from the SL lead.

Relay BY operates in all register-senders busy condition or during register-senders forced release. If the trunk is idle when BY operates, the SL lead will be grounded to busy the trunk to all calls from the distant end. This grounding of the SL lead takes place over contacts BY-4. In cases of forced release the register-sender at the originating end, a ground will be placed on the SL lead when both relays BB and SL released over BB-5, SRL-3 and BY-4. This ground will busy the trunk to distant end calls until the originating subscriber has released to allow the trunk to restore to normal. A status defined as "class of service" is assigned to each trunk. The originating register-sender uses this class of service indication as an indication of the total number of digits to be outpulsed. The register-sender is designed as hereinafter described so that when the quantity of digits have been sent, the register-sender will release.

The class of service indication in step-by-step offices is wired into the routing digit information cross-connect field associated with the register-sender. As a result, no class mark strapping is required in the trunk.

In No. 5 cross-bar offices, the class mark must be strapped in the trunk. The strapping will consist of ground, resistance ground, low resistance battery or high resistance battery depending on the type of service involved. This class of service indication will be passed to the register-sender via the link circuit on the CL lead and is elsewhere discussed.

REGISTER-SENDER-DATA SET

The operation of both the originating and the terminating end Dial Tie Trunk in connecting the input and output of the register-sender-data set combination has been described. Later to be described is the operation of the link circuit at each of the originating and terminating ends in seizing, when required, an idle register-sender-data set. The detailed description of the register-sender-data set combination to follow, is therefore of the register-sender-data set seized by the link circuit.

In the register-sender-data set, as in the Dial Tie Trunk individual elements are connected as shown in the drawings, and the set, when not in use, has its relay contacts in the states indicated. FIGS. 13–34 are used for both the originating and terminating end register-sender.

The Functions of the register-sender-data set are as follows.

A. Originating End:

1. To recognize seizure by an originating caller.
2. To return dial tone to the caller when it is prepared to receive the subscriber dialed digits.
3. To receive and count subscriber dialled pulses and convert these to two-out-of-five coding.
4. To store subscriber dialled digits in 2-out-of-5 form.(up to 8 digits in the embodiment shown).
5. To summon the routing digit information field upon seizure and to receive from this field the routing digits required to reach the distant end trunk (in step-by-step local central offices only).
6. To receive the class of service of the calling trunk from the routing digit information cross-connect field (in step-by-step local central offices only).
7. To store the class of service and routing digit information as required (in step-by-step local central offices only).
8. To recognize when the trunk has seized the line equipment in the local central office and to start outpulsing the routing digits at this point (in step-by-step local central offices only).
9. To send the routing digits to the local central office in dial pulse form (in step-by-step local central offices only).
10. To provide a capacitor bypass transmission path from the calling party towards the called end when all routing digits are outpulsed so that call supervision tones may be heard and also to provide a transmission path over which to converse with checking operators, intercept operators etc. if the call is misrouted (in step-by-step local central offices only).
11. To provide a capacitor bypass transmission path from the calling party towards the called end from seizure so that call supervision tones may be heard and to provide a transmission path over which to converse with checking operators, intercept operators etc. if the call is misrouted (number 5 crossbar central offices only).
12. To break the capacitor bypass transmission path during pulsing and to restore during the interdigital pauses.
13. To await the receipt of tone from the distant end register-sender-data set before outpulsing the subscriber dialed digits to the distant end.
14. To break the capacitor bypass transmission path when the terminating end data set returns tone and to keep this path open for the balance of the seizure period.
15. To extract the subscriber dialed digits from the storage bins and to send these in frequency shift form to the distant end.
16. To send a prolonged frequency shift tone to the distant end as a signal for its data set to restore to normal (clear condition) when outpulsing is complete.
17. To release when its functions are complete.
18. To release under certain "Timeout" conditions such as slow dialing etc. and to send a ground on the FT lead to the trunk as a signal that a forced release has occurred.
19. To check for proper 2-out-of-5 storage in the bins as each digit is outpulsed.
20. To release when a storage failure occurs and to send a ground on the FT lead to the trunk as a signal that a forced release has occurred.
21. To bring in an alarm and busy itself to further calls when a storage failure occurs.

B. Terminating End

1. To recognize seizure by a terminating call.
2. To return tone to originating end as a signal that it is ready to receive the subscriber dialed digits.
3. To receive the subscriber dialed digits from the originating end in frequency shift form and to store these digits in 2-out-of-5 form.
4. To commence outpulsing the subscriber dialed digits to the terminating PBX as soon as they are received. (SxS PBX's only)
5. To await the receipt of dial tone from the terminating PBX before outpulsing the subscriber dialed digits. (Common Control PBX's only).
6. To release when its functions are complete.
7. To check for proper 2-out-of-5 storage in the bins as each digit is outpulsed.
8. To release when a storage failure occurs and to send a ground on the FT lead to the trunk as a signal that a forced release has occurred.

9. To bring in an alarm and busy itself to further calls when a storage failure occurs.

DESCRIPTION OF REGISTER-SENDER FUNCTIONS

A. Control

Control refers to the portion of the register-sender that coordinates the operations of the functional circuitry. The division between that circuitry which may be considered as control and that which may be regarded as functional is not distinct and hence much of the discussion about control will be included under other headings.

1. Basic Control:

a. recognizes the type of seizure by a link circuit (originating or terminating).

b. controls the transmission and pulsing paths as required.

c. when used with a step-by-step local central office summons the routing digit information at the appropriate time.

d. recognizes the pulsing of subscriber dialed digits and passes these pulses to the impulsing counter.

e. controls outpulsing:

i. determines whether outpulsing will be in frequency shift or dial pulse form.

ii. holds outpulsing until it has been established that the necessary switching equipment for receiving the outpulsing has been connected.

Relays P', P, P2, P2A, P2B, P3 and P3S are the principal relays in the basic control for the register-sender that are involved with the cycle of seizure through the link circuit. Relays P' and P will operate on originating calls only and will perform the functions necessary to place the register-sender in the originating mode. Relays P2, P2A and P2B, on the other hand, will operate on terminating calls only and will set the register-sender in the terminating mode. Relays P3 and P3S operate in either case and will start the register-sender functions that are common to both the originating and terminating ends.

Figure 13:
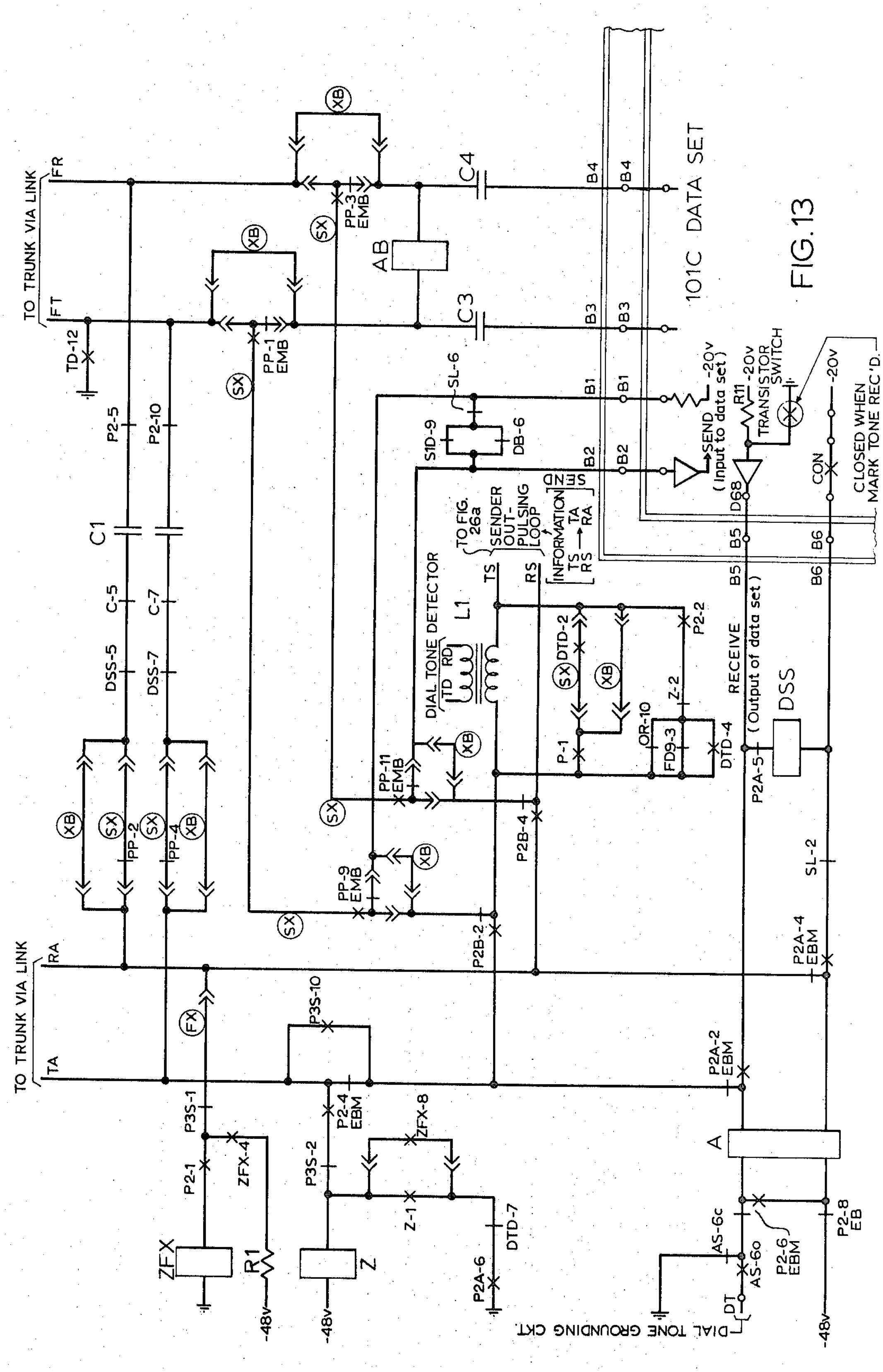
FIG. 13 shows the main circuitry of the register-sender-data set.

General operation of the register-sender centres mainly about circuitry or relays shown in FIGS. 13 and 15.

Relay A is a pulsing relay which responds to pulses from the PBX subscriber on originating calls or to pulses from the data set receive lead on terminating calls. In either case, relay A will pulse in accordance to the subscriber dialed digits and will drive impulsing flip-flop counting relays to store these digits in the register-sender. Relay AB, however, is not a pulsing relay and is used primarily to initiate the seizure cycle on terminating calls. Relay AB will remain operated for the period that the register-sender is attached to the trunk, except during the outpulsing of routing digits to step-by-step Local Control Offices.

In the idle condition, relay A is connected to leads TA and RA while relay AB bridges leads FT and FR. When the trunk is seized by an originating caller, the loop will be closed to leads TA and RA before the operate path for relay AB is completed. Relay A will operate before relay AB, thereby operating relays P' and P and ensuring that relays P2, P2A and P2B cannot operate. The converse is true when the trunk is seized on terminating calls. In this case, relay AB operating first will operate relays P2, P2A and P2B and prevent relays P' and P from operating. Relays P3 and P3S will operate whenever relay P or P2 operates.

Relay PP is provided in register-senders used in step-by-step local central offices. This relay operates when the register-sender is seized and releases when the last routing digit has been out-pulsed. Relay PP operated (see FIG. 13) will connect the sender outpulsing loop to leads FT and FR, allowing the routing digits to be sent in dial pulse form. Relay PP restored will transfer the sender pulsing contacts to the "send" loop of the data set and will connect the data set output to leads FT and FR. This will allow the subscriber dialed digits to be sent to the distant end in frequency shift form.

The above relays are the basic control relays in the register-sender. There are many more relays which may be considered part of the basic control. The functions of these relays will be covered in other sections of this report.

2. Release Control: (FIGS. 33 and 34)

The main components of the release control are:

a. Register Release Lead Network b. The RR relay c. The RC relay d. Release Control Network e. Register timeout and forced release control 3. Data Set control:

The data set control consists mainly of relays DB, S1D and SL. Their operation is covered in detail elsewhere.

B. Register Operation (FIGS. 15, 17 – 22)

1. Insteering Pulse Counter (FIGS. 15, 17 and 38)

The insteering pulse counter is a device which receives the subscriber dialed information in a serial manner and converts it to parallel form (i.e. a 2-out-of-5 code). The pulse counter consists of three basic parts:

a. the inpulsing flip-flop counting relays (FIG. 15)

b. the inpulsing counting chain (FIG. 17)

c. the insteering diode network (FIG. 17)

Relay A (FIG. 13) will pulse in accordance with the subscriber dialed digits and will control inpulsing flip-flop counting relays PA and PB. Relay PB will drive inpusing counting chain relays AC-EC inclusive. Depending on the digit dialed, the inpulsing counting chain will place a ground on one out of ten paths thru the insteering diode network. This path will be split by the diode network in order to convert the one-out-of-ten code to a 2-out-of-5 code. The resulting ground on two out of five leads will be passed to the storage bins via the insteering relay chain during the interdigital pause.

Consider now the counting of a digit. When pulsing relay A releases at the start of the first break pulse, relay PA operates. Relay PB cannot operate at this time since a ground appears on both sides of its windings. Relay A reoperating at the end of the first break pulse will remove the shorting ground from across relay PB. Relay PB operates to operate relay AC in the counting chain.

Assuming that the dialed digit is not a 1, relay A would again release at the start of the second break pulse. This would short out relay PA and cause it to release. With relay PA restored, relay PB will release at the end of the second break pulse since the operating ground will then be removed from its windings. Relay PB releasing will operate relay BC in the counting chain. The process will continue for other subscriber pulses. The operating cycle for relays PA and PB will repeat for every set of two break pulses. The counting chain relays will operate in accordance with table A of the schematic FIG. 17.

2. Storage Bins (FIGS. 19 – 22)

Each storage bin consists of five dry reed relays designated 0, 1, 2, 4 and 7. In the storage process, grounds are offered briefly to the windings of two of these relays. The two relays will operate and lock for the duration of register-sender seizure under control of relay P3. The choice of the two relays to be operated will be in accordance with the following 2-out-of-5 code:

| Digit to be stored | Storage relays operated 0 | 1 | 2 | 4 | 7 |
|---|---|---|---|---|---|
| 0 | | | | X | X |
| 1 | X | X | | | |
| 2 | X | | X | | |
| | 0 | 1 | 2 | 4 | 7 |
| 3 | | X | X | | |
| 4 | X | | | X | |
| 5 | | X | | X | |
| 6 | | | X | X | |
| 7 | X | | | | X |
| 8 | | X | | | X |
| 9 | | | X | | X |

Since two relays will be operated during the storage process, grounds will be placed on two out of five leads towards the outsteering circuit. The information thus stored can be extracted as required during the sending process.

3. Insteering Relays (FIG. 18)

The pulses corresponding to the subscriber dialed digits are counted and converted to 2-out-of-5 form by the insteering pulse counter as described in the section headed INSTEERING PULSE COUNTER. This information is routed to storage bins 14–21 by insteering relays AS–JS inclusive. Relay AS is associated with bin 14 while relay BS is used for sterring information to bin 15. Similarly relays CS–HS are used to steer information into bins 16–21 respectively. Table B of the schematic lists the insteering relay-storage bin relationships.

Two insteering relays of consecutive priority may be operated at any time in the inpulsing cycle. When two relays are operated simultaneously, the relay associated with the lower numbered storage bin will overide the effects of the other relay and hence information will be passed into the lower numbered bin. (E.g. when relays AS and BS operate simultaneously, information will be passed into bin 14, not bin 15.)

The insteering relays are controlled by relay D. Relay D is held operated during pulsing but releases during each interdigital pause.

Relay AS operates when the register-sender is seized (relay P3 operated). Relay BS will operate when relay D operates after the first break pulse of the first subscriber dialed digit is received. Relay AS remains operated until relay D releases. Since the transfer of information to the storage bins occurs in the period between relay C released and relay D releasing, the coded form of the first digit will be passed to storage bin 14. When the first break pulse of the second digit is received, relay D again operates to operate relay CS. Since relay BS now is in control of the path to the storage bins, the second digit will be stored in bin 15 during the interdigital pause. When relay D releases during this pause, relay BS will release leaving relay CS in control of the path to the bins. The process continues with the next relay in the insteering chain operating as relay D operates at the start of pulsing for each digit. During the interdigital intervals, relay D released will release the previous relay in the insteering chain.

Relay JS is a dummy relay and has no associated storage bin. It operates upon receipt of the first break pulse of the eighth subscriber dialed digit. This allows relay HS to release when relay D releases at the end of the

| Bin | Purpose | Information stored | Source of information |
|---|---|---|---|
| 1 | DDD access code | Digit "1" | Permanent strapping. |
| 2 | DDD access code | Digit "1" (if required) | Permanent strapping. |
| 3 | DDD access code | Digit "2" (if required) | Permanent strapping. |
| | (Bins 1–3 are required for step-by-step offices only) | | |
| 4–6 | Routing digits (step-by-step offices only). | NPA Code for reaching distant end trk. (if required). | Routing digit information field. |
| 7–13 | Routing digits (step-by-step offices only). | 7 digit number for reaching distant end trk. (if required). | Routing digit information field. |
| 14–21 | Subscriber dialed digits | Digits required to establish the connection from the terminating end trk. to the called party. | Subscriber dialing. |
| 22 | Class of service (step-by-step offices only). | Class of service of customer | Routing digit information field. |

Register-senders are equipped as follows:

1. Step-by-setp central office using DDD access code 112 (A option) require bins 1–22 inclusive.
2. Step-by-Step control offices using DDD access code 1 (B option) require bins 1 and 4–22 inclusive.
3. No. 5 crossbar offices use a memory applique circuit for establishing a connection preferably using the same switching by which direct dialing is achieved to the distant end trunk. Information designating the class of service need not be stored since this is permanently strapped to the CL lead in the trunk. As a result, register-senders in No. 5 crossbar central offices are equipped with bins 14–21 only.

pulsing of the eighth digit. Relay HS releasing will disconnect bin 21 from the insteering diode network to prevent double digit registration from occurring in that bin in cases where the subscriber erroneously dials more than 8 digits. A double digit marking in bin 21 would bring in an unwanted alarm.

4. Routing Digit Information Field (Step-by-step Central Office Only)

A routing digit information field is provided in step-by-step offices as common equipment for a pool of register-senders. This information field is seized momentarily by originating register-senders on a preference basis. When seized, the routing digit information field will provide the register-sender the routing digit information and class of service indication associated with the trunk involved. This information is passed directly to storage bins 4–13 and 22 in 2-out-of-5 form. Detailed operation of the routing digit information field is covered in a separate circuit description.

C. Sender Operations Outpulsing

Figure 26B:
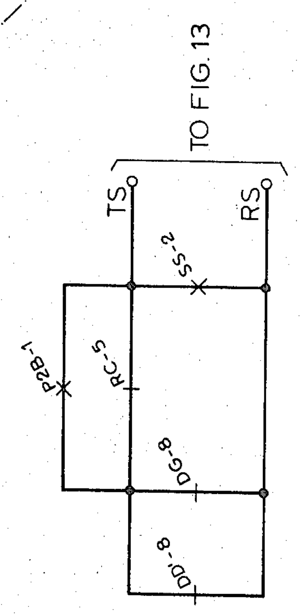

1. The Pulse Generator & Interdigital Pause and Stop Dial Relay (FIG. 26)

Relays DG and G form the basic pulse generator unit. This generator will pulse continuously after being started as is described in the section headed SEND START AND STOP DIAL CONDITIONS. When pulsing, the adjustment of resistors DG and G will be such that relay DG will be operated for 66 milliseconds, followed by the operation of relay G for 33 milliseconds. In addition to opening and closing the pulsing loop as required, relay DG will drive the outpulsing counter so that the pulses sent out on the line may be counted.

Relay SS operates to create the interdigital pause and remains operated during stop dial conditions. This relay shorts the contacts of relay DG in the pulsing loop to prevent the continuously operated pulse generator from sending pulses to the line. Stop dial is described in the section headed SEND START AND STOP DIAL CONDITIONS. Relay SS operated releases relays DD and DD' and prevents their reoperation until after the interdigital pause or stop dial condition has ended. Relay SS will also control the operation of the outsteering relay chain.

2. The Outpulsing Counter (FIG. 27)

The outpulsing counter serves a dual prupose in the register-sender:

i. to count the pulses sent on the line ii. to time the interdigital pause interval The counter is controlled by pulse generator relay DG which drives relays PAA and PBB of the outpulsing flip-flop circuit. Relay PBB will, in turn, step counting relays ACC-FCC inclusive.

For counting the pulses sent to the line, the counter will be activated by relay DD' operated. The counting relays will control the OUTPULSE MATCHING ARRAY (FIG.28) so that the number of pulses sent on the line may be compared with the number of pulses to be sent. When a match occurs, relay S will operate to operate relay SS (FIG.26), thereby creating an interdigital pause.

Relay SS operated will release relay DD' to reset the outpulsing counter. When all ACC-FCC relays have released, relay S will release. Relay S releasing will again reactivate the outpulsing counter through closed contacts of relay SS operated. Since relay DG is still pulsing continuously, counting will again commence. This time the count will be used for timing the interdigital pause interval. In this case the outpulse matching array (FIG. 28) will be disabled by relay SS operated. The interdigital pause is counted by stepping the counting relays ACC-FCC under the control of relay PBB and relay DG as with the pulsing of a digit.

At the beginning of the sixth pulse (500 milliseconds minimum) from commencement of counting, relay FCC in the counting chain will operate and lock under control of relay SS operated. Relay FCC operated will release relay SS (unless a stop dial condition is encountered). This resets the counting chain, steers the next digit into the temporary memory (FIG. 28 ) and signals the end of the interdigital pause interval.

Since relay DG will be operated at this point, relay DD (FIG. 28) will operate. Provided that a digit is stored in the temporary memory (indicated by two T-relays operated), relay DD' will operate on the next release of relay DG. This will remove the short circuit from across the pulsing contacts of relay DG and will reactivate the pulsing counter. The next digit will now be outpulsed.

3. Outpulse Matching Circuit (FIG. 28, FIG. 29)

The outpulse matching circuit is comprised of the following components:

a. Temporary Memory: FIG. 28

Consists of a set of five storage relays T-0, T-1, T-2, T-4 and T-7. The outsteering circuit will connect the bin containing the digit to be outpulsed to the temporary memory as described under the section entitled THE OUTSTEERING CIRCUIT. Normally two out of five relays will operate when information is stored in the temporary memory.

b. Proper Storage Checking Circuit (FIG. 29)

Relay CH provides an indication that information is stored in the temporary memory. This relay is slow to release so that it remains operated during the period in which the digit stored in the memory is being changed.

A check is made for proper digit storage (i.e. markings on only two out of five leads) when the digital information is stored in the temporary memory. If a ground appears on any one only of five leads or on more than two out of five leads, the storage checking network will place a ground on the ALM lead to operate relay ALM. Improper storage results in an alarm condition as is described under the section entitled ALARM CONDITIONS. It should be noted that an alarm will not result if no leads from the storage bins are grounded since it is impossible to distinguish between improper storage and an empty storage bin. If no leads from the storage bins are grounded, relay CH will restore and, under certain conditions, may cause the register-sender to release, as elsewhere described.

c. Relays DD and DD' (FIG. 28, FIG. 26)

Relays DD and DD' perform the following functions in the register-sender:

i. ensure that the first pulse of an digit is not distorted;

ii. ensure that continuously pulsing relay DG will not outpulse on the line unless a digit is stored in temporary memory relays T-0, T-1, T-2, T-4 and T-7;

iii. relay DD' released disables the outpulsing counter except during the counting of an interdigital pause interval.

Contacts of relay DD' released will short out the pulsing contacts of pulse generator relay DG. No pulses will be sent on the line until relay DD' has operated.

Relay DD operates when relay DG is operated and relay SS released at the end of an interdigital pause. Relay DD operated will prepare the operate path for relay DD' when relay DG releases. Assuming that a digit is stored in the temporary memory (two T-relays operated), relay DG releasing will remove the short from across the winding of relay DD'. Relay DD', now connected in series with relay DD, will operate to remove a short from across the pulsing loop and to energize the counting chain. The next break pulse of relay DG (now a complete pulse) will be sent on the line. Outpulsing of the digit will now commence. Relays DD and DD' will remain operated until relay SS operates at the completion of the sending of the digit.

Relays DD and DD' are inoperative during the timing of the interdigital pause and cannot operate until relay SS has released. Relay DD' is also inoperative when all T- relays are released indicating that no digit is stored in the temporary memory. When a digit is received by this memory, relay DD' can then operate in the normal manner to allow outpulsing to continue.

d. "Match" Relay S (FIG. 28)

Relay S operates whenever the number of pulses sent matches the number of pulses for the particular digit to be sent (i.e. the digit stored in the temporary memory). Relay S operated operates relay SS which creates an interdigital pause.

e. The outpulse Matching Array (FIG. 28)

This array is an arrangement of contacts on the temporary memory relays T-0, T-1, T-2, T-4 and T-7 and counting relays ACC–FCC inclusive. The array will close a path to operate relay S whenever a match occurs between the number of pulses sent(and the digit indicated by temporary storage relays T-0, T-1, T-2, T-4, T-7.)

4. Sender Outpulsing Loop (FIG. 26)

The pulsing loop is controlled by digit generator relay DG. The pulsing contacts of relay DG can be shorted by relay SS operated (for interdigital pause and stop dial) or by relay DD' unoperated (to ensure that the first pulse sent on the line is not distorted and to ensure that no pulses are sent on the line until a digit is stored in the temporary memory).

The pulsing loop can be broken at the originating end by relay RC operated. Relay RC operates upon initiation of the normal register-sender release cycle and will allow the originating end data set to send a "break" signal to the terminating end data set before releasing.

5. The Outsteering Circuit (See FIGS. 23, 8 and 7 for a No.5 cross-bar exchange and FIGS.24,25, 8 and 7 for a step-by-step exchange)

When a digit is be be outpulsed, the stored digital information (2-out-of-5 form) is transferred from the storage bin in question to temporary storage relays T-0, T-1, T-2, T-4 and T-7 in the outpulse matching circuit. This matching circuit will compare the pulses sent on the line by a continuously operating pulse generator (relays DG and G) with the number of pulses to be sent for that particular digit. When a match occurs relays S operates relay SS which, in turn, shorts out the pulsing loop to prevent additional pulses from being sent. When the outpulsing of a digit is complete the next storage bin will be closed to temporary storage relays T-0 to T-7 and the process repeated.

Outsteering relays OA-OY (step-by-step Central Offices) and ON-OY (No. 5 crossbar) connect each bin in turn to the temporary storage relays. Each outsteering relay is associated with a particular storage bin. One or two outsteering relays may be operated at any time during the outpulsing cycle. When two relays are operated simultaneously, the relay associated with the lower numbered bin will override the effects of the other relay and hence the lower numbered bin will be connected to the temporary storage relays. (E.g. If relays OA and OB were operated at the same time, the temporary storage relays would be given access to bin 1. When relay OA released, bin 2 information would then be connected).

Relay SS (stop dial and interdigital pause relay) controls the stepping of the outsteering relays. Relay SS operated grounds the OS lead in the outsteering circuit, causing the next outsteering relay in the chain to operate. Relay SS released will remove this ground causing the previous relay in the outsteering chain to restore Generally, relay SS operates after each digit is sent and remains operated during the interdigital pause. Relay SS releases at the end of the interdigital pause to allow the next digit to be outpulsed. The initial operation of relay SS varies in accordance to the situation and the type of office involved. The operation of relay SS is shown in the sequence charts of FIGS. 7 and 8.

Figure 7:
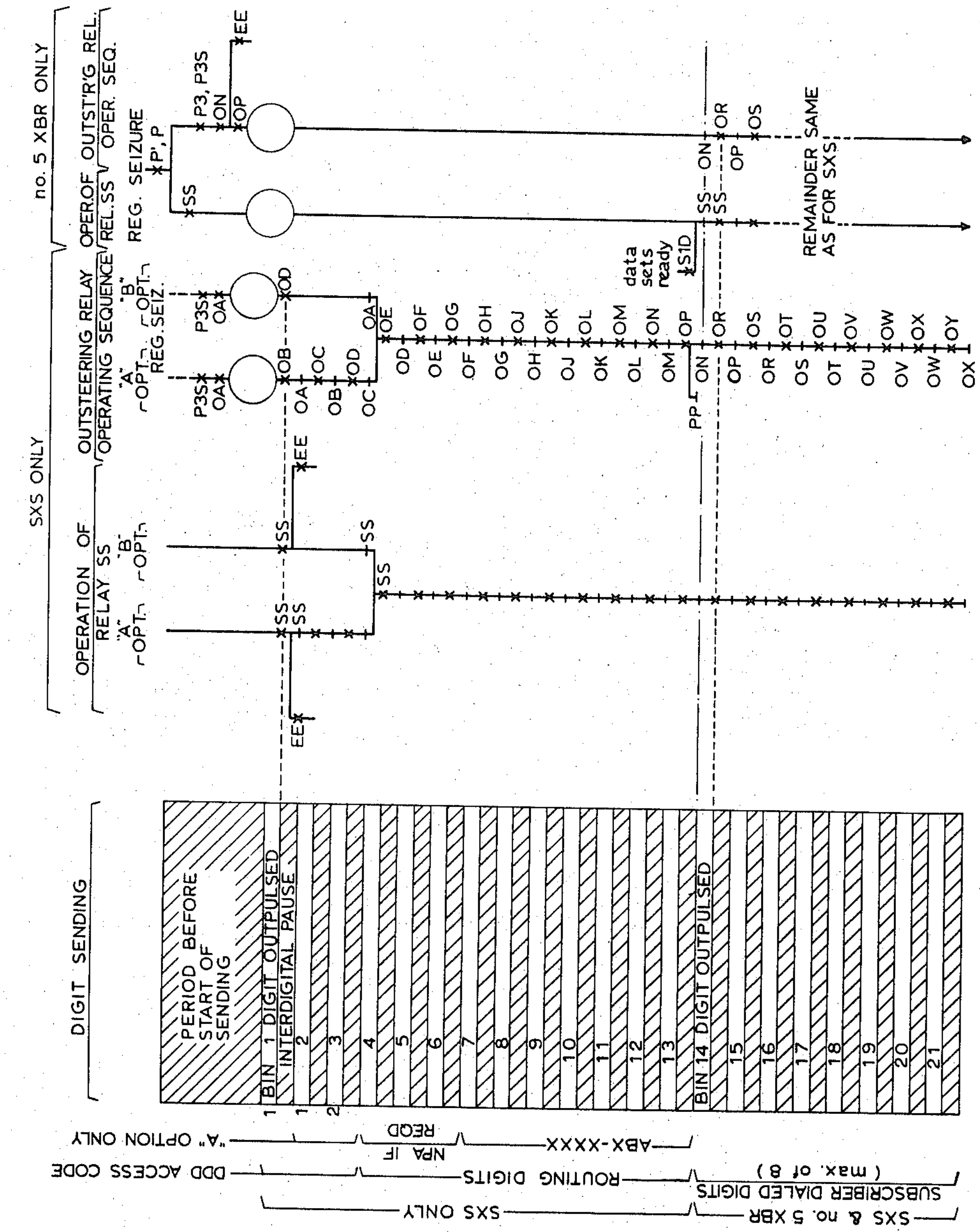
FIGS. 7 and 8 are sequence charts showing relay operation during pulsing.
Figure 8:
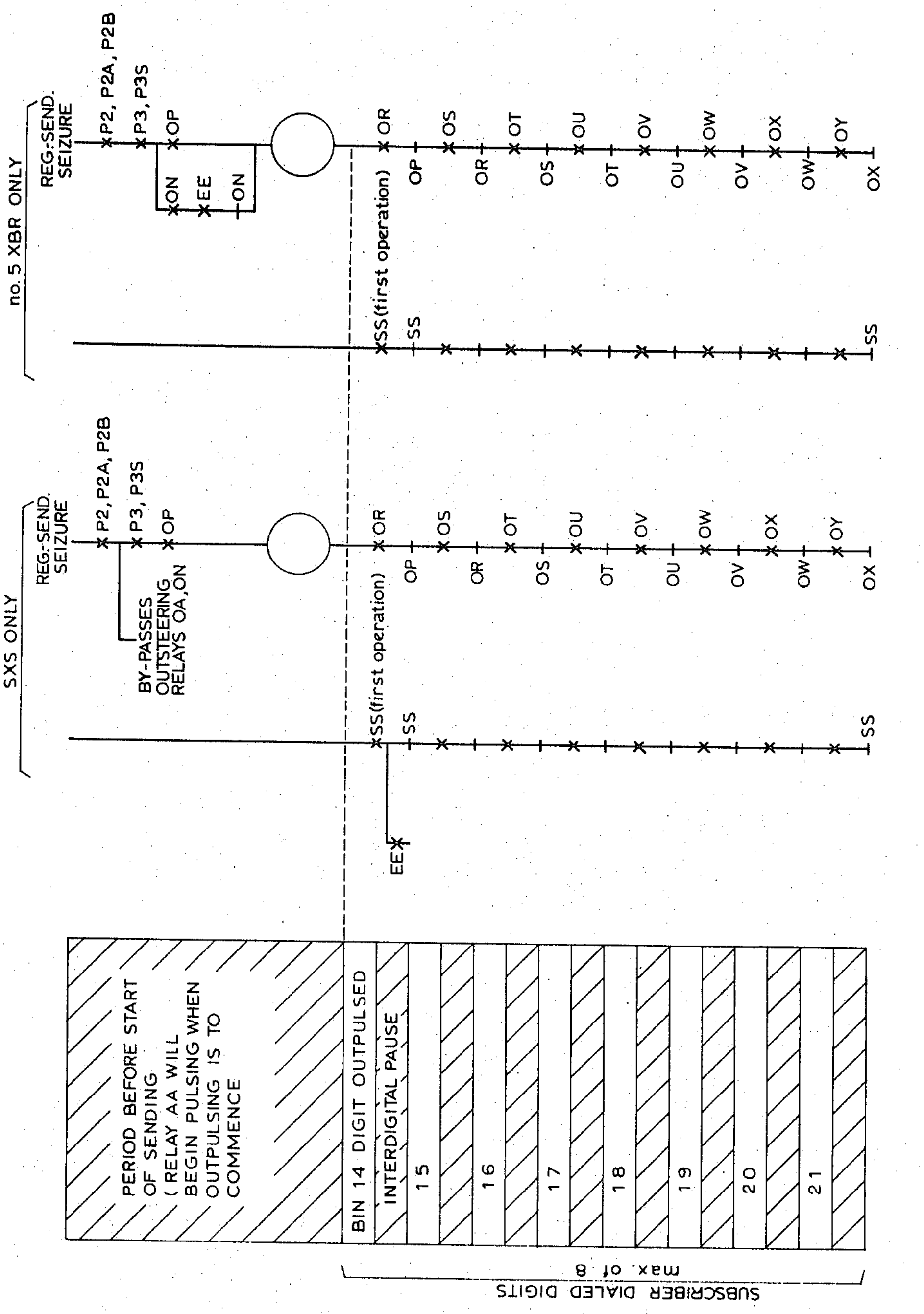
Figure 9:
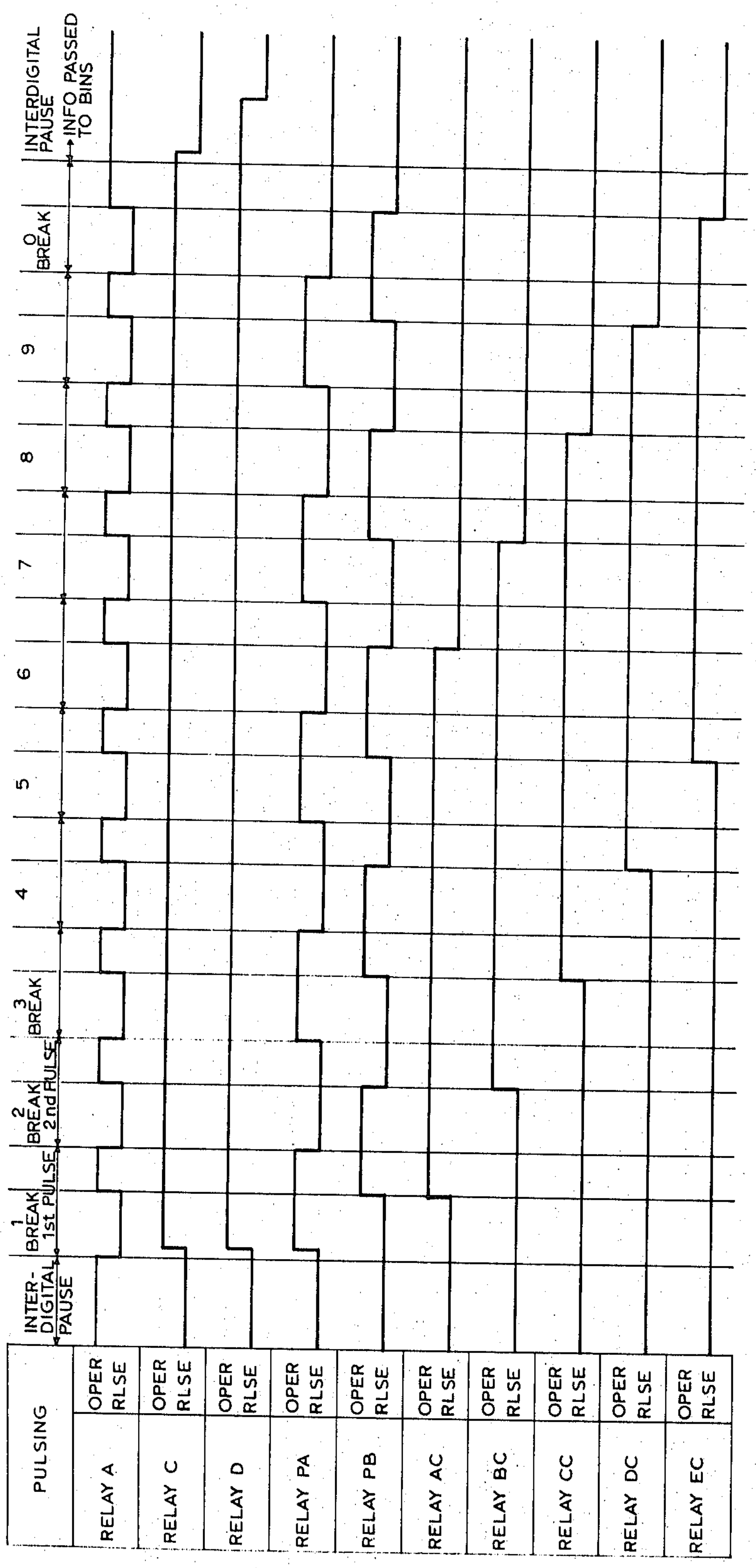
FIG. 9 is a graph showing the operation of relays in the register-sender during in-pulsing.

The sequence charts set out in FIGS. 7 and 8 show the operation sequence for the outsteering circuit in detail.

It should be noted the closed contacts of relays P2A and P2B at the terminating end in step-by-step offices will cause relays OA–ON to be bypassed and hence storage bins 1–13 will be skipped in the outsteering sequence. This is desirable since these bins contain routing information which is required at the originating end only.

Figure 22:
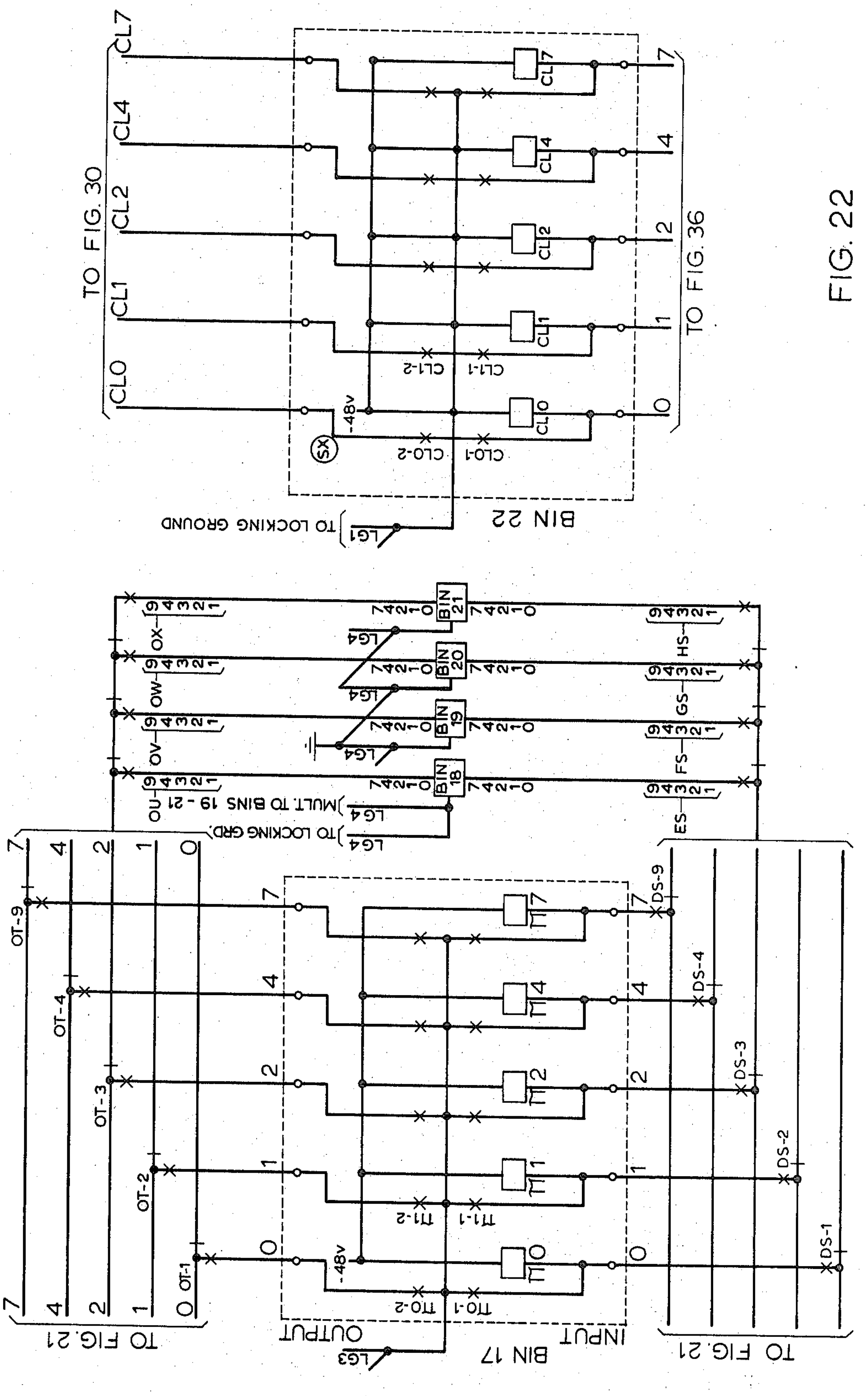

On calls originating in step-by-step offices and not requiring an area code in the routing digits, the CL7 relay in bin 22 will be operated (FIG. 22). This will operate relay F (FIG. 30) to cause outsteering relays OD, OE and OF (FIG. 24) to be bypassed. As a result, bins 4, 5 and 6 will be skipped in the sending process.

Since No. 5 XBR offices do not require that the register-senders store and outpulse routing information, storage bins 1–13 and outsteering relays OA–OM are not provided (see FIG. 23). Relay ON does not have a storage bin associated with it and is provided only to obtain proper outsteering sequencing on originating calls. This is necessary due to the fact that relay SS (which controls outsteering relay sequencing) operates when the register-sender is seized on originating calls but, on terminating calls, will not operate until the first digit is outpulsed. If relay ON were not provided for originating end operation, relay SS releasing before the first digit is outpulsed would cause relay OP to release, thereby skipping bin 14. This is because with the relay ON, ON operation prevents (at open contacts ON-11*c*) the operation of OR with OP operated. In the absence of relay ON, operation of OP would allow operation of OR over OP-11*o*. This through the opening of OR-6*c* and the closing of OR-6*o* would subject OP to the control of relay SS, and thus SS releasing would release OP skipping the first digit as foresaid. Instead, dummy relay ON releases, leaving OP operated to give the desired sequencing.

Relay OY, also a dummy relay, is provided in both step-by-step and No. 5 crossbar offices. On calls involving the maximum eight subscriber dialed digits, this ensures that the digit generator will not repeatedly send the information in the last bin (21) after outpulsing is complete. Instead, relay OY operated permits relay OX (the outsteering relay associated with bin 21) to release when relay SS releases at the end of the inter-digital pause following the sending of the last subscriber dialed digit. Since a bin is no longer connected to the temporary storage relays, no T- relays will be operated. This will prevent relay DD' from operating to ensure that relay DG pulses cannot be sent on the line. When all T-relays release, relay CH will restore. Under certain conditions, this will cause the register-sender to release.

Normal release is effected in accordance to the class of service of the calling subscriber and the particular digits that this calling subscriber has dialed. The following table lists the general conditions for normal release:

| Class of Service | Call Terminates At | If First Subscriber Dialed Digit is 1–8 | 9 |
|---|---|---|---|
| | | Reg-Send Normally Releases After Outpulsing | |
| A | 2 Digit PBX | 2 Digits | 8 Digits |
| B | 3 Digit PBX | 3 Digits | 8 Digits |
| C | 4 Digit PBX | 4 Digits | 8 Digits |
| D | 5 Digit PBX | 5 Digits | 8 Digits |

Calls to service codes and operators will constitute exceptions to the above table. A list of the codes involved in an "early release category" is as follows:

| Type of Service | 1st Digit Bin 14 | 2nd Digit Bin 15 | 3rd Digit Bin 16 | 4th digit Bin 17 | 5th Digit Bin 18 |
|---|---|---|---|---|---|
| | | 0* | | | |
| PBX | | X | 1* | 1 | |
| (Classes | | | | | |
| A,B,C,D) | 9* | 4 | 1* | 0 | X |
| | | 1 | 1* | X | |
| | 0* | | | | |
| | X | 1* | 1 | | |

When the dialed digits correspond to a combination appearing in the above table, the register-sender is connected to release immediately after outpulsing all the digits that are stored in the bins. Digit recognition relays FD9, DD0 and DD1 (FIG. 32) inspect the first three digits dialed in order to determine whether the call falls in the early-release-category. The digits indicated by asterisks (*) above are those which result in the operation of relays FD9, DD0 or DD1.

In all types of release at either the originating or the terminating end register-sender, the register-sender will ground its RL lead to indicate the need for release. FIG. 5 shows the grounding circuitry only schematically, but the detailed circuitry is disclosed in FIGS. 33 and 34.

In the case of forced release, there will also be placed ground on the FT lead , to signal the trunk to send a busy signal in the case of forced release. Thus in the case of operation of the alarm relay, for any of the reasons herein described, the contacts ALM-4*o* close (FIG. 33) to operate relay TD. Contacts TD-10 (FIG. 4) close to place a ground on the FT lead.

With reference to the FIG. 34 showing the register-release leads circuitry, the alternative methods of releasing the register-sender by operating relay RL as follows.

On originating calls from dial tie line customers, circuitry (FIG. 34) is provided if the caller disconnects while the register-sender is still attached. Before the caller disconnects, contacts P3S-6 are closed, P2-9 are closed, and P'-9 are open. When the calling party disconnects relay A will release to release relay P' and P which in turn restores relays P3 and P3S. Relay P' releasing before relay P3S will cause a momentary ground to appear on the RL lead. The break contacts of relay P2 are required to ensure that the terminating register-sender does not release prematurely on normal calls.

Caller fails to commence dialing before time out.

If an originating dial tie line subscriber fails to dial any digits whatsoever, the register-sender common timer will operate relay TD. It will be seen (FIG. 34) that release will therefore be effected by the closure of contacts TD-10, placing ground on the RL lead through the contacts E-11c since relay E is not operated.

Succeeding methods of operating the release system may be designated 'normal release'.

The release of the originating end register-sender under normal conditions is achieved when relay RR (FIG. 34) releases to ground the RL lead by closing contacts RR 10. Relay RR is normally released by the opening of contacts RC-3 on operation of relay RC in one of the methods hereinafter discussed.

The normal release of the terminating end register-sender is effected on the release of relay CH after all digits have been outpulsed closing CH-3 in series with E-11*o*, P2B-8*o* and S1D-8. Relay CH is operated whenever information is stored (either properly or improperly) in the temporary memory. This relay is normally used to effect register-sender release when all digits stored in the bins have been outpulsed. Relay CH (FIG. 29) is slow to release to ensure that it remains operated during the period when the digit stored in the temporary memory is being changed.

The release control networks (one is shown for each of the step-by-step and No. 5 cross-bar), is used to control release of the originating end register-sender and is a network of contacts of relays P, CH, TD, the outsteering relays and the digit recognition relays. The network will place a ground on its RC lead as a signal for normal release of the originating register-sender.

The following paths are provided for grounding the RC lead: (separate release circuits are shown for use in the originating state, respectively, depending on whether the associated local central office is step-by-step and No. 5 cross-bar; The comments below apply first to the No. 5 cross-bar circuitry).

1. If release occurs through the operation of a timing relay after the subscriber has commenced dialing relay TD operates to ground the RC lead by closing contacts TD-2.

2. When an 0 is outpulsed as the first subscriber dialled digit a path is provided through the make contacts P-14, OR-12, DDO-10 of relays P, OR, DDO and the contacts FD9-10 of relay FD9. This path becomes operative whenever an 0 is outpulsed as the first subscriber dialed digit since it will be noted from digit recognition relays that in this event digit line 4 and 7 of storage bin 14 will be actuated closing relay DDO' contacts DDO'-2 operating relay DDO which in the release control network closes contacts DDO-10. Relay OR operates when this zero has been outpulsed to close contacts OR-12, and is used for release on originating calls to the operator. FD does not operate at the originating register-sender.

3. A path is provided through the contacts P-14, OS-12, FD9-10*o*, DDO-10 to ground the RC lead if the digits 9–0 have been outpulsed as the first two subscriber dialed digits and is used for originating end release on dial tie line calls to a long distance operator.

4. A path is provided through the make contacts OY-12 and contacts P-14 which will release the register-sender after the eighth subscriber dialed digit is outpulsed and will be used in cases where dial tie line subscriber, place calls of the character 9-ABX-XXXX to telephones with the local exchange (where X may be any single digit and digits A and B are more limited).

5.(a) In the case of a register-sender, in its oritinating state, associated with a No. 5 cross-bar central office, a path is available through the contacts FD9-12 and one of the contacts CLA-3, CLB-4, CLC-10 or CLD-10. One only of the class A, B, C or D connections is made at any time. In FIG. 31 a choice is made on only of the class A, B, C or D connections depending on whether a call is being placed with 2, 3, 4 or 5 digit PBX respectively. This path is operative after the appropriate number of digits have been outpulsed on dial tie line calls that terminate at the distant PBX. In this connection regard may be had to the class of service indication circuit shown in FIG. 31, where after two digits OS-10 closes through P10 and the link circuit. If the class A connection is made then on closure of the contacts OS-10, relay CLA will operate over OS-10, OT-10*c*, OU-10*c*, P-10 the link circuit and the class A ground. In the event that Class B connection is made and the class A connection is not, relay CLA will not operate when contacts OS-10 close, since the relay CLA is designed not to operate with the reduced current attained due to the resistance to ground from the class B lead, hence relay CLB will operate when OT-10*o* closes, after the pulsing of the third digit. With class C connection, as shown, neither CLA or CLB will operate at the appropriate times because they have minus 48 volts on both sides, but CLC will operate after the pulsing of the fourth digit when OU-10*o* closes. On the other hand, when the class D connection is made, OU will close after the fourth digit but CLC will not operate since the presence of the resistance in the class D connection reduces the current to less than that required to operate the relay CLC in accord with its design and CLD will operate after the pulsing of the fifth digit. Thus on the operation of any of the four 'CL-' relays, ground will be applied to the RC lead, and the operation of the RC relay will cause ground to be applied to the RL lead as already discussed.

6. Ground for the RC relay may be applied through the closed contacts P-14, DD1-10 and the break contacts of CH-7, this path will be operative after all digits have been outpulsed on calls involving service codes. This release is made possible by the fact that all service codes have 1 as their second digit. Since the completing field on measured rate private line circuits will be restricted to the terminating local exchange area no other subscriber dialed number (except for PBX extension) will contain a 1 as a second digit. Relay DD1 is connected to be operated when the first stored dialed digit is a 9 (operating relay FD9, FIG. 32 and the third stored dialed digit is a 1).

It will be noted that in situations where release is controlled by the release of the relay CH that the subscriber must dial digits at a rate to keep at least one digit ahead of register-sender outpulsing since the relay will release as soon as all digits stored in the storage bins are released.

Relay CH will operate opening contacts CH-7 when outpulsing begins it will remain open until outpulsing stops. DD1–10 will close when the third stored, dialed digit as previously described is a 1. It will be noted that CH will release as soon as all digits are outpulsed. Hence the subscriber must dial with sufficient speed to remain at least one digit ahead of outpulsing. However when all the pulses in the bin have been cleared, contacts CH-7 close, DD1–10 is already operated and the RC relay is grounded.

It is now desired to discuss the release circuitry for a step-by-step local central office. For the release control network for working with a step-by-step local central office, alternative release paths 1–4 are the same as with the No. 5 cross-bar.

5. In place of the class of service indication used with the No. 5 cross-bar, the step-by-step release control network provides a connection from the RC lead, over contacts FD9–12 to the line CLM. The criteria for supplying ground to the line CLM is determined by the network shown in FIG. 30. In the step-by-step circuitry, the information as to class of service is provided to and from the bin 22. It should be noted that with step-by-step operation it is not contemplated that both 2 and 5 digit PBX's will be served by a pool of register-senders. In other words it is contemplated that a register-sender serving a 2 or 5 digit PBX will be provided with optional connections GC or NN as shown in FIG. 30. It will be obvious that the circuitry of FIG. 30 could be modified by circuitry obvious to those skilled in the art to include both 2 and 5 digit PBXes for use with a pool of register-senders as provided in the disclosed circuitry for 3 and 4 digit PBX. In operation for a 2 digit PBX, alternative NN will be connected in FIG. 30 and GC omitted. The routing digit cross-connect field will cause the bin 22 relay corresponding to line CLO to place a ground thereon. The grounded line CLO will cause ground to be applied to line CLM after two digits have been outpulsed, due to the closure of contacts OS-10 on operation of relay OS (FIG. 25). For a 3 or 4 digit PBX the storage bin 22 will be controlled by the routing digit information cross-connect field to operate the respective bin relays to place ground on lead CL-2 if a 3 digit PBX is being served and lead CL-4 if a 4 digit PBX is being served. In these alternative ground will be applied to lead CLM after three and four digits, respectively have been outpulsed by the respective operation of relays OT and OU. With a 5 digit connection option GC will be included and NN omitted and the routing digit information cross-connect field will be applied to operate relay CLO only. Thus ground will only be applied to line CLM after the fifth digit has been outpulsed. Relay CNS is energized by a −48V source and at the other side is connected to the lines CL0, CL1, CL2 and CL4. However, due to the large resistance of the relay, the presence of relay CNS and its battery do not affect the ground on these lines.

6. The sixth path available in the step-by-step release control network through DD1–10, CH-7 and P-14 operates in the same way as described in the correspondingly numbered paragraph for the No. 5 cross-bar circuitry.

Included herein is a summary of functions of more important relays of the register-sender.

Relay A (FIG. 13) is the inpulsing relay. This relay responds to incoming pulses and drives the inpulsing counting flip-flops relays PA and PB.

Relay AB (FIG. 13) is a supervisory relay that is connected across leads FT and FR. Relay AB operated serves to operate relay P2 on terminating calls to place the register-sender in a terminating mode. Relay AB serves no useful function on originating calls.

Relays AC, BC, CC, DC and EC (FIG. 17) form a counting chain for incoming pulses. These relays are controlled by inpulsing flip-flop counting relay PB.

Relays ACC, BCC, CCC, DCC, ECC and FCC (FIG. 27) form a counting chain for outgoing pulses. These relays are controlled by outpulsing flip-flop counting relay PBB.

Relay ALM (FIG. 29) is the relay that operates to bring in an alarm condition when a storage error is detected. This relay is slow to operate in order to ensure that an alarm will not result during the period in which the digit stored in the temporary memory is being changed.

Relays AS, BS, CS, DS, ES, FS, GS, HS and JS (FIG. 18) form the insteering relay chain. These relays are responsible for steering the subscriber dialed digits to the proper bins for storage.

Relay C (FIG. 15) is a relay in the inpulsing circuit that operates on the first break pulse of a digit and remains operated during the pulsing of a digit. Relay C is responsible for resetting the inpulsing flip-flop counting relays at the end of each digit and for operating relay D.

Relay CH (FIG. 29) is the relay that operates when two and only two T relays are operated. Thus relay CH operates whenever information is stored by two and only two relays in the temporary memory. This relay is used to effect register-sender release under certain circumstances when all digits stored in the bins have been outpulsed. Relay CH is slow to release to ensure that it remains operated during the period in which the digit stored in the temporary memory is being changed.

Relays CLA, CLB, CLC and CLD (FIG. 31) are provided in No. 5 crossbar offices only and are used for class-of-service in conjunction with the release cycle. Relay CLA will operate after the second digit has been outpulsed if the call terminates on a 2 digit PBX. Similarly, relays CLB, CLC and CLD will operate after 3, 4 and 5 digits respectively if calls were to terminate on 3, 4 and 5 digit PBX's in that order.

Relays CL0, CL1, CL2, CL4 and CL7 (FIG. 22) comprise storage bin 22 and are provided in SxS central offices only. These relays are associated with class-of-service indication in conjunction with the register release cycle. Relay CL7 will inform the register-sender whether or not the call will terminate within the home NPA.

Relay CNS (FIG. 30) is provided in step-by-step central offices only. This relay operates as a signal that the routing information and class-of-service have been stored in bins 4–13 and 22. This relay initiates the release of the routing digit information field.

Relay DD1′ (FIG. 32) is a relay used in the preparation of the operate path for relay DD1.

Relay DD1 (FIG. 32) is a digit recognition relay that operates if the second subscriber dialed digit stored is a 1 on FX calls or if the first digit stored is a 9 followed by a 1 as the third digit on PBX calls. This relay is used in conjunction with the release cycle.

Relay DSS (FIG. 13) is associated with data set control at the originating end. It is used in conjunction with the preparation of the originating 101C data set for sending.

Relays DG And G (FIG. 26) form a dial pulse generator. Relay DG will open and close the outpulsing loop as required and will step the outpulsing counter so that the pulses sent on the line may be counted. Relay DG will also step the outpulsing counter to time the interdigital interval.

Relay DTD (FIG. 14) operates when the dial tone detector receives dial tone and is used for signalling the start of outpulsing.

Relay E (FIG. 15) operates when relay C is energized upon receipt of the first break pulse during inpulsing. Relay E is required for proper operation of the insteering relay chain.

Relay D (FIG. 15) is a slave of relay C and performs certain functions with regards to inpulsing. Relay D resets the inpulsing counting chain at the end of the inpulsing of each digit and is responsible for controlling the insteering relay chain.

Relay DB (FIG. 16) is a relay associated with data set control at the terminating end. This relay is responsible for sending a "space" tone to the originating end register-sender for purposes of preparing the data sets for the exchange of information.

Relays DD and DD′ (FIG. 28) perform functions in the outpulsing circuit to ensure that the first pulse sent to the line is not distorted. In addition, relay DD′ is responsible for setting and resetting the outpulsing counting chain.

Relay DDO′ (FIG. 32) is a relay used in the preparation of the operate path for relay DDO.

Relay DDO (FIG. 32) is a digit recognition relay that operates if the first digit stored is an 0 or if the first digit is a 9 followed by an 0. Relay DDO is used in conjunction with release cycle.

Relay EE (FIGS. 23 and 24) is used in conjunction with the outsteering relay chain. It performs functions equivalent to relay E in the insteering relay chain.

Relay F (FIG. 30) is provided in SxS offices only. This relay operates when the routing digits do not include an area code. Relay F operated will control the outsteering relay chain in a manner such that storage bins 4, 5 and 6 will be skipped during outpulsing.

Relay FD9′ (FIG. 32) is a relay used in the preparation of the operate path for relay FD9.

Relay FD9 (FIG. 32) is a digit recognition relay that operates whenever the first subscriber dialed digit stored is a 9. This relay is used in conjunction with the release cycle.

Relays OA–OY inclusive (FIGS. 23, 24 & 25) form the out-steering relay chain. These relays are responsible for connecting each storage bin in turn to the temporary memory for outpulsing.

Relay P′ (FIG. 15) operates when the register-sender is seized by an originating caller. This relay performs the functions required to place the register-sender in the originating mode. Relay P is a slave of relay P′.

Relay P2 (FIG. 15) operates in the terminating end register-sender to perform the functions required to place the register-sender in the terminating mode. Relays P2A and P2B are slaves of relay P2.

Relays P3 and P3S (FIG. 14) operate in all cases when the register-sender is seized. These relays perform the seizure functions common to both originating and terminating end register-senders.

Relays PA and PB (FIG. 15) comprise a flip-flop circuit used in conjunction with inpulsing counting. Relay PB will drive the inpulsing counting chain.

Relays PAA and PBB (FIG. 27) perform functions similar to relays PA and PB. Relays PAA and PBB are used in conjunction with outpulse counting.

Relay PP (FIG. 15) is provided in SxS central offices only and is used to place the 101C data set into the outpulsing path after all routing digits have been sent. This switches the mode of outpulsing from dial pulses to frequency shift tones for the sending of the subscriber dialed digits.

Relay RC (FIG. 34) is the release control relay. This relay operates to initiate the register-sender release cycle in cases of normal release.

Relay RR (FIG. 34) is the release relay. This relay releases when relay RC operates provided that relay SS has released. Relay RR released will ground the RL lead to the trunk on originating calls.

Relay S (FIG. 28) is the "matching" relay in the outpulsing circuit. Relay S operates whenever the number of pulses sent matches the number of pulses to be sent. Relay S operated operates relay SS to create an interdigital pause.

Relay S1D (FIG. 16) is associated with the data set control. This relay operates as a signal that the data set is prepared for exchanging information.

Relay SL (FIG. 16) is associated with the data set control.

Relay SS (FIG. 26) operates after each digit is outpulsed to create an interdigital pause and remains operated during stop dial conditions.

Relays T-O, T-1, T-2, T-4 and T-7 (FIG. 28) comprise the temporary memory in the outpulsing circuit. Two of these relays will operate in accordance with the digit to be outpulsed.

Relay TD (FIG. 33) operates in cases of register-sender forced release.

Relays W and Y (FIG. 33) are associated with the "long" and "short" register-sender timeouts respectively.

Relay Z (FIG. 13) operates in the terminating end register-sender when the call is to a common control PBX or from a foreign exchange subscriber. This instructs the register-sender to await dial tone before starting to outpulse the subscriber dialed digits.

REGISTER-SENDER

GENERAL DESCRIPTION OF THE COMPLETION OF A CALL

When the register-sender is seized by the connection of the PBX trunk circuit by virtue of the connection of PBX leads T and R respectively to dial tie trunk leads TA-RA followed by the connection of the last mentioned leads, respectively to leads TA-RA of the register-sender relay A of the register-sender is connected across leads TA & RA and in accord with the common and well known design of exchanges the exchange provides a connection across the circuits T & R.

(Relay A having two windings, one connected between ground and line TA, the other connected between -48V and line RA). The windings of relay A are thus connected in a closed circuit through the PBX and relay A operates through its own 48 volt battery and ground.

Whereupon the following relays operate:
(reference is chiefly to FIGS. 15, 17 and 18)
Relay P′ is operated by the closure of contacts A-40.
Relay P is operated by the closure of contacts P′-4.
Relay P3 is operated by the closure of contacts P-5.
Relay P3S is operated by the closure of contacts P3-1.
Relay AS is operated (FIG. 18) by the closure of contacts P3–7, as a result contacts AS-6*o* then close to provide dial tone from the dial tone supply to the subscriber. This indicates to subscriber that he may now commence dialing. Relay A of the register-sender is thus connected across the loop formed with leads T & R and the PBX. Each subscriber dialed pulse in accord with normal PBX design causes a break in the loop holding Relay A closed and as a result Relay A opens in accord with each of the subscriber dialed pulses. Assume that the first digit dialed is 2. Relay A is normally operated at the time of the first break of the pulsing loop. Relay A releases at the break to operate relay PA of the inpulsing flip-flop (relay C being already operated by the closure of contacts P-3 and P3-2) so relay A releases to operate PA and also relay C (relay C is operated first). Relay C is designed to be slow to release so that it holds during the pulsing of a digit but releases during the interdigital pause.

When relay C operated it operated relay D at contacts C-10. The closure of contacts D-4 following the closing of contacts P3–7 and of contacts AS-11*o* operate relay BS of the insteering chain. When relay A restores at the end of the first break pulse, relay PB will operate over PA-4*o* and C-2 to operate relay AC in the counting chain by the closure of contacts PB-8*o*, contacts P3–5 and D-1 being also closed. Relay A releases at the start of the second break pulse putting ground on both sides of relay PA, P-3 and C-12 being then operated, releasing relay PA. (Relay P′ is sufficiently slow release to remain operated during the release intervals of relay A between pulses).

Relay PB will release at the end of the second break pulse due to the opening of contacts A-4*c* and the release of relay PB operates relay BC over contacts P3-5, D-1, PB-8*c* and AC-4. Relay PB remained operated during the release of relay PA because PA-4*c* closes before PA-4*o* opens. The first inpulsed digit has now been counted.

Relay C will release near the start of the pause between the incoming digits (since its slow release holds between pulses but not during the interdigital pause). Relay C releasing will release relay D due to the opening of contact C-10. Relay D is also a slow release relay. During the period in which relay C has released and relay D is still operated a ground is connected through the closed contacts of relays AC and BC in the insteering diode network. The ground is passed through the closed contacts P3–5, D-1, C-9, EC-2*c*, AC-2*o*, BC-11*o* and CC-2*c* to the pair of diodes leads marked digit 2 and over the diodes in these two lines to the register storage bin leads corresponding to digits 0 and 2. Since relay AS in the insteering circuit is now operated, all the storage bin leads over AS-1, -2, -3, -4 and -9 in bin 14 (FIG. 21) are connected to the steering diode network output and the $\alpha$ 0 and $\alpha$ 2 relays in the bin corresponding to the digits 0 and 2in the bin are operated between -48V connected to one side of the relay and the ground to the two diodes marked 'digit 2' previously described (FIG. 17) the relays locking over the respective relay contacts α 0-1 and α 2-1 through the connection to line LG3 which is connected to locking ground (not shown). It should be noted that contacts α 0-2 and α 2-2 connect locking ground line LG-3 to the 0 and 2 bin output leads.

Relay D released, releases relay AS by opening contacts D-4 since the E-10 contacts are open, E being held over its own contacts E-12 and contacts P3-1. Relay D will reoperate as a slave of relay C at the initiation of the first break of the first pulse of the next digit. When relay D reoperates, relay CS will operate over contacts P3–7, D-4, AS-11*c*, BS-11*o* and CS-8*c*. It is noted that, with CS operated, BS, previously operated, remains operated over CS-6*o* of the early-make-break pair CS-6*o* and CS-6*c*. BS has remained operated over BS-8*o* of the early-make-break contact pair; CS-6*o*, D-4 and P3–7. Since relay BS is still operated as relay C releases, at the start of the second inter-digital pause, the second subscriber dialed digit will be insteered to storage bin 15 over those contacts marked BS (1,-2,-3,-4,-9). The process continues until all subscriber dialed digits have been counted and stored, in successive bins.

Figure 21:
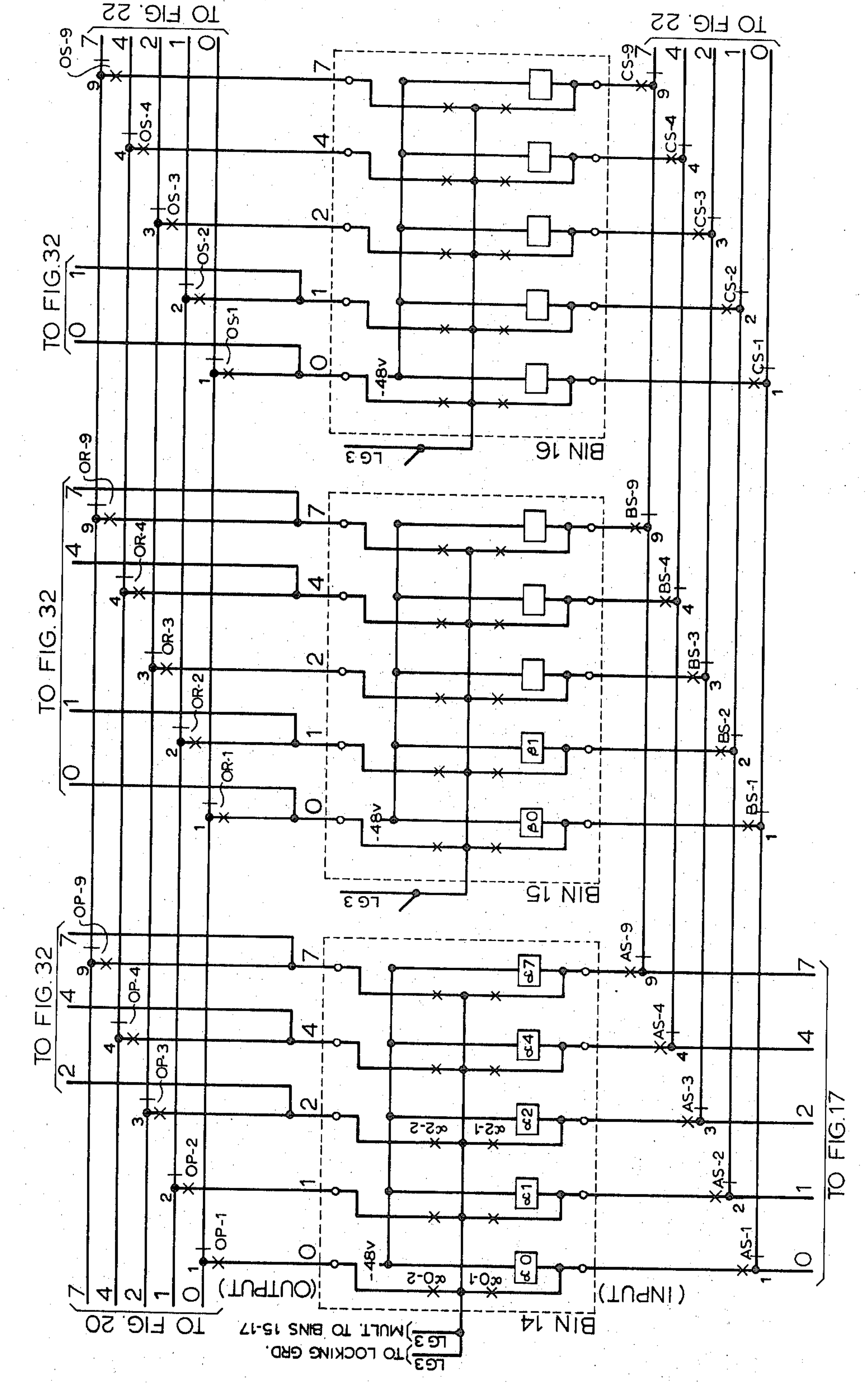

Referring to FIG. 21 showing the input to the storage bin, it will be noted that operation of two relays does not cause ambiguity in the storage bin filled by the digits from the insteering diode network since the operation of two relays implies that the first relay operated prevents feeding of the next higher numbered storage bin by the next higher lettered relay. Thus, on operation of the relay being the lower lettered relay, relays are operated in the appropriate storage bin corresponding to the digital wires grounded during the closure of contact C9 defining the inter-digital pause.

In step-by-step local central offices, the register-sender is the instrument for setting up the connection (preferably over the DDD connection) to the corresponding distant end trunk. The information regarding the digits to be outpulsed will be obtained from the routing digit information field and stored in bins 4–13. This information will consist of a three digit NPA code and a seven digit telephone number. The DDD access code will be permanently strapped in bin 1 and possibly bins 2 and 3.

When the register-sender was seized and A was actuated, relay P3 was operated due to the closing of contacts P-5 and relay P3S was closed due to the operation of contacts P3-1. Operation of relays P3 and P3S operate relay OA (the first outsteering relay operated in step-by-step offices) in the outsteering circuit due to the closure of contacts P3S-12. Relay OA (FIG. 24) connects Bin 1 (FIG. 19) to the windings of temporary storage relays T-O, T-1, T-2, T-4 and T-7 (FIG. 28); and since this is a transferral of information regarding the digit 1 for the DDD code, relays O and 1 will operate. Thus two T relays have operated and in case of all digits there will be two and only two relays operated, provided that there is no error in storage. In FIG. 29, circuitry is provided for checking the operation of the T relay and it will be seen that the circuitry network is such that if two and only two relays are operated, then relay CH will operate. However if less or more than two T relays are operated, a ground will be connected through the storage checking network to the ALM lead. This will operate relay ALM (FIG. 29) and create an alarm condition which may be evidenced for detection in any desired manner. However relay ALM is designed so that its operation will be sufficiently retarded that it is not set off during the overlap situation caused by the early-break overlap between the closing of the open contacts -2*o* and -4*o* of the T relays and the opening of the contacts -2*c* and -4*c* of the T relays (FIG. 29). In step-by-step offices, where the register-sender outpulses the routing digits, relays P and P3S in addition to operating relay OA will also operate relay PP over contacts PP-7, OP-12 and P-4. Relay PP, operated, connects (FIG.13) the sender pulsing loop leads TS and RS to leads FT and FR to the dial tie trunk via the link circuit. The connections are made first at PP-9*o* and PP-11*o* and next at PP-1*o* and PP-3*o* (FIG.13) so that the routing digits may be outpulsed to the switching equipment after the trunk has in the conventional manner, in the associated local central office, seized a line finder and a first selector.

When a line finder and first selector have been seized, the local central office in accord with conventional design and modus operandi, will provide a dial tone along the connection just described and will be passed from the trunk to the register-sender on leads FT and FR. The dial tone detector (whose design is not shown but which is well known to those skilled in the art) is designed to detect this tone at lead TS (FIG. 13) and on detection, to complete (FIG.14) the connection indicated by the dotted line by closure of the switch Δ-1, thereby operating relay DTD over P3-1 which locks over DTD-6 under the control of contacts P-2 for the balance of register-sender seizure under the control of relay P through its contacts P-2. Relay DTD operated will place a short circuit across coil L1 indicated in FIG.13 as DTD-2, to remove the dial tone detector from the line.

When relay DTD operated contacts DTD-8 closed-(assuming no alarm has been set off to actuate relay ALM),relay G in the (FIG. 26) dial pulse generator will operate over contacts DG-9,ALM-6, DTD-8,P-8 contacts just mentioned. The parallel connections to ground do not operate, on the one connection because P2B-12 is open and, on the other connection because it is absent with the step-by-step option. On operation of relay G contacts G-1 close to operate relay DG which disconnects relay G at DC-9 followed by the opening of G-1, followed by the reclosure of DG-9, and so on, with relay DG acting as the pulsing relay over pulsing contacts DG-8. The adjustments of the resistors DGR and GR is made such that DG will be operated for 66 milliseconds and relay G will be operated for 33 milliseconds. It will be noted that, while connected, the dial pulse generator will pulse continually. The pulsing contacts DG-8 are located in the sender out-pulsing loop (FIG. 26*a*). It will be noted that the effects of the pulsing of contacts DG-8 may be nullified by being shorted by contacts DD'-8 closed or SS-2 closed and that the pulsing loop may be broken by the opening of contacts RC-5, contacts P2B-1 being open in the originating register-sender.

With relay DG now pulsing continuously the contacts DG-8 open, which is their design activity, to send pulses to the line, however, these pulses do not appear across lines TS-RS until relay DD' operates and DD'-8 opens to remove the short between TS and RS. Seizure of the lines TS-RS by the local central office causes a voltage to be applied across these lines which allows contacts DG-8 to provide pulses with DD'-8 open.

The sending of one digit only on to the line will be described as the sending of the other digits will be similar. If the digit 2 is to be sent on the lines TS-RS, then the relays T-O and T-2 in the temporary memory (FIG. 28) will be operated. When dial tone is received from the local central office, as described relay DTD will be operated to cause relay DG to pulse continuously. At the first closure of relay DG contacts DG-11 (FIG. 28) close and relay DD will be operated preparing an operating path through relay DD and its contacts DD-1 to relay DD', however relay DD' will not operate since both sides of its winding are connected to ground (T-0-10 and T-2-10 being closed). However when relay DG releases DD' is operated due to the opening of contacts DG-11 and the operation of DD' will open contacts DD'-8 (FIG. 26 ) removing the short across contacts DG-8 so that the next energization of relay DG causes the sending of a pulse over the lines TS-RS.

When relay DD' operates, it closes contacts DD'-12 (in the outpulsing counter circuit, FIG. 27) and relay PAA FIG. 27 is operated over contacts PAA-4C, DG-10 and DD'-12. However PBB does not operate at this time since ground is connected to both sides of its winding. When DG operates to send the first break pulse over lines TS-RS, flip-flop relay PBB will operate due to the opening of contacts DG-10 to operate relay ACC in the counting chain, also readying the path to relay BCC by the closing of the contacts ACC-4. When relay DG releases at the end of the first break pulse, relay PAA is released since ground now appears across both sides of its winding and with the release of relay DG, contacts DG-11 close (FIG. 28), extending a ground through SS-4, DG-11, FCC-10, ACC-5, BCC-10*c* to contacts T-0-1 and T-1-1 and on the other side the two last mentioned contacts to relay S.

However since relay T1 is not operated (for the digit 2 only relays T-0 and T-2 are operated) this circuit is not completed, and relay S is not operated since contacts T-1-1 are open. When relay DG operates to send the second break pulse, relay PBB restores due to the opening of contacts DG-10 and relay BCC operates over PBB-8 and ACC-4. (The operation of relay BCC closes contacts BCC-8 but this is of only of importance in the situation where a third pulse is to be sent which will not occur in the example given where the digit 2 is being sent.) Relay DG released at the end of the second break pulse, reoperates flip-flop relay PAA and extends a ground to the contacts of relays T-0 and T-2 in the outpulse matching circuit over contacts ACC-5, BCC-10*o*, CCC-2*c*, T-0-3 and T-2-1. Since the relay T0 and T2 have been operated by the temporary storage relays, the contacts T-0-3 and T-2-1 are closed and relay S operates. The operation of relay S operates (FIG. 26) relay SS over S-1 which creates an inter-digital pause by shorting the pulsing loop by closing contacts SS-2. Relay SS operated opens contacts SS-4 to release and reset relays DD and DD', (FIG. 28) and closes contacts SS-3 to place a ground on line OS (Contacts SS-3 are shown in FIG. 26). This operates the next relay in the outsteering relay chain, which will have 22 relays in the chain (FIGS. 24 and 25) for step-by-step; or 10 for No. 5 cross-bar (FIG. 23). The amounts of 22 and 10 relays, respectively, correspond to the registration of 8 subscriber dialled digits. In applications where the number of subscriber dialled digits will always be less than 8 for the register-sender, the number of digits in the register sender may be correspondingly reduced).

Assuming that OA was the last relay operated, which would occur in a step-by-step office, then, if the direct distance dialing code were 112, the next relay operated would be OB. In FIG. 24 where the code is 112, this involves the use of the jack-connectable connections (option A) and the ommission of jack-connectable connections (option B), results in the operation of OB after OA. Where the direct distance dialing code is 1, the jack-connectable connections (option B) are used and the jack-connectable connections (option A) are not. With connections (option B) in lieu of the A connections, the relay OD operates next after OA. When the routing digits do not include an area code, relay F operates contacts F-8*o*, F-8*c*, F-10*o*, F-10*c* and relay OG operates next after relay OC. Relays ON – OY operate in order. Where the register-sender is associated with a No. 5 cross-bar (FIG. 23) the first relay operated is ON and the relays ON to OY operate in order.

In the No. 5 cross-bar arrangement (FIG. 23) of out-steering relay chain, it will be seen that relay ON is operated when P3S closes and locks over ON8 and the series of -6C contacts of the relays OP to OY inclusive, while the closure of ON closes contacts ON-10 to operate relay EE and open the direct connection between relay ON and contacts P3S-12. The operation of ON closes contacts ON-11 operating relay OP. OP operated will maintain ON operated over OP-6 to the OS line but will break the direct connection to P3S-12, thus ON will release as soon as ground is removed by contacts SS-3 on the release of relay SS. Thus each time contacts SS-3 close on the operation of relay SS they will operate the next relay after the one already operated in the outsteering relay chain and when they release they will release the lower letter of the two relays in the relay chain then operated.

Completion of the DDD connection to the corresponding distant end trunk will now be described.

In step by step central offices the register-sender sends the information to achieve connection to the corresponding distant end trunk. In such register sender the information regarding the digits to be outpulsed will be obtained from the routing digit information field and stored in bins 4 to 13. This information will consist of a 3 digit NPA code (if required) and a 7 digit telephone number. The DDD access code will be permanently strapped in bin 1 and possibly bins 2 and 3.

'DDD' is an abrreviation for direct distance dialling, a well known telephone technique whereby the presence of signals on a telephone line achieves long distance connection without the interposition of a telephone operator.

'NPA' is an abreviation for 'numbering plan area' a well known system which assigns a group of digits (usually three) to a geographical area; this group of digits is commonly known as an area code.

In a step by step central office therefore, the pulses conveying the routing information are first sent forward from the sender outpulsing loop over leads TS and RS contacts P2B-2*c* and P2B-4*c*, PP-9*o* and PP-11*o*, PP1-0 and PP3-0, to the dial tie trunk leads FT and FR noting that the pulses received from TS and RS take the same form on the leads FT and FR and at the local central office as subscriber dialed digits, and hence in achieving the connection from the originating local central office to the central office is concerned, the effect is the same as with subscriber dialed digits and the result is the same, achieving connection to the terminating local central office, and therethrough to a register-sender at the terminating end (as hereinafter described) and to a PBX dial tie trunk (as hereinafter described). It will be noted that the contents of the bins numbered up to 13 achieve the connection without the requirement of any subscriber dialed digits. These bins however are used with step-by-step offices only.

In the register for a step-by-step central office, when the last routing digit has been outpulsed, relay OP which corresponds to bin 14 will operate releasing relay PP by opening contacts OP-12, it being noted that contacts P3S-3 are already open. When relay PP releases its contacts -11, -9, -1, and -3 (O and C in each case) return to their states as shown in FIG. 13.

The normally closed contacts PP-11*c* and PP-9*c*, connect the sender outpulsing loop leads TS-RS to the input of the data set at terminals B 1-B2. At the same time the closure of contacts PP-1*c* and PP-3*c* connects the output of the data set at terminals B3 and B4 to the dial tie trunk leads FT and FR over the connection already established to the terminating register-sender.

The operation of the data set is described elsewhere.

With a No. 5 crossbar central office, a sender operating similar to the sender described, is actuated by the seizure of the PBX trunk. The seizure of the PBX trunk, causes the consultation of a memory circuit (elsewhere described) and a sender is caused to actuate this to provide the pulsing to provide the connection achieved in the above description with the register-sender. This connection, is schematically shown at the right of FIG. 1. In accord with techniques well known to those skilled in the art, the sender transmits the pulses after the associated dial tie trunk leads connected to leads T1–R1 are seized by the associated local central office.

The terminating end dial tie trunk has circuitry similar to that previously described and this is also true of the dial tie trunk and the data set. The terminating end dial tie trunk is seized and as previously described, such seizure is achieved by the application of ground to lead T1, the operation of relay H, and the other operations described in connection with the dial tie trunk as a result of seizure and the operation of the dial tie trunk circuitry by the terminating local central office. As previously described, relay AB is operated by the voltage across leads T1, R1. A register-sender at the terminating end, is seized by the link circuit operating as described therein. In the register-sender (FIG. 15*b*) relay P2 is operated by the closure of contacts AB-1, relay P2A is operated by the closure of contact P2-12, relay P2B is operated by the closure of contacts P2-12, relay P3 is operated by the closure of contacts P2A-10 and P2B-10, relay AS is operated (FIG. 18) by the closure of contacts P3–7, relay OP is closed by the closure of contact P2A-11, and P3S-12, (FIG. 23) or P2B-11, P2A-11 and P3S-12 (FIGS. 24, 25). The data set is placed in an answering mode.

On terminating calls, it will be noted that relay AB operates before relay A (because the loop from the local central office is closed across relay AB before the PBX loop is closed across relay A) so that contacts P2A-9 open to prevent relays P′ and P from operating. (FIG. 15a)

(It will be recalled that on originating calls relay A will operate before relay AB thereby operating relays P′ and P preventing through the opening of contacts P′-5 relays P2, P2A or P2D from operating).

It is noted that relays P3 and P3S will operate whenever relay P or P2 operates, i.e. on both originating and terminating calls. Relay AS is operated by the closure of contacts P3–7 at the terminating as well as the originating end.

With the operation of relay P2A, P2B contacts P2A-2*o* and P2A-4*o* close to connect the output of the data set to the pulsing relay A. Contacts P2B-2*o* and P2B-4*o* close to connect the sender outpulsing loop represented by leads TS – RS to the dial tie trunk PBX over leads TA and RA. As relay AS is operated, the insteering pulse counter diode network will be connected to to bin 14, while operation and release of relay A (in accord with the pulses sent on leads B5-B6 from the data set) drives, through the operation of contacts A-4*c* the inpulsing flip-flop. The inpulsing flip-flop will operate, as previously described in connection with the corresponding originating end equipment, since although contacts P-3 will remain open at the terminating end flip-flop, contacts P2A-1 will be closed as will the contacts of S1D-2. Relay S1D is operated by the closure of contacts (FIG.16) P2A-8*o* and A-2. S1D is controlled by the data set since relay A is operated by the data set on receipt of *f*1M tone and relay S1D operates its contacts including S1D-2 when the data set is ready to receive information from the originating end data set.

The operation of the relay S1D to complete the operating path for the flip-flop PA-PB (FIG. 15) is completed by the operation of P2A and S1D. Relay P2 operated in the terminating register-sender closes contacts P2-11 to operate a relay (not shown) in its data set to put the data set in an answering mode, (FIG. 16). P2 operating opens P2-6*c* to disconnect ground and dial tone ground from relay A, opens P2-8*c* to disconnect -48V from relay A and closes P2-6*o* to connect the windings of relay A together ready for energization by the -20V applied across B5–B6. Contacts P2-8*c* open before the closure of contacts P2-6*o*. As previously stated relay P2A operated will connect relay A to the data set "receive" path. Relay P2A operated also removes relay DSS from across the receive loop by opening contacts P2A-5 and operates relay DB (FIG. 16) by the closure of contacts P2A-3. Relay DB operated prepares to remove minus 20 volt battery from the data set "send" lead (FIG. 13) by opening contacts DB-6. The terminating end data set after 1.4 second delay from seizures, sends *f*2M to the originating end.

The terminating end data set receives a consequent *f*1M tone from the originating end and is designed to delay 0.25 seconds before grounding its receive lead as shown by the transistor switch, to operate inpulsing relay A. Since relay P2A is already operated contacts A-2 and P2A-8*o* are closed operating relay S1D. Relay S1D operated removes -20 V battery from the send lead of the data set by opening contacts S1D-9 causing the data set to send a space signal " 2S" to the originating end. Relay S1D operating at the terminating end will release relay DB closing contacts DB-6 to again place -20 V battery on the send lead thereby changing the 2S tone back to 2M for the remainder of the seizure period. Relay DB is slow to relase and allows 2S tone to be sent from periods of up to 40 to 85 milliseconds.

Going back to the receipt of signals by the terminating data set relay AS operated connects the insteering diode network to the bin 14.

It will be noted that the inpulsing flip-flop PA - PB is activated to receive the pulses through the line composed of A-4*c*, P2A-1, S1D-2, C-12 and, generally as previously described, so that the terminating flip-flop will operate in accord with the pulsing of relay A as controlled by the terminating data set, it being noted that relay C is operated by contacts P3-2 as before, relay D is operated by contacts C-10, as before. Thus the terminating end insteering pulse counter will be operated by the contacts PB-8*o*, PB-8*c* as previously described, to activate the insteering diode network which, as in the previous description, feeds first the bin 14 and later the other bins as previously described.

Thus in general it will be seen that the input of the register-sender and its operation are the same as at the originating end. The digits sent from the originating end data set are stored in the terminating end register-sender and the operation is the same regardless of the type of local central office involved. However, there will be variations in send start within a given central office depending on whether the call completes to a step-by-step PBX, a common control PBX.

From an examination of the dial pulse generator circuit it will be seen that the dial pulse generator will commence to pulse on the operation of relays P2B and P3S (FIG. 26), it being noted that relay Z does not operate unless the call is to a common control PBX or from a foreign exchange subscriber, neither of which is present in the example described.

Outpulsing may therefore commence as soon as a digit is stored in the register-sender.

Thus the pulsing unit will commence as soon as P2B-12 and P3S-5 are closed but pulses do not go on the line until relay DD' is operated opening contacts DD'8 and removing the short from across contacts DG8. The pulses are now sent out to the local PBX, over lines TS-RS, across contacts P2B-2*o*, P2B-4*o*,lines TA-RA, line T-R (FIG. 4).

In this manner the pulses are sent to the PBX. It will be clear from the register-sender description that the time encompassed by the exchange of tones between the originating and terminating data sets and storing the first digit in the register sender, is sufficient to prepare the PBX for the incoming pulses.

The example given describes the completion of a call to a step-by-step or No. 5 crossbar central office.

When a call is completed to a common control PBX the ground will be applied at the PBX, to the line T connected to lead TA and due to the operation of P2-4*o*, relay Z will operate. (FIG. 13) Relay Z operated will break the short circuit across coil L1 by opening contacts Z-2 placing the dial tone detector across the line, and opening contacts Z-3 to prevent the initiation of operation of the dial pulse generator. When dial tone is detected, relay DTD will operate (This relay cannot lock at this time) and relay Z is released by the opening of contacts DTD-7, the trunk having removed the ground applied through line TA. With the dial pulse generator started by the closure of contacts Z-3 and coil L1 shorted from the line, the first digit will be outpulsed to the PBX as soon as a digit is stored in the temporary register.

DATA SET

The data sets, in accord with the preferred embodiment of the invention, are preferably in the form described in Canadian Pat. No. 716,185 which issued to Western Electric Company, Inc. of New York, N.Y., U.S.A. on Aug. 17, 1965. The data set, manufactured by the same company is known as the 101C. Such data sets are designed for connection in pairs. Each is designed for operation in one of two modes. In the first, or *originating* mode, the data set receives at an input make and break signals of the type received from a business machine or from the dial pulse output of a telephone subset, and to provide at an output, frequency shift signals in a binary signalling form, within the voice band. In the second, or *terminating* mode, the data set receives at an input, frequency shift signals as above described, and provides at an output, make and break signals, and in accord with this invention, the make and break signals are in the form of a dial pulse signal in the same form as that provided by a telephone subset. (Means for converting Touch Tone to dial pulse signals and vice versa are well known to those skilled in the art, hence where one or both PBX with which the data sets are used, is operated by Touch Tone signals, the data set connected to such a PBX may easily be adapted to receive touch tone signals and provide frequency shift signals, or vice versa. The invention is thus equally adapted to Touch-Tone as to dial pulse PBX).

The data sets are (also as disclosed in the aforesaid Canadian Patent) designed so that when connected together, over the connections established over the normal telephone system between the geographically spaced central offices, an exterior control signal applied to one of the data sets, places it in the first mode, and seizure of the terminating end data sets by the terminating end dial tie trunk results in placing the other data set in the second mode. The data sets are further designed, so that an exchange of signals between the data sets, electrically signals that transmission may commence, and that signals from (here) a dial pulse source, supplied to the data set which is in the first (originating) mode, will be sent to the data set which is in the second (terminating) mode, and from the data set in the second mode in (here) dial pulse form to a device adapted to receive such signals. As well known, and disclosed in the aforesaid Canadian patent, such a pair of connected data sets are operable in either of two directions and the direction is determinable by exterior control.

With a data set as designed to operate in accord with the aforesaid Canadian patent, the operation of its external control relays is as herein described.

FIG. 16 shows the exterior connections for the data set. At the originating end the loop marked DATA SET ORIGINATING START is closed by the operation of relay P' before the operation of relay P3S (see also FIG. 15). The closure of the contacts P'-10 before the opening of contacts P3S-4 completes this loop for the interval between the operation of the relays P' and P3S and, in accord with the design of the data set, the closure of this loop sets the Data Set in the originating mode. At the terminating end, the loop marked DATA SET TERMINATING START is closed by the operation of relay P2 before the operation of relay P3S (see also FIG. 15). The closure of the contacts P2-11 before the opening of contacts P3S-7 completes this loop for the interval between the operation of the relays P2 and P3S and, in accord with the design of the data set, the closure of this loop sets the Data Set in the terminating mode.

Other exterior connections for the data set are shown in FIG. 13.

The data set includes leads B3 and B4 which are used, initially for signalling between the data sets. In the originating mode, the data set is designed to receive at terminals B1 and B2 the pulse input from the originating sender outpulsing loop which results in tones sent from the originating output terminals (in the originating mode) B3 and B4. Thus in accord with the operation of the data set, connection and disconnection of the -20V battery to and from the send lead will cause tones designated 'mark' and 'space' respectively across contacts B3 and B4.

In the terminating mode, receipt at terminals B3 and B4 of the tone designated 'mark' in accord with the operation of the transistor switch closes the transistor switch connected between ground and resistance R11 connected in series to a −20V source. The resultant ground across the diode to terminal B5, while −20V is applied to terminal B6 will operate relay A. Receipt of the signal designated 'space' at terminals B3 and B4 causes opening of the transistor switch connected to terminal B6 and when B5-B6 are connected thereto releases relay A. Operation of relay A feeds the received mark and space information into the receiving end register.

The 101C data set in the ORIGINATING mode will preferably use the following frequencies:

SEND:

1,270 cps - (designated "*f*1M") - corresponding to a mark signal to indicate a closed pulsing loop.

1,070 cps - (designated "*f*1S") - corresponding to a space signal to indicate an open pulsing loop.

RECEIVE:

2,225 cps - (designated "*f*2M") - corresponding to a mark signal at the terminating end.

2,025 cps - (designated "*f*2S") - corresponding to a space signal at the terminating end.

Similarly, the 101C data set in the TERMINATING mode will send *f*2M and *f*2S and will receive *f*1M and *f*1S as indicated above.

2. Seizure and Sending of Subscriber Dialed Digits (FIG. 16)

When the originating end register-sender is seized, relay P′ operates a relay in the data set to place the data set in the originating mode. The data set will not await a tone signal from the distant end.

Establishment of the DDD connection to the distant end truck results in seizure of the terminating end register-sender. Relay P2 operated before relay P3S in the terminating register-sender will operate a relay in its data set to put the data set in an answering mode. Relay P2A operated will also connect relay A to the data set RECEIVE path (FIG. 13). Relay P2A operated will remove relay DSS from across the RECEIVE loop by opening contacts P2A-5 and will operate relay DB (FIG. 16) by closing contacts P2A-3. Relay DB operated prepares to remove −20V battery from the data set SEND lead by opening the contacts DB-6 (FIG. 13). The terminating end data set, after a 1.4 sec. delay from seizure, sends *f*2M to the originating end.

The originating end data set, upon receipt of *f*2M tone, waits 0.5 seconds and then returns *f*1M tone to the distant end data set. At this time due to the receipt of the *f*2M tone, the originating end data set will, provide power across B5 and B6 to operate relay DSS at the originating end to operate relay SL, (FIG. 16) by closing contacts DSS-6. Relay SL operated locks under control of relay P3 and prepares the operate path for the S1D relay by closing contacts SL-10. Relay S1D will operate over SL-10 when relay DSS releases upon receipt of a space signal (*f*2S) from the terminating end.

The terminating end data set, upon receiving *f*1M tone, is designed to delay 0.25 seconds before grounding its RECEIVE lead over the transistor switch to operate inpulsing relay A. Since relay P2A was operated early in the register-sender seizure cycle, relay A operated will operate relay S1D over A-2. Relay S1D operated removes −20V battery from the SEND lead of the terminating data set, opening S1D-9 causing the terminating end data set to send a space signal (*f*2S) to the originating end. Relay S1D operating at the terminating end, will release relay DB at S1D-7 to again place (by closure of contacts DB-6) −20V battery on the SEND lead, thereby changing the *f*2S tone back to *f*2M for the remainder of the seizure period. Relay DB is slow to release and allows *f*2S tone to be sent for period of 40–85 ms.

The originating end data set, upon receiving *f*2S tone for this length of time, releases relay DSS by removing the ground from B5 which in turn operates originating end relay S1D by closing contacts DSS-9. Relay S1D operated will remove ground from the winding of stop dial relay SS by opening contacts S1D-5A, (FIG. 26*a*) or S1D-5B. In the originating end data set the sender pulsing contacts DG will now control the SEND lead to the data set, thereby sending the subscriber dialed digits to the distant end. (FIG. 26*b*)

The terminating end data set receives the tones corresponding to the subscriber dialed digits and drives the inpulsing relay A. The pulses are counted and stored in the terminating register.

The CON contacts of the 101C data set shown on register-sender FIG. 13 provide a 20 volt battery supply when CON is operated. CON is operated when the receiver detects a tone ($f_{2m}$ or $f_{1m}$). At the originating end, this battery is the operating battery of relay DSS which operates when the transistor switch in the data set closes to put ground on the receive lead B5. CON contacts prevent DSS from operating at other times.

THE LINK CIRCUIT

The circuitry of the link circuit, one of which is associated with each local central office using the inventive system, is shown in FIGS. 10, 11 and 12 and the relays contacts and switching elements are arranged as shown.

Dial tie trunks occur, under the inventive system, in pairs respectively corresponding to local central offices. At each central office where the invention is used, there will be one or more dial tie trunks each of which will be paired with a dial tie trunk at another local central office which other local central office will often be different for different pairs. At each central office where the invention is used, there may, therefore, be a plurality of dial tie trunks paired with trunks in other locations, but these other locations may be different for different pairs.

At each local central office having such dial tie trunks there will also be one or more register-senders in lesser number than the trunks each to be connected to a trunk circuit, as required. It is the purpose of the link circuit to achieve such connection if a register-sender is available, when required by a dial tie trunk. When, with the link circuit, a register-sender is not available, then means are provided, within the circuitry of the invention, to send a busy signal to the calling party.

It is within the scope of the invention (although economically costly), to provide a register-sender permanently assigned to each dial tie trunk. In this event the link circuit would not be required.

In the link circuit embodiment discussed, there are assumed to be three such dial tie trunks served by two register-senders.

At the same time that a line circuit at the local central office for association with a dial tie trunk is being seized, the link circuit will be in the process of attaching an idle register-sender to the trunk. As shown in FIG. 5 the relay T in the link circuit is operated on the closure of contacts BB-1, and the relay T of FIG. 5 will be one of the relays T1′ to T3′ of FIG. 10. Thus there will be a T relay corresponding to each dial tie trunk. It will be assumed that two dial tie trunks corresponding to relays T2′ and T3′ simultaneously require use of a register-sender where there are two register-senders, numbered 0 and 1, and that at the time of such requirement, there are two register-senders, both of which are idle. At such time, prior to connection of a dial tie trunk to a register-sender, relays R0 and R1 corresponding to the two register-sender-data sets are operated and relays R0′ and R1′ corresponding to the two register-senders are released. (FIG. 11)

It will be noted that if the register-sender 0 (corresponding to relays R0 and R0′) were in use contacts P3S-5 (FIGS. 11 and **15*b***) would be open and hence relay R0 would be released.

The requests by the trunks 2 and 3 operates both relays T2′ and T3′ (T2′ over T2′-11, T3′-11, over all the -*9c* contacts of relays from T2′ to T1′ inclusive, LPB-12, and resistance TR; and T3′ over T2′-*9c*, T1′-*9c*, LPB-12 and resistance TR). When T2′ operates, T2′-*9o* is arranged to close, not only before its counterpart T2′-*9c* opens, but before T2′-11 opens. Thus the energization of T2′, once initiated, is maintained over T2′-*9o*, the -*9c* contacts of relay T1′, LPB-12 and TR. However, the opening of contacts T2′-*9c* releases relay T3′ and trunk 3 must now wait for connection to a register-sender until trunk 3 is connected to a register-sender. Operation of relay T2′ closes contacts T2′-12*o* which completes a path for operation of relay LPA over (LPA) LPB-10, LPA-5, T1′-12, T2′-12 to the ST2 lead, which is the ST lead of FIG. 5.

Relay LPB did not operate before the operation of a T relay, because it had −48V on each side of its winding and it does not operate on the operation of T2′ and LPA since LPA operates first and closes LPA-5*o*, ground appears on both sides of winding LPB. Relay LPA operating locks under the control of contact LPB-10 over LPA-5*o*.

As previously stated, all R-relays will be operated and all R-′ relays released before the operation of the link circuit assuming that all register-senders are then idle. The operate path for the R′ relays will be broken since contacts LPA-1 are open.

LPA operated operates relay R0′ over **LPA-1, R0-2*o* which finds a multiple locking path through R0′-12*o*, R0-1 or R1-1. Relay RO′ operated prepares to apply a shorting ground to the winding of the relay R0(by closing contacts R0′-10*o* and places an operating ground for that relay closing R0′9*o* before R0′9*c* opens) under control of relay LPB (through contacts LPB-9). (A shorting ground will appear on the windings of relay R0 (across R0-4 and R0′-10) when R0 is released by the opening of contacts LPB-9. This will prevent the reoperation of relay R0** when relay LPB releases and LPB-9 recloses).

Relays R0 and R0′ are now operated contemporaneously (in FIG. 12) to energize select magnet SMO in the cross-bar switch over R0′-8 and R0-5. R0 and R0′, simultaneously operated connect ground over R0-3, R0′-11 to one side of the now open contacts **LPB-8*o*.(FIG. 10) The last-mentioned ground will be effective when LPB operates, to maintain it operated over the last-mentioned contacts and over LPB-8*o* when ground has been removed from the ST lead. The operated select magnet SMO completes a ground through the contacts T2′-8 of relay T2′ operated (here considered T of the second dial tie trunk) to energize the vertical magnet associated with the trunk being served (here VM2). Thus the cross-bar switch operating in accord with its design and operating criteria well known to those skilled in the art, connects register 0 determined by its closed P3S contacts P3S-5 and the second dial tie trunk (as exemplified by the trunk of FIG. 4) determined by its closed contact T2′-8, FIG. 12. Thus the leads TA, RA, FT, FR, CL and RL of register 0 (as described in connection with FIGS. 13 etc.) are connected to the correspondingly designated leads of the dial tie trunk designated ′2 (as described in connection with FIG. 4** etc.).

At the time of operation of the vertical magnet contacts VM2, the off normal springs close contact VON-1 to place a ground on the H lead (FIG. 12 and FIG. 5) through contacts VON-1, T2′-8, SMO-1. This operates relay CO in the dial tie trunk (FIG. 5). Operation of relay CO will (FIG. 5) remove ground at CO-2 from the ST lead (ST2, FIG. 10) toward the link. This (FIG. 10) will release relay T2′. At the same time relay LPB will operate (due to removal of the ground on the ST2 lead). The opening of contacts LPB-10 releases relay LPA and locks over **LPB-8*o* of an early-make-break pair over RO′-11 and RO-3. The opening of contacts LPB-9 releases relay RO which, in turn, releases relay LPB at RO-3. Release of relay LPB allows, through the closure of contacts LPB-12,** the preference circuits to establish another connection.

Relay RO cannot operate until relay RO′ has released. This will not occur until all R relays have restored. Thus the third trunk, whose connection was delayed by the opening of contacts **T2′-9*c*, with the reclosure of these contacts, has its lead ST-3 connected over relay T3′**, and the -*9c* contacts of all T relays of lower number, LPB12, and resistance TR to −48V operating T3 and closing T3′-12, the operation of connecting trunk 3 to register 1 is the same (using relays R1 and R1′) as just described for connecting trunk 2 to register 0. When the connection of trunk 3 to register 1 is completed, relay R1 restores. If there were more than two register-senders and hence more than two R relays, relay R1′ would remain operated until all R relays were released. Such sequence sould continue with each register-sender being seized in turn. When all register-senders (here '0' and '1') have been seized once during the cycle, all R relays (here RO and R1) will have released, thereby breaking the holding path for all R' relays (here R0' and R1'). The R' relays will restore causing those R relays to restore at such time as the corresponding register-sender is disconnected allowing its contacts P3S-5 to close.

When all register-senders are busy, all R relays (here R0 and R1) will be released. Ground will be removed from the ARB relay (FIG. 10). Relay ARB will release to place ground on the ARB lead (FIG. 4) by allowing the closure of contacts ARB-3 (FIG. 10). Relay ARB is designed to be slow to release to prevent a false 'all register-senders busy signal' from being sent when all R relays are momentarily released during the recycling of the register-sender sequence.

Connection OF is an optional connection to an indicator to signal an overflow situation of all registers' busy and a call waiting.

ROUTING DIGIT INFORMATION FIELD

This circuitry is used with dial tie trunks and with originating register senders associated with a step-by-step central office. Alternative circuitry is described for use with a No. 5 crossbar circuit.

The routing digit information field is illustrated in FIGS. 35 and 36. As indicated in FIG. 5 connection of a register sender to a trunk involves connection of the register sender CL lead to the trunk CL lead. As indicated in FIG. 5 grounding of the CL lead (with a trunk associated with a step-by-step central office) will operate an SN relay in the routing digit information cross-connection field. As schematically indicated, there is an SN relay for each trunk associated with the central office and used in accord with the invention and the particular SN relay operated, will determine the routing digit information fed to the register sender which during the call is associated with the dial tie trunk.

Reference will now be made to FIGS. 35 and 36. When the originating register sender is seized by the trunk, the CL connection is made from the trunk as indicated in FIG. 5 to the register sender but the SN relay involved (for each trunk connectible to a register sender (at a step-by-step central office) there will be provided such an SN relay) is not grounded because contacts PFO-1 in the register sender seized by the link circuit are then open.

Where the register sender requires service, the FST lead (FIG. 35) is shown (on FIG. 35) connected to ground through the normally closed contacts CNS-4 and the normally open contacts P-9. On operation of relay P early in the register sender seizure, contacts P-9 close placing ground on the FST lead to the routing digit information field. In FIG. 35 the FST lead from the register sender shown in FIG. 35 will be considered as FST-0 operating relay RRO over RPB-11, RRO-4C, RR1-11 RRO-1. On operation of RR0 contacts RR0-4C and RR0-1 open to prevent the operation of any of the higher numbered R relays; (here only RR1) thus in the event of simultaneous requests by two register senders including the one that connects to relay RR0 and one connected to a lower priority register sender, the one connected to relay RR0 will achieve connection and prevent connection of a relay of lower priority. As will be noted from the circuitry, this discrimination will apply in all situations where two register senders apply for connection simultaneously and thus connection will always be achieved by the higher priority (here lower-numbered) RR relay. The other RR relay (or relays) will restore until the release of the first or the lowered number RR relay.

Operation of relay RR0 (which is the example chosen) will close contacts RR0-2 preparing a grounding path for relay PF-0. Closure of contacts RR0-5 will operate relay RPA over RPB-8, RPA-4C and RR0-50. Relay RPA operated will close contacts RPA-1 operating relay PF-0. Relay RPA is designed to operate under a delay which will allow the restoration of any lower priority (higher-numbered) R relays which are discriminated against in the circuit shown.

Relay RPA operated will lock under the control of relay RPB released. Relay RPB cannot operate at this time since ground appears on both sides of its winding. Relay PF0 operated will close (FIG. 36) the PF contacts as shown in FIG. 36 to connect the leads for the bins 4 to 13 and bin 22, of the relevant register-sender. (Here the one designated '0'). There are in all 56 leads so connected for each register-sender, 5 for each of the 11 bins and one for the CLP lead. Operation of relay PF also closes contacts PF0-1 (FIG. 5) to operate relay SN in the routing digit information field connected to the CL lead in the dial tie trunk. The relay SN operates over a circuit from ground through contacts PFO-1, through the CLP lead, contacts CNS-6 (FIG. 5) through the CL lead to the SN2 relay (FIG. 36 and 5) where the circuit is schematically shown. This (FIG. 36) connects ground to the 22 leads corresponding to each trunk. As indicated in FIG. 36, for each trunk there are provided for each bin strap, connections from the two leads associated with the relevant trunk to two of five leads of the relevant storage bin (which two being determined by the digit associated with the trunk to be stored in the bin). Thus the strap leads determine the digital storage in the bin to which they are connected. Moreover the strap leads are made available from each trunk to the relevant bins of all the register-senders in the pool and the correct (seized) register-sender is selected by closing of the relevant PF contacts. In this way, on operation of the relays SN2 and PF0 ground is applied to two of the five storage bin leads of storage bins 4 to 13 and 22; and as will be appreciated from FIG. 20 the relevant two, of the 0, 1, 2, 4, 7 relays are operated (by the common ground applied to the trunk SN contact leads) to store the routing digital information in the bins. Thus, for a register-sender for use with a step-by-step central office, the routing digit information and class of service indication are now stored in the register-sender.

Referring to FIG. 30 it will be seen that when the routing digit information is stored in bin 22 one or more of the five relays is operated closing its own -1 and -2 contacts (FIG. 22) and through the -2 contacts applying ground, from locking ground, to relay CNS, operating it and disconnecting or releasing the SN relay due to the opening of contacts CNS-6. The opening of these contacts breaks the circuit from ground and contacts PF0-1 through the CLP lead, contacts CNS-6 (FIG. 5) through the CL lead to the SN2 relay and −48V (FIG. 36 and 5) where the circuit is schematically shown. At the same time the connection between the ground in the register-sender (FIG. 5) is broken at CNS-4 on the FST lead to the routing digit information field (FIG. 35).

Thus ground is removed from the FST lead. Removal of ground from the FST lead will remove ground from one side of relay RPB (FIG. 35) and relay RPB will operate over RPB-9*c* and RPA-4*o* locking temporarily over RPB-9*o*. Operation of relay RPB will release relay RPA at RPB-8 and release of relay RPA will release the relay PF0 disconnecting the SN relay at PF0-1. Relay RPB released will replace the battery to one side of the RR relays to allow the preference circuit to be seized by another register-sender. The circuit is now normal.

ACHIEVEMENT OF ROUTING WITH NO. 5 CROSS-BAR ORIGINATING CENTRAL OFFICE

Where the dial tie trunk, register-sender and data set, are associated with a No. 5 cross-bar local central office, the routing connection between the two local central offices is not achieved through signals from the register-sender data set, but rather through a memory circuit and register-sender of conventional design shown in FIG. 1 as a "Seizure-Actuated Automatic Dialling Device." The Device comprises a memory or storage device and sender, both of conventional design, designed and connected to be actuated on seizure, at the originating end, of the dial tie trunk by its associated PBX, to cause, on seizure of a loop at the local central office, by the trunk, the sending of the necessary pulses to achieve the connection from the originating dial tie trunk, through the originating central office, to the terminating central office to the terminating dial tie trunk.

Thus in the No. 5 cross-bar, the seizure of the originating dial tie trunk by the originating PBX, causes, the automatic dialling device to send the routing digits to establish a connection from the originating dial tie trunk to the terminating dial tie trunk. When this connection has been established and each dial tie trunk has been connected to a register-sender, as elsewhere described, the originating register-sender-data-set sends the subscriber dialled digits to the terminating register-sender-data-set. However, in differentiation to the step-by-step originating local central office, the originating register-sender data set for the No. 5 cross-bar does not send the routing digits.

Thus an outsteering relay chain for a No. 5 cross-bar central office commences with relay ON as described in connection with the register-sender.

TIMING UNIT

It is now desired to discuss the release of the register-senders from the line. In the case of each register-sender this will occur after the last digit has been outpulsed.

To discuss the release of the register-sender due to time out it is necessary to discuss the actuation of the time out relay TD.

Initially, it will be noted that a common timing circuit may be provided for a number of register-senders and this is not shown as many varieties of design for such circuit are available to those skilled in the art. The timing circuit may be designed to run continuously and put out pulses of the desired spacing or to be started by one of the register-senders. In the latter event the switching means is shown on line TDR (FIG. 33) where the closure of P3-12 would be used to ground a lead to the timer and initiate its operation. The timer will be designed to provide pulses at rates characteristic of desired 'time out' spacings which will be between unitary and twice the time out period desired. Four output lines are provided from the pulsing unit and the pulses are in the form of ground applied at the desired intervals. The lines are TD1 and TD3 carrying pulses (grounds) at 60 second intervals and TD2 and TD4 carrying pulses (grounds) at 10 second intervals. Each time a pulse appears on TD3 with relay W unoperated, relay W is operated (P3-11 being closed) closing contacts W-4*o* and opening contacts W-4*c* locking relay W under the control of contacts W-4*o* and closing contacts W-1 on line TD1 to the TD relay. Relay TD does not operate at this time since the pulse and relay timing is designed so that the existance of the pulse (ground) terminated on lines TD1 and TD2 before contacts W-1 closed. Relay S is operated each time a digit is outpulsed thus, if within the allowed interval, a digit is outpulsed, contacts S-4 will open, de-energizing relay W and opening contacts W-1. On the other hand if a digit is not outpulsed within the 60 second interval the next pulse on TD1 will operate relay TD and which will lock to ground over TD-6*o*. Similarly with 10 second interval pulses lines TD2 and TD4 will cooperate in a similar manner to operate TD if a digit is not outpulsed within a 10 second interval. Also on line TD4 contacts DSS-3 are placed in parallel with contacts S6. Contacts DDS-3 are controlled by the associated data set which is designed so that contacts DSS-3 are closed during the receipt of tone from the distant end data set, thus contacts DSS-3 are normally open. However, if tone is lost from the distant end data set, implying that the latter is not operating, then contacts DSS-3 close shorting contacts S6, thus relay Y will be held regardless of the pulsing of digits and relay TD will operate on the succeeding pulse on line TD-2 following the one which caused the operation of relay Y on TD4.

The relay ALM (FIG. 29) which is actuated by ground applied on line ALM in the storage checking circuit. When operated relay ALM closes the ALM-1 contacts to lock and closes contacts ALM-2 and ALM-9 on lines AL and AA which will actuate visual or audible alarms. The operation of relay ALM also closes contacts ALM-4*o* which operates relay TD exclusive of its timing supervision.

It will be noted that due to the normally open contacts P-12 in series with relay Y, the 10 second operation of relay TD operates only at the originating end.

RELAY INDEX

| Relay | FIG. | Relay | FIG. | Relay | FIG. |
|---|---|---|---|---|---|
| A | 4 | CO | 5 | GS | 18 |
| | 13 | | | | |
| | | CS | 4 | H | 4 |
| A1 | 1 | | 18 | | |
| | 2 | | | HS | 18 |
| | 3 | CS1 | 5 | | |
| | 4 | | | JS | 18 |
| | | D | 15*b* | | |
| AB | 4 | | | LPA | 10 |
| | 13 | DA | 1 | | |
| | | | 2 | LPB | 10 |
| AC | 17 | | 3 | | |
| | | | 4 | MT | 4 |
| ACC | 27 | | | | |
| | | DB | 16 | OA | 24 |
| ALM | 29 | | | | |
| | | DC | 17 | OB | 24 |
| AS | 18 | | | | |
| | | DCC | 27 | OC | 24 |
| B | 5 | | | | |
| | | DD | 28 | OD | 24 |
| B1 | 5 | | | | |
| | | DD1 | 32 | OE | 24 |
| BB | 5 | | | | |
| | | DD' | 28 | OF | 24 |
| BC | 17 | | | | |

| | |
|---|---|
| BCC | 27 |
| BS | 18 |
| BY | 4 |
| C | 15a |
| CC | 17 |
| CCC | 27 |
| CH | 29 |
| CLO | 22 |
| CL1 | 22 |
| CL2 | 22 |
| CL4 | 22 |
| CL7 | 22 |
| CLA | 31 |
| CLB | 31 |
| CLC | 31 |
| CLD | 31 |
| CNS | 30 |
| OX | 23 25 |
| OY | 23 25 |
| P | 15a |
| P' | 15a |
| P2 | 15b |
| P2A | 15b |
| P2B | 15b |
| P3 | 15b |
| P3S | 15b |
| PA | 15a |
| PAA | 27 |
| PB | 15a |
| PBB | 27 |
| PF0 | 35 |
| PF1 | 35 |
| PP | 15a |
| R0 | 11 |
| R1 | 11 |
| R1' | 10 |
| RC | 34 |
| RL | 5 |
| RPA | 35 |
| RPB | 35 |
| R0' | 10 |
| RR | 34 |
| RR0 | 35 |
| RR1 | 35 |
| S | 5 28 |
| S1D | 16 |
| SL | 16 |

| | |
|---|---|
| DD0 | 32 |
| DD0' | 32 |
| DD1' | 32 |
| DG | 26a |
| DS | 18 |
| DSS | 13 |
| DTD | 14 |
| E | 15b |
| EC | 17 |
| ECC | 27 |
| EE | 23 24 |
| ES | 18 |
| F | 30 |
| FCC | 27 |
| FD9 | 32 |
| FD9' | 32 |
| FS | 18 |
| G | 26a |
| SMO | 12 |
| SM1 | 12 |
| SN1 | 36 |
| SN2 | 5 36 |
| SRL | 5 |
| SS | 26a |
| T | 5 |
| T0 | 28 |
| T1 | 28 10 |
| T1' | 10 |
| T2 | 28 10 |
| T2' | 10 |
| T3 | 10 |
| T3' | 10 |
| T4 | 28 |
| T7 | 28 |
| TD | 33 |
| VM | 5 |
| VM1 | 12 |
| VM2 | 12 |
| VM3 | 12 |
| W | 33 |
| Y | 33 |
| Z | 13 |
| AFX | 13 |
| α | 21 |
| α 1 | 21 |
| α 2 | 21 |
| α 4 | 21 |
| α 7 | 21 |
| β 0 | 21 |

| | |
|---|---|
| OG | 24 |
| OH | 24 |
| OJ | 24 |
| OK | 24 |
| OL | 24 |
| OM | 25 |
| ON | 23 25 |
| OP | 23 25 |
| OR | 23 25 |
| OS | 23 25 |
| OT | 23 25 |
| OU | 23 25 |
| OV | 23 25 |
| OW | 23 25 |
| β 1 | 21 |
| π 0 | 22 |
| π 1 | 22 |

We claim:

1. Means for providing that a sub-set of one private branch exchange, may achieve connection to a sub-set of another private branch exchange, through a conventional telephone system, wherein each private branch exchange is connectable to a different central office, by one or more connecting trunks associated with the private branch exchange;

and each private branch exchange and its associated trunk are designed so that a private branch exchange sub-set may, on an originating call, seize one of the connecting trunks associated with that private branch exchange; and a private branch exchange sub-set may, on a terminating call, be seized by one of the trunks, associated therewith comprising:

first means responsive to the seizure of one of the associated connecting trunks by a sub-set of a private branch exchange, on an originating call, to connect the input of a first register-sender and signal conversion means to said seized trunk, said first register-sender being designed and connected to store dial pulse digits signalled from the sub-set to the register-sender input and, on receipt of a predetermined signal, to transmit through the signal conversion means a signal, at a frequency within the voice band, containing digital information as to said digits;

second means responsive to said seizure of said one of the connecting trunks, for establishing a connection between the central office associated with the seized trunk and the central office associated with the other private branch exchange;

a second register-sender and frequency conversion means associated with said other central office being designed on establishment of said connection to receive signals at a frequency within the voice band sent along said connection containing digital information, and on receipt of a predetermined signal, to transmit said digital information in form suitable for achieving connection at said other private branch exchange to a sub-set thereof;

means responsive to the establishment of said connection for connecting the output of said first register-sender signal conversion means across said established connection to the signal conversion means of said second register-sender at the other central office;

and responsive to the establishment of said connection, to connect the output of said second register-sender at said other central office, to the other private branch exchange;

responsive to the connection of said first and second register-sender signal conversion means across said connection, to send said predetermined signal to said first register-sender;

means responsive to the connection of said first-mentioned register-sender with said one private branch exchange trunk, to provide a signal to said first mentioned sub-set that dialling may commence;

means responsive to the connection of the output of said second register-sender to said other private branch exchange to send to said second register-sender and signal conversion means, a signal to cause said second register-sender to send its received digital information to said other private branch exchange;

means responsive to the connection of said second register-sender to a sub-set at the other private branch exchange, to connect the first-mentioned sub-set to the second-mentioned sub-set, bypassing the two register-senders and frequency conversion means.

2. Means for providing that a sub-set of one private branch exchange, may achieve connection to a sub-set of another private branch exchange, through a conventional telephone system;

wherein each private branch exchange is connectible to a different local central office, by one or more associated connecting trunks associated with the private branch exchange;

where each private branch exchange is designed so that a private branch exchange sub-set may, on an originating call, seize one of the connecting trunks associated with that private branch exchange;

and a private branch exchange may, on a terminating call, be seized by one of said trunks, comprising:

register-sender means associated with a private branch exchange and a local central office, designed to receive at its input, digital information in the form provided by dialed digits at a sub-set of the associated local private branch exchange and responsive to a predetermined signal, to supply such stored information in the form suitable to cause the associated private branch exchange to seize the sub-set line of the associated private branch exchange;

signal conversion means associated with each at least one trunk connecting a private branch exchange and a local central office, designed to operate in alternative modes, namely:

in the first mode, to receive at an input, digital information provided by the output of the register-sender, and to supply at an output such digital information in the form of signals within the voice band, and in the second mode to receive at an input, digital information contained in signals, of frequency within the voice band, and to transmit from an output signals of the type causing switching in a private branch exchange and;

each said signal conversion means operating in the second mode being designed to receive the signals within the voice range sent by the other signal conversion means in the first mode;

means responsive to the seizure, of a connecting trunk, by a sub-set of the associated private branch exchange to:

connect said sub-set to the input of an associated register-sender means;

connect the associated signal conversion means in the first mode;

connect the output of the associated register-sender means to the input, used in said first mode, of said signal conversion means;

establishing a connection from the output, in said first mode, of the signal conversion means through a connection established in the conventional telephone system to the other central office;

responsive to the establishment of said connection i. placing the other signal conversion means in the second mode, ii. connecting the established connection to the input of said other signal conversion means, iii. seizing a trunk to the other private branch exchange, iv. connecting the output of said other signal conversion means to the input of the associated register-sender, v. connecting the output of said other register-sender to the associated seized trunk.

3. Means for providing that a sub-set of one private branch exchange, may achieve connection to a sub-set of another private exchange, through a conventional telephone system, wherein each private branch exhange is connectible to a local central office, by at least one associated connecting trunk, and said local central offices are different, and the private branch exchange is designed so that one of its sub-sets may seize one of its associated connecting trunks;

register-sender means associated with the private branch exchange, designed to receive at its input, digital information in the form provided by dialed digits at the associated private branch exchange sub-set, and responsive to a predetermined signal, to supply such stored information to signal conversion means;

signal conversion means designed to receive at its input, digital information as supplied by the output of said register-sender and to re-transmit said information from its output in the form of signals having a frequency within the voice band;

means responsive to the seizure, of a connecting trunk, by a sub-set of the associated private branch exchange to:

i. connect said sub-set to the input of an associated register-sender means, ii. connect to output of said register-sender means to the input of said signal conversion means, iii. establish a connection through the conventional telephone system from the output of said signal conversion means to the central office associated with the other private branch exchange.

4. Means as claimed in claim 3 in combination with:

second signal conversion means associated with said other central office, designed and connected to receive at its input signals in the form provided by said first-mentioned signal conversion means, and to provide at its output the same digital information in a form which when supplied to the other private branch exchange, will achieve connection to one of its sub-sets;

means associated with said other local central office, responsive to the establishment of said connection, to connect said established connection to the input of said second signal conversion means;

means responsive to the establishment of said connection to make the connections to supply the output of said second signal conversion means to said other private branch exchange.

5. Means as claimed in claim 1, including means responsive to the called sub-set going off-hook, to provide a communications path between said sub-sets, bypassing both register-senders and both signal conversion means.

6. Means as claimed in claim 2 including means responsive to the called sub-set going off-hook, to provide a communications path between said sub-sets, bypassing both said register-senders and both signal conversion means.

7. Means as claimed in claim 3 including means responsive to the called sub-set going off-hook, to provide a communications path between said sub-sets, bypassing both said register-senders and both signal conversion meanS.

8. Means as claimed in claim 4 including means responsive to the called sub-sets, going off-hook, to provide a communications path between said sub-sets, bypassing both said register-senders and both signal conversion means.

9. Means for providing connection between paired private branch exchanges, where each private branch exchange has associated therewith a plurality of sub-sets and each is connectible with a different central office by one or more trunks, where a sub-set of an associated private branch exchange may cause such associated private branch exchange to effect seizure of the trunk to originate a call from the sub-set, and the trunk may achieve seizure of the associated private branch exchange to terminate a call to a sub-set:

means are provided, responsive to the seizure of a trunk by a sub-set for the purpose of originating a call to:

i. connect the input of a register-sender to the seized trunk;

ii. establish a connection through the conventional telephone system between two central offices;

means are provided, responsive to the connection of the first register-sender input to the seized trunk, to indicate to the operator of the originating sub-set that dialling may commence;

said register-sender being designed to store digits received from the sub-set operator;

means are provided responsive to the sub-set connection to the input of the first register-sender to connect the output of the first register-sender to the input of a signal conversion means designed to convert said output into signals of a type suitable for transmission over said established connection and to connect the output of said signal conversion means to said established connection at the central office associated with the originating sub-set.

10. A system as claimed in claim 9 wherein means are provided, responsive to the establishment of said connection, to connect at said terminating central office end, said established connection to the input of a second signal conversion means;

said second signal conversion means being designed to receive at its input, signals in the form put out by the first signal conversion means, and to provide at its output, signals in the form to cause the terminating end associated private branch exchange to seize one of its sub-set lines, and means are provided, responsive to the establishment of said connection, to utilize the output of said signal conversion means to cause the terminating private branch exchange to achieve connection to the sub-set indicated by said digital information.

11. A system as claimed in claim 10 wherein:

means are provided, responsive to the seizure of the terminating register-sender, for sending a signal to the originating register-sender, that digital signalling may commence;

means are provided responsive to the receipt of said last mentioned signal to cause said first register-sender to send digits to said second register-sender;

means are provided, responsive to the connection of the second register-sender to its associated private branch exchange to send out the digital information received at the input of the register-sender in a form to achieve connection at the last-mentioned private branch exchange with the sub-set designated by the digital information corresponding to each register-sender-signal conversion combination, responsive to the sending of all digital information stored, to connect the associated private branch exchange to said established connection by a connection bypassing said last-mentioned register-sender and frequency conversion means.

12. The method of providing a two-way communication between the sub-sets of one private branch exchange and the sub-sets of another private branch exchange where each private branch exchange is associated with a local central office and connectible thereto by a trunk, and where each private branch exchange is designed so that the operator of a sub-set of one of the private branch exchanges may seize the trunk associated therewith; and where signals passing inwardly along said trunk to the associated private branch exchange may cause seizure of a sub-set, the method comprising the steps of:

responsive to the seizure of such a trunk by a sub-set associated with the same private branch exchange;

i. connecting the sub-set to a first storage for dialled digits where said sub-set and storage are connected to the same private branch exchange;

ii. establishing a connection between the two local central offices;

iii. responsive to the connection of said sub-set to storage, indicating to the sub-set that dialling may commence;

iv. responsive to the establishment of said connection, extending said connection at the other central office, to second storage means for receiving and storing the digital information contained in such signals within the voice band;

responsive to the storage of such dialed digits in said first storage, and the extension of said connection to the second storage means, sending the stored digits over said established connection to the other private branch exchange in the form of a signal having a frequency within the voice band;

v. providing a connection for the output of said second storage means to the trunk associated with said other private branch exchange;

vi. responsive to the provision of said last-mentioned connection and to the storage of at least some of said digital information in said second storage means, to supply signals containing digital information received, in said second storage means, to the trunk associated with said other private branch exchange;

said signals being in a form to cause seizure by said trunk of the subset of said other private branch exchange.

13. A method as claimed in claim 12 including the step of:

responsive to the output of the digital information received by the first mentioned storage means, providing a connection between said first mentioned trunk, and said established connection, bypassing said first mentioned storage means.

14. A method as claimed in claim 12 including the step of:

responsive to the output of the digital information received by the second storage means, providing a connection between said established connection and said other private branch exchange bypassing said second storage means.

15. A method as claimed in claim 13 including the step of:

responsive to the output of the digital information received by the second storage means, providing a connection between said established connection and said other private branch exchange bypassing said second storage means.

16. With a central office associated with a private branch exchange connectible thereto, by at least one trunk; a system for connecting a sub-set of said private branch exchange to a central office exterior to said associated central office; said system including means responsive to the seizure of the private branch exchange trunk by a sub-set of the associated private branch exchange, which sub-set is originating a call;

to connect the input of a register-sender-data-set thereto;

second means responsive to the seizure of the private branch exchange trunk by a sub-set of the associated private branch exchange: to establish a connection through the conventional telephone system between said associated and said exterior central office;

means responsive to the connection of said register-sender-data-set input, to provide a signal to the originating sub-set;

means responsive to the seizure of the private branch exchange trunk, to connect the output of said register-sender-data-set so that it will provide output signals along said established connection.

17. A system as claimed in claim 16 including:

means responsive to the output of all digital information received by said register-sender-data-set, for connecting said private branch exchange to said established connection, along a connection bypassing said register-sender-data-set.

18. A system as claimed in claim 4 in combination with call timing means associated with one of said private branch exchanges, means for initiating timing when the called subset of said other private branch exchange goes off-hook; and means for terminating such initiated timing when the first of the calling or called subsets goes on-hook.

19. A system as claimed in claim 11 in combination with call timing means associated with one of said private branch exchanges, means for initiating timing when the designated subset of said other private branch exchange goes off-hook; and means for terminating such initated timing when the first of the calling or the designated subsets goes on-hook.

20. Means as claimed in claim 1, wherein said first register-sender is designed to store information as to the routing digits for establishing a connection between the central offices, and wherein said second means for establishing said connection between the central offices comprises:

means responsive to said seizure of said one of the connecting trunks and to the connection of said first register-sender, to store in said first register-sender, information as to the routing digits for establishing a connection to the other central office, means consequent upon said storage for causing said first register-sender to establish said connection between central offices based on the stored routing digits.

means operable, subsequent to the use of said routing digits to establish said connection, to connect the output of said first register-sender to transmit along said established connection said signal, at a frequency within the voice band, containing information as to said dial pulse digits.

* * * * *